United States Patent
Lee et al.

(10) Patent No.: US 11,376,969 B2
(45) Date of Patent: Jul. 5, 2022

(54) BUS BAR ASSEMBLY AND FRAME ASSEMBLY

(71) Applicant: Yura Corporation Co., Ltd., Gyeonggi-do (KR)

(72) Inventors: Cheon Hyo Lee, Gyeonggi-do (KR); Kwang Ouk Sa, Seoul (KR); Ji Eun Kang, Geyonggi-do (KR); Seung Jun Noh, Gyeonggi-do (KR)

(73) Assignee: Yura Corporation Co., Ltd., Gyeonggi-do (KR)

( * ) Notice: Subject to any disclaimer, the term of this patent is extended or adjusted under 35 U.S.C. 154(b) by 287 days.

(21) Appl. No.: 16/474,044

(22) PCT Filed: Nov. 24, 2017

(86) PCT No.: PCT/KR2017/013561
§ 371 (c)(1),
(2) Date: Jun. 26, 2019

(87) PCT Pub. No.: WO2018/124494
PCT Pub. Date: Jul. 5, 2018

(65) Prior Publication Data
US 2019/0389318 A1    Dec. 26, 2019

(30) Foreign Application Priority Data

Dec. 27, 2016 (KR) .......... 10-2016-0180292
Dec. 27, 2016 (KR) .......... 10-2016-0180293
(Continued)

(51) Int. Cl.
*H01M 50/502*  (2021.01)
*H01M 50/20*   (2021.01)
(Continued)

(52) U.S. Cl.
CPC ............ *B60L 50/50* (2019.02); *H01M 50/20* (2021.01); *H01M 50/502* (2021.01); *H01R 12/77* (2013.01)

(58) Field of Classification Search
CPC .................................................. H01M 50/502
See application file for complete search history.

(56) References Cited

U.S. PATENT DOCUMENTS 7,556,509 B1 *  7/2009  Oh .............. H01R 12/7088
439/76.2
2009/0246627 A1  10/2009  Park
(Continued)

FOREIGN PATENT DOCUMENTS

CN    102308433 A    1/2012
CN    102379058 A    3/2012
(Continued)

OTHER PUBLICATIONS

International Search Report issued in PCT Patent Application No. PCT/KR2017/013561 dated May 31, 2018.
(Continued)

*Primary Examiner* — Brian R Ohara
(74) *Attorney, Agent, or Firm* — Marshall, Gerstein & Borun LLP

(57) ABSTRACT

A bus bar assembly installed in a frame for fixing a plurality of stacked battery cells is provided. The bus bar assembly may include: a bus bar fixed to the frame; a flexible printed circuit board electrically connected to the bus bar and configured to sense the plurality of battery cells; and a connection terminal having a protrusion formed on one surface of the connection terminal, is the protrusion being configured to pass through the flexible printed circuit board so as to be electrically connected to the flexible printed circuit board, and the connection terminal configured to be electrically connected to the bus bar through the opposite
(Continued)

surface of the one surface, the opposite surface being bonded to the bus bar.

8 Claims, 56 Drawing Sheets

(30) Foreign Application Priority Data

| Dec. 29, 2016 | (KR) | 10-2016-0182296 |
|---|---|---|
| Feb. 28, 2017 | (KR) | 10-2017-0026828 |
| Oct. 27, 2017 | (KR) | 10-2017-0141526 |
| Oct. 27, 2017 | (KR) | 10-2017-0141527 |

(51) Int. Cl.
*H01R 12/77* (2011.01)
*B60L 50/50* (2019.01)

(56) References Cited

U.S. PATENT DOCUMENTS

| 2010/0062329 A1* | 3/2010 | Muis | G01R 1/203 |
| | | | 429/158 |
| 2011/0059342 A1* | 3/2011 | Lee | H01M 10/482 |
| | | | 429/93 |
| 2012/0019061 A1 | 1/2012 | Nishihara et al. | |
| 2012/0214027 A1 | 8/2012 | Ahn | |
| 2012/0231638 A1 | 9/2012 | Ikeda et al. | |
| 2013/0000957 A1* | 1/2013 | Ikeda | H01M 50/502 |
| | | | 174/254 |
| 2014/0193680 A1* | 7/2014 | Lee | H01M 50/20 |
| | | | 429/82 |
| 2014/0322993 A1 | 10/2014 | Ito | |
| 2014/0356687 A1 | 12/2014 | Heo et al. | |
| 2014/0370355 A1 | 12/2014 | Byun et al. | |
| 2016/0248070 A1 | 8/2016 | Ahn | |
| 2016/0294023 A1* | 10/2016 | Aoki | H01M 50/543 |
| 2018/0019508 A1 | 1/2018 | Lee et al. | |

FOREIGN PATENT DOCUMENTS

| CN | 102576845 A | 7/2012 |
|---|---|---|
| CN | 102859751 A | 1/2013 |
| CN | 103915597 A | 7/2014 |
| CN | 105814712 A | 7/2016 |
| DE | 102014105118 A1 | 10/2015 |
| EP | 2752917 | 7/2014 |
| EP | 2752917 A1 | 7/2014 |
| JP | 2012227004 A | 11/2012 |
| JP | 2013-097894 A | 5/2013 |
| JP | 2013-149426 A | 8/2013 |
| JP | 2013-225457 A | 10/2013 |
| JP | 2014-135278 A | 7/2014 |
| JP | 5715766 B2 | 5/2015 |
| KR | 10-2009-0104583 A | 10/2009 |
| KR | 10-2009-0111721 † | 10/2009 |
| KR | 10-2009-0111721 A | 10/2009 |
| KR | 10-2010-0109857 A | 10/2010 |
| KR | 10-2011-0057470 A | 6/2011 |
| KR | 10-2011-0057540 A | 6/2011 |
| KR | 10-2012-0003432 † | 1/2012 |
| KR | 10-2012-0003432 A | 1/2012 |
| KR | 10-2012-0005728 A | 1/2012 |
| KR | 10-2012-0095295 A | 8/2012 |
| KR | 10-2013-0008136 A | 1/2013 |
| KR | 10-2013-0025245 A | 3/2013 |
| KR | 10-2013-0065686 A | 6/2013 |
| KR | 101329250 B1 | 11/2013 |
| KR | 101329251 B1 | 11/2013 |
| KR | 101329252 B1 | 11/2013 |
| KR | 10-2014-0090077 † | 7/2014 |
| KR | 10-2014-0090077 A | 7/2014 |
| KR | 10-2014-0095660 A | 8/2014 |
| KR | 10-2014-0102767 † | 8/2014 |
| KR | 10-2014-0137044 A | 12/2014 |
| KR | 10-2014-0139862 A | 12/2014 |
| KR | 10-2014-0145923 A | 12/2014 |
| KR | 20150033176 A | 4/2015 |
| KR | 10-2015-0050314 A | 5/2015 |
| KR | 10-2015-0067694 A | 6/2015 |
| KR | 10-2016-0018982 A | 2/2016 |
| KR | 20160026469 A | 3/2016 |
| KR | 10-2016-0044654 A | 4/2016 |
| KR | 101647694 B1 | 8/2016 |
| KR | 10-2016-0115582 A | 10/2016 |
| WO | WO-2010/113455 A1 | 10/2010 |
| WO | WO-2015/087438 A1 | 6/2015 |

OTHER PUBLICATIONS

International Search Report issued in PCT Patent Application No. PCT/KR2017/015594 dated Apr. 24, 2018.
International Seach Report issued in PCT Patent Application No. PCT/KR2017/013562 dated Mar. 5, 2018.

\* cited by examiner
† cited by third party

BUS BAR ASSEMBLY AND FRAME ASSEMBLY

TECHNICAL FIELD

The present disclosure relates to a bus bar assembly and a frame assembly.

BACKGROUND

A hybrid vehicle or an electric vehicle may use, as a power source, a secondary battery installed inside the vehicle, and may be used in various fields such as a general-purpose vehicle, a leisure cart, and the like. The hybrid vehicle or the electric vehicle may drive wheels by rotating an electric motor using the electric power from the charged secondary battery. After the secondary battery is discharged, the electric vehicle may charge the secondary battery using external electric power, and the hybrid vehicle may charge the secondary battery by driving an internal combustion engine or using external electric power. In addition, a number of electric vehicle manufacturers are entering the market and the number thereof is steadily increasing.

The secondary battery may be used in the form of a single battery module obtained by clustering of a plurality of battery cells, as well as in the form of a single battery. A plurality of battery modules is connected in series and is installed in the lower part of the vehicle body, thereby generating a high voltage for driving an electric motor corresponding to the output of an internal combustion engine. In addition, when a plurality of battery cells is clustered, the terminals of the respective battery cells may be connected in series or in parallel by a frame assembly.

A flexible printed circuit board (FPCB) is obtained by fabricating a substrate layer made of a flexible material and coating the substrate layer with a thin insulating layer. The FPCB is lightweight and space-saving, and thus, thanks to these characteristics, the flexible printed circuit board has recently been employed in various fields. However, since the FPCB is a very thin unlike a general PCB, there is a problem in which the FPCB is easily torn or damaged by an external impact. Thus, various research and development efforts are under way to solve the problem.

SUMMARY

Various embodiments of the present disclosure provide a frame assembly in which a connection circuit portion of a flexible printed circuit board is directly bonded to a bus bar attached to a frame by any of various welding processes (e.g., laser welding, ultrasonic welding, resistance welding, and the like). In addition, various embodiments of the present disclosure provide various structures to strengthen the coupling between the circuit portion and the bus bar.

Embodiments according to the present disclosure provide a frame assembly in which a frame and a flexible printed circuit board are bonded to each other. In addition, embodiments according to the present disclosure provide a frame assembly capable of freely configuring a parallel/serial connection of batteries, thereby easily changing the battery capacity depending on the vehicle package and reducing the number of welding processes.

Embodiments of the present disclosure provide a bus bar assembly capable of reducing the number of work processes of electrically connecting a bus bar with a flexible printed circuit board and capable of reducing the cost of the connection. In addition, embodiments of the present disclosure are intended to improve the reliability of a product by improving the structural weakness of the coupling between the bus bar and the flexible printed circuit board, and are intended to reduce costs for manufacturing and developing parts and management costs thereof by reducing the number of necessary parts.

A bus bar assembly installed in a frame for fixing a plurality of stacked battery cells, according to an embodiment of the present disclosure may include: a bus bar fixed to the frame; a flexible printed circuit board electrically connected to the bus bar and configured to sense the plurality of battery cells; and a connection terminal having a protrusion formed on one surface of the connection terminal, the protrusion being configured to pass through the flexible printed circuit board so as to be electrically connected to the flexible printed circuit board, and the connection terminal being configured to be electrically connected to the bus bar through the opposite surface of the one surface, the opposite surface being bonded to the bus bar.

According to an embodiment, the connection terminal may include: a bonding portion including a first surface and a second surface bonded to the bus bar; and an engaging portion having the protrusion formed therein and extending from the bonding portion so as to be coupled to the flexible printed circuit board by means of a lap joint.

According to an embodiment, a plurality of protrusions may be provided to face each other. In addition, the plurality of protrusions may pass through predetermined positions of the flexible printed circuit board and the passing and protruding portions of the plurality of protrusions may be pressed to be bent.

According to an embodiment, the second surface may be disposed adjacent to the bus bar, and the second surface may be bonded to the bus bar by applying a welding process to the first surface.

According to an embodiment, the bus bar may have a recess formed therein to receive the connection terminal.

According to an embodiment, a pair of bus bars and a pair of connection terminals are provided, and the flexible printed circuit board may include a pair of connection circuit portions diverging from an end of the flexible printed circuit board and being coupled respectively to the pair of connection terminals. In addition, the pair of connection circuit portions may be configured to be electrically connected respectively to the pair of bus bars through the pair of connection terminals respectively.

According to an embodiment, a conformal coating process may be performed so as to cover the connection terminal and a portion of the bus bar around the connection terminal in the state in which the connection terminal is bonded to the bus bar.

According to another embodiment of the present disclosure, a bus bar assembly installed in a frame for fixing a plurality of stacked battery cells may include: a bus bar fixed to the frame; a flexible printed circuit board electrically connected to the bus bar and configured to sense the plurality of battery cells; a connection terminal having a protrusion formed on one surface of the connection terminal, the protrusion being configured to pass through the flexible printed circuit board so as to be electrically connected to the flexible printed circuit board, and the connection terminal being configured to be in contact with the bus bar through the opposite surface of the one surface; and an engaging member configured to pass through the connection terminal and the bus bar so as to fix the connection terminal to the bus bar.

According to an embodiment, the connection terminal may include: a contact portion through which the engaging member passes so as to come into contact with the bus bar; and an engaging portion having the protrusion formed therein and extending from the contact portion so as to be coupled to the flexible printed circuit board by means of a lap joint.

According to an embodiment, the contact portion may include a ring portion having a hole through which the engaging member passes.

According to an embodiment, the bus bar may have a recess formed therein to receive the connection terminal, and the recess may have a hole through which the engaging member passes.

According to an embodiment, a pair of bus bars, a pair of connection terminals, and a pair of engaging members may be provided. The flexible printed circuit board may include a pair of connection circuit portions diverging from an end of the flexible printed circuit board and being coupled respectively to the pair of connection terminals, and the pair of connection circuit portions may be configured to be electrically connected respectively to the pair of bus bars through the pair of connection terminals respectively through which the pair of engaging members respectively passes.

According to another embodiment of the present disclosure, a bus bar assembly installed in a frame for fixing a plurality of stacked battery cells may include: a bus bar fixed to the frame and having a first hole formed therein; a flexible printed circuit board electrically connected to the bus bar, configured to sense the plurality of battery cells, having a second hole formed therein, and formed of a conductive metal exposed through the second hole; and an engaging member configured to pass through the first hole and the second hole so as to electrically connect the flexible printed circuit board to the bus bar, and configured to fix the flexible printed circuit board to the bus bar.

According to an embodiment, a pair of first holes and a pair of second holes may be provided. The pair of first holes may be spaced a predetermined distance apart from each other, and the pair of second holes may be spaced the same distance as the predetermined distance apart from each other.

According to an embodiment, the flexible printed circuit board may be arranged on the bus bar such that the second hole of the flexible printed circuit board is aligned with a first hole of the bus bar, and the engaging member may be configured to pass through the second hole and the first hole, which are aligned with each other, so as to couple the flexible printed circuit board to the bus bar by means of a lap joint.

According to an embodiment, the engaging member may be a rivet.

According to an embodiment, the bus bar may have a recess formed therein to receive the flexible printed circuit board, and the first hole may be formed in the recess.

According to an embodiment, a pair of bus bars and a pair of engaging members may be provided. The flexible printed circuit board may include a pair of connection circuit portions diverging from an end of the flexible printed circuit board, and the pair of connection circuit portions may be configured to be electrically connected respectively to the pair of bus bars through the pair of engaging members respectively.

According to another embodiment of the present disclosure, a frame assembly for fixing a plurality of stacked battery cells may include: a frame including an upper surface, a first lateral surface connected to one end of the upper surface, and a second lateral surface connected to the opposite end of the upper surface, and configured to surround the plurality of battery cells; a plurality of first bus bars disposed on the first lateral surface of the frame; a plurality of second bus bars disposed on the second lateral surface of the frame; a flexible printed circuit board including a circuit portion disposed on the upper surface, a plurality of first connection circuit portions extending and diverging from one end of the circuit portion on the first lateral surface, and a plurality of second connection circuit portions extending and diverging from the opposite end of the circuit portion on the second lateral surface; a plurality of first connection terminals each including a first surface having a protrusion configured to pass through the first connection circuit portion so as to be electrically connected to the first connection circuit portion and a second surface configured to be in contact with the bus bar; and a plurality of second connection terminals each including a first surface having a protrusion configured to pass through the second connection circuit portion so as to be electrically connected to the second connection circuit portion and a second surface configured to be in contact with the bus bar.

According to an embodiment, the second surfaces of the plurality of first connection terminals may be disposed adjacent to the plurality of first bus bars, and the second surfaces of the plurality of first connection terminals may be bonded to the plurality of first bus bars by applying a welding process to the first surfaces of the plurality of first connection terminals. In addition, the second surfaces of the plurality of second connection terminals may be disposed adjacent to the plurality of second bus bars, and the second surfaces of the plurality of second connection terminals may be bonded to the plurality of second bus bars by applying the welding process to the first surfaces of the plurality of second connection terminals.

According to an embodiment, the plurality of first bus bars may have a first recess configured to receive the first connection terminal, and the plurality of second bus bars may have a second recess configured to receive the second connection terminal.

According to an embodiment, the frame assembly may further include: a plurality of first engaging members configured to pass through the first connection terminals and the first bus bars so as to fix the first connection terminals to the first bus bars; and a plurality of second engaging members configured to pass through the second connection terminals and the second bus bars so as to fix the second connection terminals to the second bus bars.

According to an embodiment, the first connection terminal may include a first ring portion having a hole through which the first engaging member passes, and the second connection terminal may include a second ring portion having a hole through which the second engaging member passes.

According to an embodiment, the first bus bar may have a hole through which the first engaging member passes, and the second bus bar may have a hole through which the second engaging member passes.

According to an embodiment, the frame may include: a first frame disposed on the upper surface; a second frame disposed on the first lateral surface so as to be pivotably coupled to one end of the first frame and having the plurality of first bus bars disposed therein; and a third frame disposed on the second lateral surface so as to be pivotably coupled to the opposite end of the first frame and having the plurality of second bus bars disposed therein.

According to an embodiment, the first bus bar may be configured to be bonded to a terminal on one side of the plurality of battery cells, and the second bus bar may be configured to be bonded to a terminal on the opposite side of the plurality of battery cells.

According to embodiments of the present disclosure, since the connection circuit portion of the flexible printed circuit board is directly bonded to the bus bar by any of various welding processes (laser welding, ultrasonic welding, resistance welding, etc.), it is possible to simplify the welding process of the connection circuit portion and the bus bar. In addition, the types and number of parts are decreased, so that costs can be reduced, and contact stability between the connection circuit portion and the bus bar can be improved.

According to embodiments of the present disclosure, since a plurality of battery cells is bonded to bus bars so as to be electrically connected in series, it is possible to freely configure the parallel/serial connection of the batteries, thereby easily changing the battery capacity depending on the vehicle packages, and it is possible to reduce the number of welding processes, compared with a method in which the battery cells are connected to each other.

According to embodiments of the present disclosure, the bus bar and the flexible printed circuit board can be simply and electrically connected using a conductive connection terminal, thereby improving productivity. In addition, it is possible to improve the reliability of a product by improving the structural weakness of the coupling between the bus bar and the flexible printed circuit board, and it is possible to reduce costs for manufacturing and developing parts and management costs thereof by reducing the number of parts.

According to embodiments of the present disclosure, the connection terminal can be firmly fixed to the bus bar by means of a ring portion of the connection terminal and an engaging member passing therethrough. That is, if a connection terminal having a ring shape is used, the process of electrically connecting the bus bar and the flexible printed circuit board can be simplified, thereby improving productivity.

DETAILED DESCRIPTION

Figure 1:
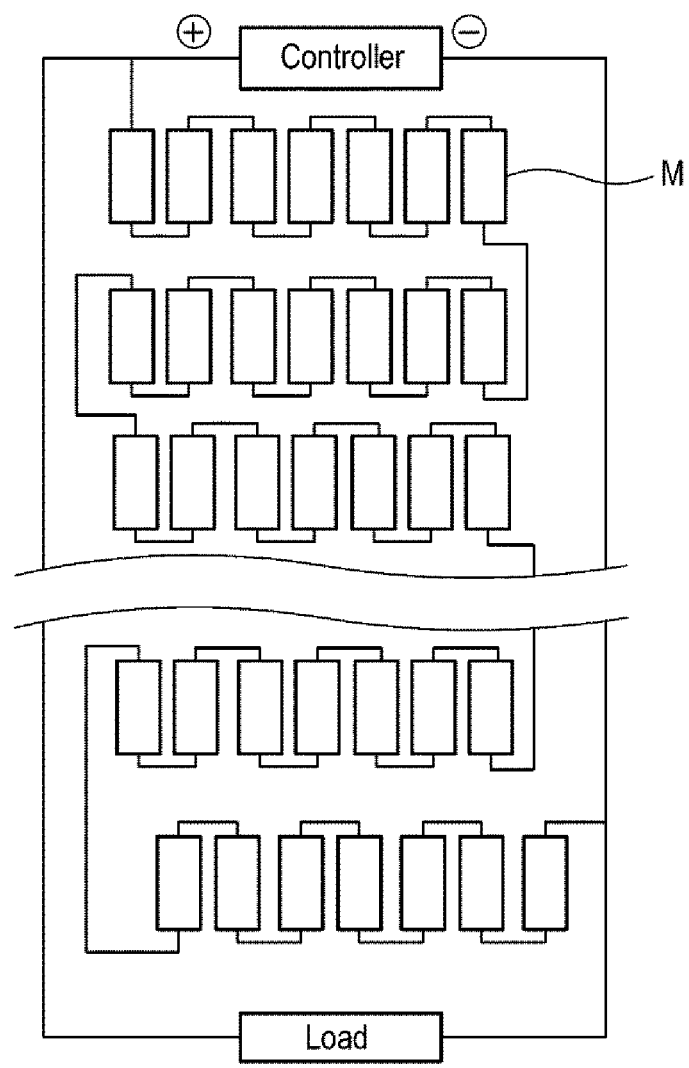
FIG. 1 is a schematic view showing the structure in which a battery module including a frame assembly is installed in a vehicle according to an embodiment of the present disclosure.

Embodiments of the present disclosure are illustrated for the purpose of explaining the technical idea of the present disclosure. The scope of rights according to the present disclosure is not limited to the embodiments presented below or to the detailed descriptions of such embodiments.

All technical and scientific terms used in the present disclosure have meanings generally understood by those of ordinary skill in the art to which the present disclosure pertains, unless otherwise defined. All terms used in the present disclosure are chosen for the purpose of more clearly describing the present disclosure and are not chosen to limit the scope of rights according to the present disclosure.

As used in the present disclosure, expressions such as "comprising", "including", "having", and the like are to be understood as open-ended terms having the possibility of encompassing other embodiments, unless otherwise mentioned in the phrase or sentence containing such expressions.

The singular form, when used in the present disclosure may include a plural meaning, unless otherwise mentioned. This applies equally to the use of the singular form in the claims.

The expressions "first", "second", and the like, when used in the present disclosure, are intended to distinguish between multiple elements, and are not intended to limit the sequence or importance of the corresponding elements.

In the present disclosure, where it is mentioned in the present disclosure that one element is "connected" or "coupled" to another element, it is to be understood that said one element may be directly connected or coupled to said another element, or may be connected or coupled to said another element via a new additional element.

Hereinafter, descriptions will be made of embodiments of the present disclosure with reference to the accompanying drawings. In the accompanying drawings, the same or corresponding elements are denoted by the same reference numerals. In the following descriptions of the embodiments, descriptions of the same or corresponding elements may be omitted. However, even if the descriptions of elements are omitted, it is not intended that such elements excluded from a certain embodiment.

Figure 2:
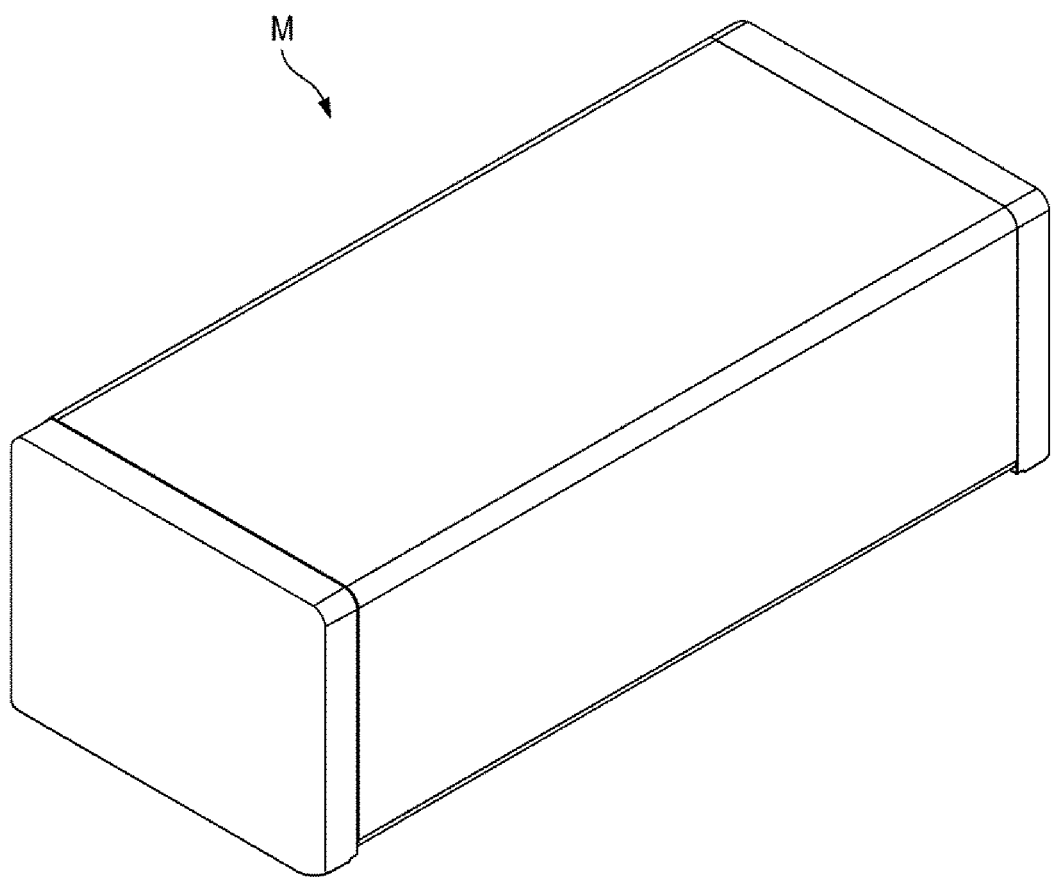
FIG. 2 is a perspective view showing an assembled battery module including a frame assembly according to an embodiment of the present disclosure.

FIG. 1 is a schematic view showing the structure in which a battery module (M) including a frame assembly is installed in a vehicle according to an embodiment of the present disclosure. FIG. 2 is a perspective view showing an assembled battery module (M) including a frame assembly according to an embodiment of the present disclosure.

A plurality of battery modules (M) may be arranged on the floor of a vehicle body. The plurality of battery modules (M) exhibiting the same output voltage may be connected in series or in parallel to each other, thereby generating a final output voltage. This final output voltage may drive a load. For example, a driving force generated in a motor, which is a kind of load, may rotate the wheels of the vehicle. The charging/discharging of each of the plurality of battery modules (M) may be controlled by a controller.

Although FIG. 1 illustrates that the battery modules (M) are connected in series to each other, the arrangement of the battery modules (M) may be varied depending on conditions such as the output voltage of each battery module (M), the layout of a vehicle, the voltage required for a load, and the like.

Figure 3:
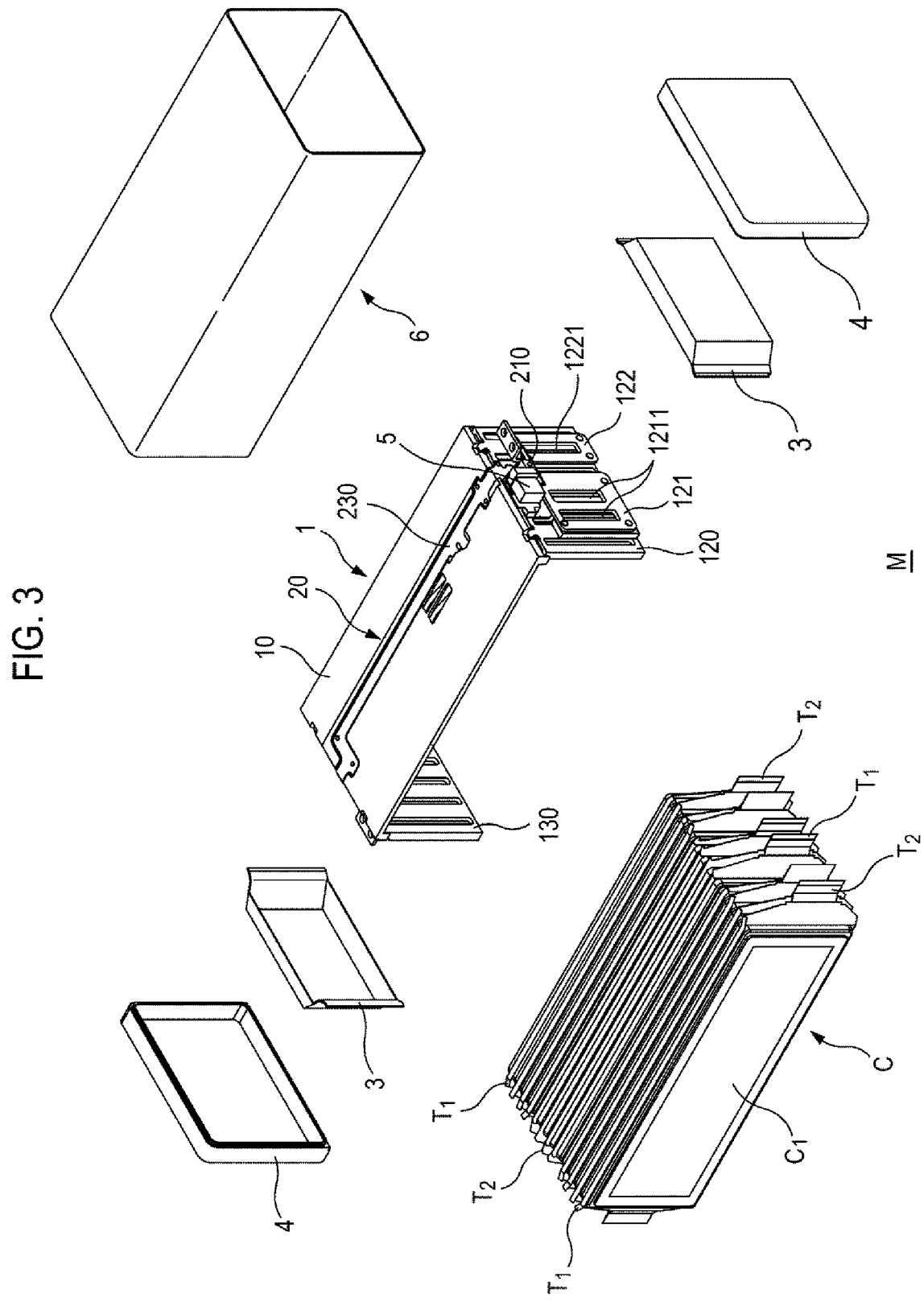
FIG. 3 is an exploded perspective view of a battery module including a frame assembly according to an embodiment of the present disclosure.
Figure 4:
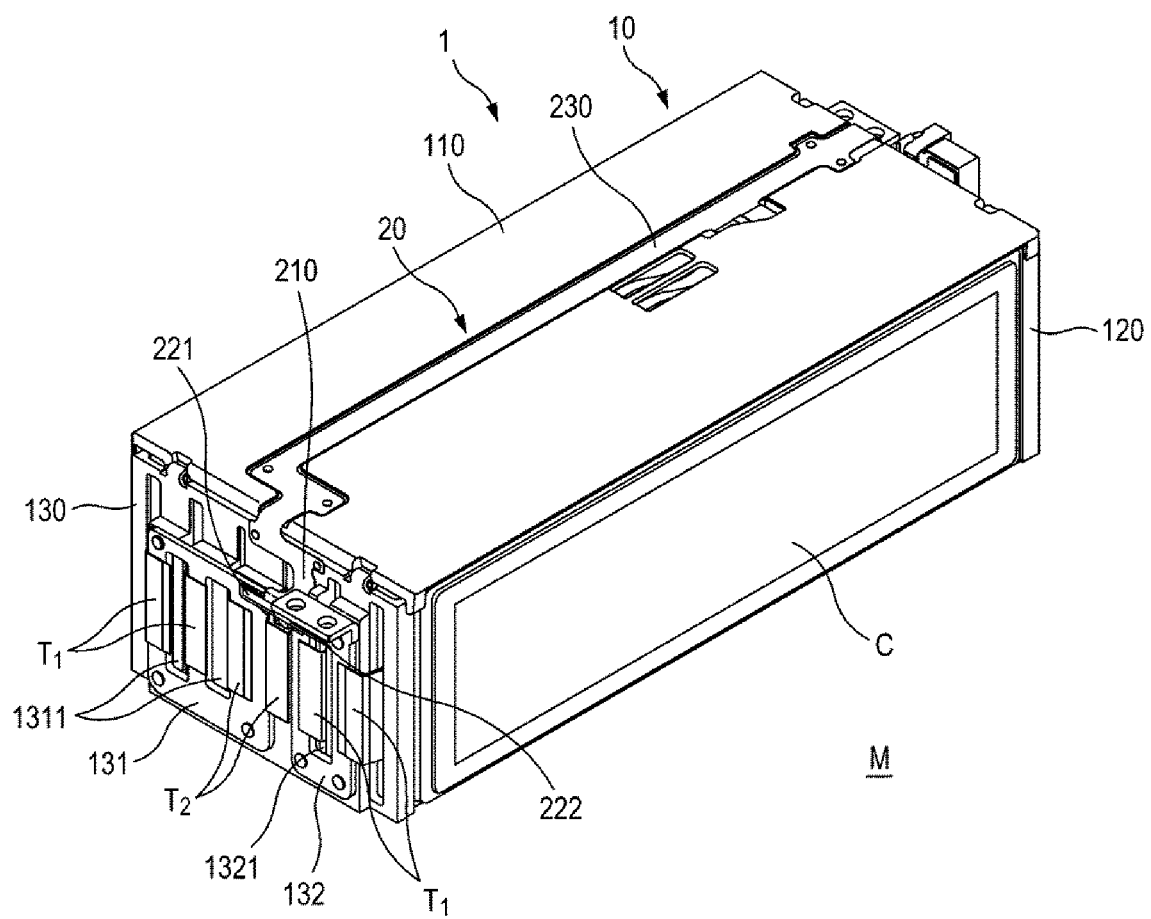
FIG. 4 is a perspective view showing the configuration in which a frame assembly and a battery cell are assembled according to an embodiment of the present disclosure.

FIG. 3 is an exploded perspective view of a battery module (M) including a frame assembly 1 according to an embodiment of the present disclosure, and FIG. 4 is a perspective view showing the configuration in which a frame assembly 1 and a battery cell (C) are coupled to each other according to an embodiment of the present disclosure.

The battery module (M) may include a plurality of stacked battery cells (C), a frame assembly 1 for fixing the battery cells, insulating covers 3 covering both sides of the frame assembly 1, module covers 4, and a housing 6. The battery cell (C) may be, for example, a secondary battery, but is not limited thereto, and any type of battery capable of being charged or discharged may be applied to the battery cell.

A terminal of the battery cell (C) may be a tap terminal that is conductive and is made of a deformable material. The battery cell (C) may include a cell body C1, a (+) tab T1 formed on one side of the cell body C1, and a (−) tab T2 formed on the opposite side of the cell body C1. The (+) tab T1 and the (−) tab T2 may be tap terminals that are conductive and flexible. The (+) and (−) tabs T1 and T2 may be made of, for example, a material including lead or aluminium, but are not limited thereto, and any kind of metal material may be applied to the tabs as long as it is flexible.

FIG. 3 shows that tap terminals of the battery cells (C) that are adjacent to each other, among the plurality of battery cells (C), are connected to each other. For example, if the tap terminals having the same polarity are connected to each other, the neighboring battery cells (C) may be electrically connected in parallel to each other. In addition, the tap terminals of the neighboring battery cells (C) may be electrically connected to each other through a surface welding process.

The module covers 4 may prevent a vehicle fire caused by collapse or breakage of the battery cells (C) in the case of a vehicle accident, and may protect the internal structure of an assembly configured by assembling the frame assembly 1 and the battery cells (C). In addition, the housing 6 may protect the assembled state of the frame assembly 1 and the plurality of battery cells (C) from an external impact. For example, the module covers 4 and the housing 6 may be made of a metal material having high strength.

The frame assembly 1 may include a frame 10, a plurality of bus bars 121, 122, 131, and 132, a flexible printed circuit board (FPCB) 20, and a connector 5. The flexible printed circuit board 20 may be arranged in the longitudinal direction of the frame 10. The connector 5 may be configured to transmit and receive signals indicating the state of the plurality of battery cells (C), such as signals related to voltage sensing and temperature sensing, to and from the controller shown in FIG. 1, and may be coupled to the flexible printed circuit board 20.

In an embodiment, the frame 10 may include a first frame 110 disposed on the upper surface of the frame 10, a second frame 120 disposed on a first lateral surface of the frame 10 and pivotably coupled to one end of the first frame 110, and a third frame 130 disposed on a second lateral surface of the frame 10 and pivotably coupled to the opposite end of the first frame 110. In addition, the frame 10 may be configured to surround an upper surface and both lateral surfaces of the plurality of battery cells (C). The frame 10 may be made of a non-conductive synthetic resin material.

The plurality of bus bars 121, 122, 131, and 132 may be made of a conductive metal material, and may include a plurality of first bus bars 121 and 122 and a plurality of second bus bars 131 and 132. A plurality of first bus bars 121 and 122 may be disposed in the second frame 120, and a plurality of second bus bars 131 and 132 may be disposed in the third frame 130. The plurality of first bus bars 121 and 122 and the plurality of second bus bars 131 and 132 may be configured to be connected to the terminals of the plurality of battery cells (C).

The (+) and (−) tabs T1 and T2 of the battery cells (C) may remain straight before the battery cells (C) are coupled to the frame assembly 1. The straight tabs T1 and T2 may pass through slits 1211 and 1221 formed in the first bus bars 121 and 122 and the slits 1311 and 1321 formed in the second bus bars 131 and 132.

The battery cells (C) and the frame assembly 1 may be coupled through the following processes. The second and third frames 120 and 130 of the frame assembly 1 may cover the upper surface of the battery cell (C) while being pivoted outwards. Then, the pivoted second and third frames 120 and 130 are pivoted inwards such that the tabs T1 and T2 of the battery cells (C) pass through the slits 1211 and 1221 formed in the first bus bars 121 and 122 and the slits 1311 and 1321 formed in the second bus bars 131 and 132. Next, the tabs T1 and T2 are bent such that surfaces of the tabs come into contact with the front surfaces of the first bus bars 121 and 122 and the second bus bars 131 and 132. Thereafter, the tabs T1 and T2 are bonded to the first bus bars 121 and 122 and the second bus bars 131 and 132 so as to be electrically connected to each other by applying a welding process to the opposite surfaces of the tabs T1 and T2.

Figure 5:
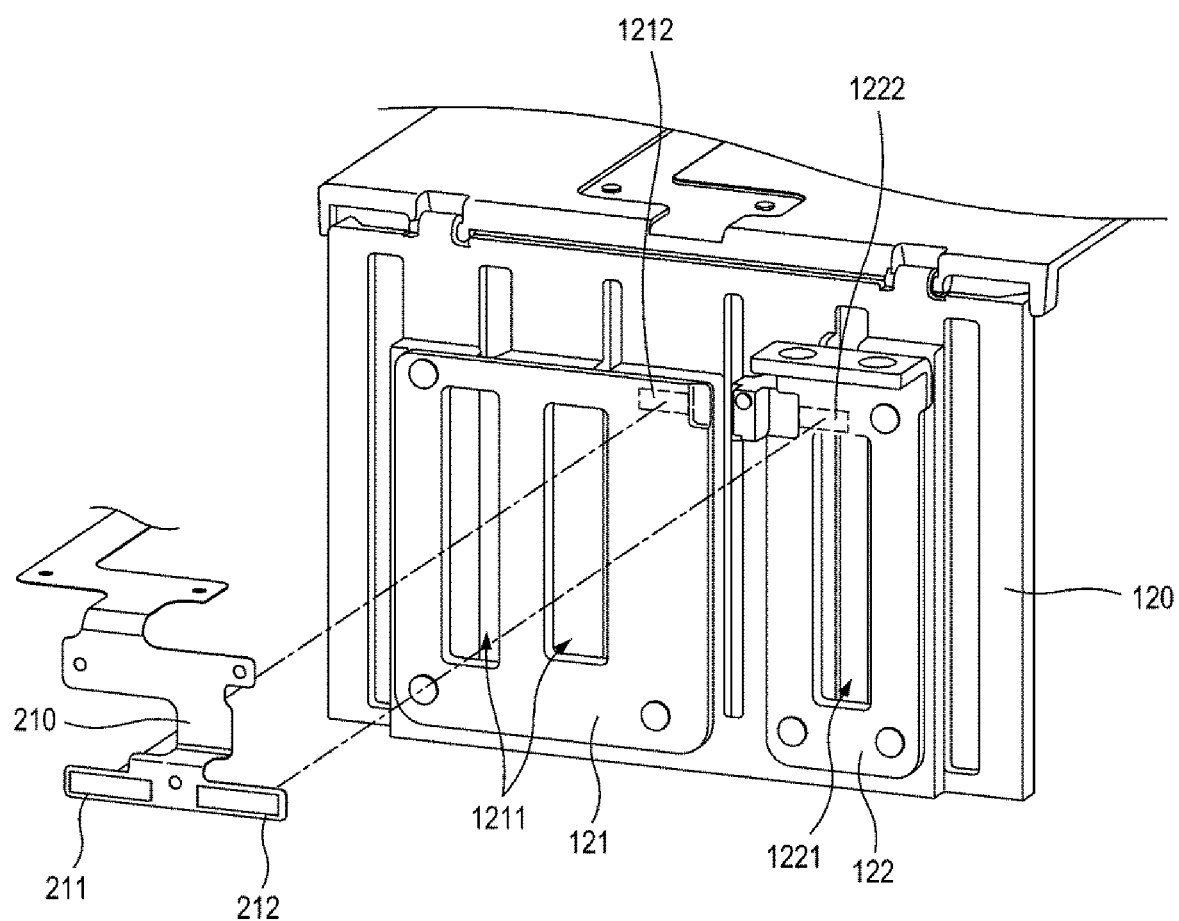
FIG. 5 is an exploded perspective view showing the configuration in which a connection circuit portion of a flexible printed circuit board and a bus bar are disassembled according to a first embodiment.

The above method can reduce the number of welding processes between the tap terminals by more than half, compared with the method in which the battery cells (C) are connected in a line, because the bus bars 121, 122, 131, and 132 are used. In addition, since the battery cell groups are connected in series to each other by the bus bars, it is possible to configure the battery capacity and the output voltage depending on the vehicle type without restriction using the bus bars. Referring to FIGS. 4 and 5, since the bus bars 121 and 122 are directly and electrically connected to the flexible printed circuit board 20, it is possible to sense overvoltage and temperature of the battery cells (C) through the flexible printed circuit board 20.

Referring to FIG. 3, the insulating covers 3 may be interposed between the plurality of bus bars 121, 122, 131, and 132 and the module covers 4, and may be provided on both sides of the frame assembly 1. In addition, the insulating covers 3 may be made of a non-conductive synthetic resin material. Thus, it is possible to prevent a short circuit between the bus bars 122, 124, 132, and 134 and the module covers 4, which are coupled to the frame assembly 1.

Figure 6:
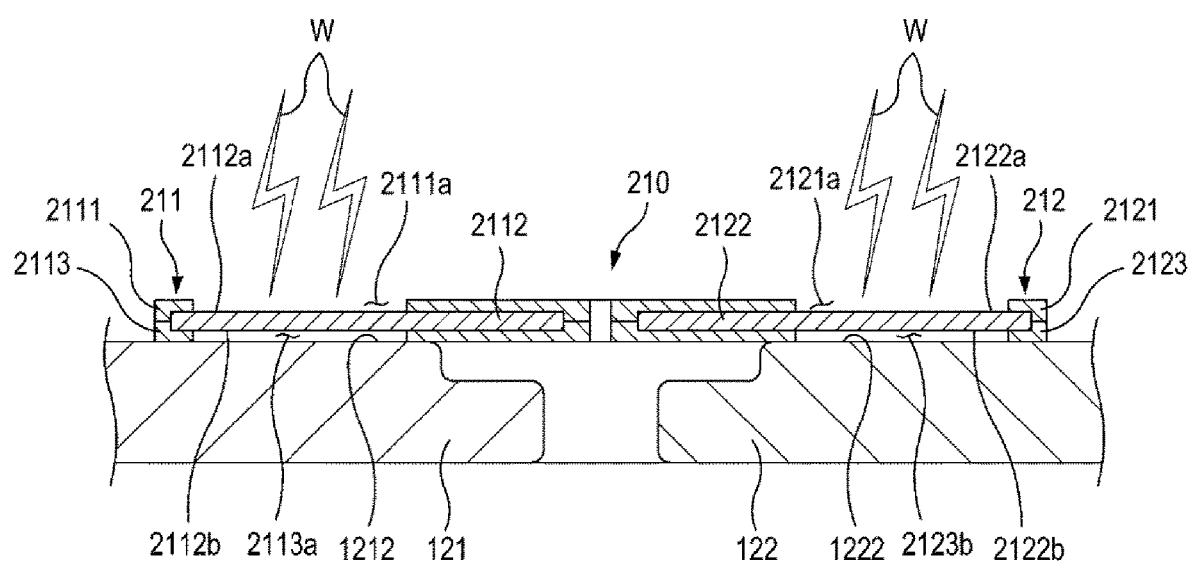
FIG. 6 is a cross-sectional view showing the configuration in which the connection circuit portion and the bus bar are cut in the thickness direction in a state where the connection circuit portion and the bus bar shown in FIG. 5 are bonded to each other.

FIG. 5 is an exploded perspective view showing the configuration in which a connection circuit portion of a flexible printed circuit board 20 and a bus bar are disassembled according to a first embodiment. FIG. 6 is a cross-sectional view showing the configuration in which the connection circuit portion and the bus bar are cut in the thickness direction in a state where the connection circuit portion and the bus bar shown in FIG. 5 are bonded to each other. Descriptions the same as those of the above-described embodiments will be omitted.

Referring to FIG. 5, a plurality of first bus bars 121 and 122 may include a first-a bus bar 121 and a first-b bus bar 122. The first-a bus bar 121 may have two slits 1211 formed therein. In addition, the first-b bus bar 122 may have a single slit 1221 formed therein. The tap terminals of the battery cells (C) may pass through the slits 1211 and 1221.

The first connection circuit portion 210 may include a first-a bonding portion 211 extending in one direction and a first-b bonding portion 212 extending in the opposite direction. The first-a bonding portion 211 may be bonded to the first-a bus bar 121, and the first-b bonding portion 212 may be bonded to the first-b bus bar 122. Referring to FIG. 6, the first-a and first-b bonding portions 211 and 212 may include conductive substrate layers 2112 and 2122 made of a flexible material, first insulating layers 2111 and 2121 provided on one surfaces of the substrate layers 2112 and 2122 and having one or more first openings 2111a and 2121a formed therein such that first surfaces 2112a and 2122a of the substrate layers 2112 and 2122 are exposed therethrough, and second insulating layers 2113 and 2123 provided on the opposite surfaces of the substrate layers 2112 and 2122 and having one or more second openings 2113a and 2123b formed therein such that second surfaces 2112b and 2122b of the substrate layers 2112 and 2122 are exposed therethrough, respectively.

The first connection circuit portion 210 may be bonded to the first bus bars 121 and 122 through the following processes. First, the second surfaces 2112b and 2122b of the first-a and first-b bonding portions 211 and 212 are arranged so as to come into contact with the welding surfaces 1212 and 1222 disposed at the corners of the upper surfaces of the first-a and first-b bus bars 121 and 122, respectively. Next, the first surfaces 2112a and 2122a of the first-a and first-b bonding portions 211 and 212 may be fused by applying a welding process (laser welding, ultrasonic welding, resistance welding, etc.) so that the second surfaces 2112b and 2122b and the welding surfaces 1212 and 1222 may be directly bonded so as to be electrically connected. In an embodiment, the welding surfaces 1212 and 1222 may protrude from the first-a and first-b bus bars 121 and 122, may be recessed therefrom, or may be formed to be even with the portions adjacent to the welding surfaces 1212 and 1222 of the first-a and first-b bus bars 121 and 122.

According to the above-described method, the first-a and first-b bonding portions 211 and 212 and the first-a and first-b bus bars 121 and 122 are directly and electrically connected to each other using at least one of the above-described welding processes, thereby improving the electrical conductivity between the connection circuit portion and the bus bar and enhancing the stability of fixation. In addition, since there is no coupling means, such as a clamp, between the first connection circuit portion 210 and the bus bars 121 and 122, the stability against electrical contact may be improved, and the number of parts may be reduced, thereby reducing costs and processes. Further, since both surfaces of the substrate layers 2112 and 2122 are exposed, it is possible to secure a structure in which the connection circuit portion can be directly coupled to the bus bar, and to reduce the number of applied parts, work processes, weights, and costs.

Referring to FIGS. 5 and 6, although the welding process between the first connection circuit portion 210 and the first bus bars 121 and 122 has been described, the same welding process may be applied to the welding between the second connection circuit portion 220 and the second bus bars 131 and 132. Thus, an identical description related thereto will be omitted.

Figure 7:
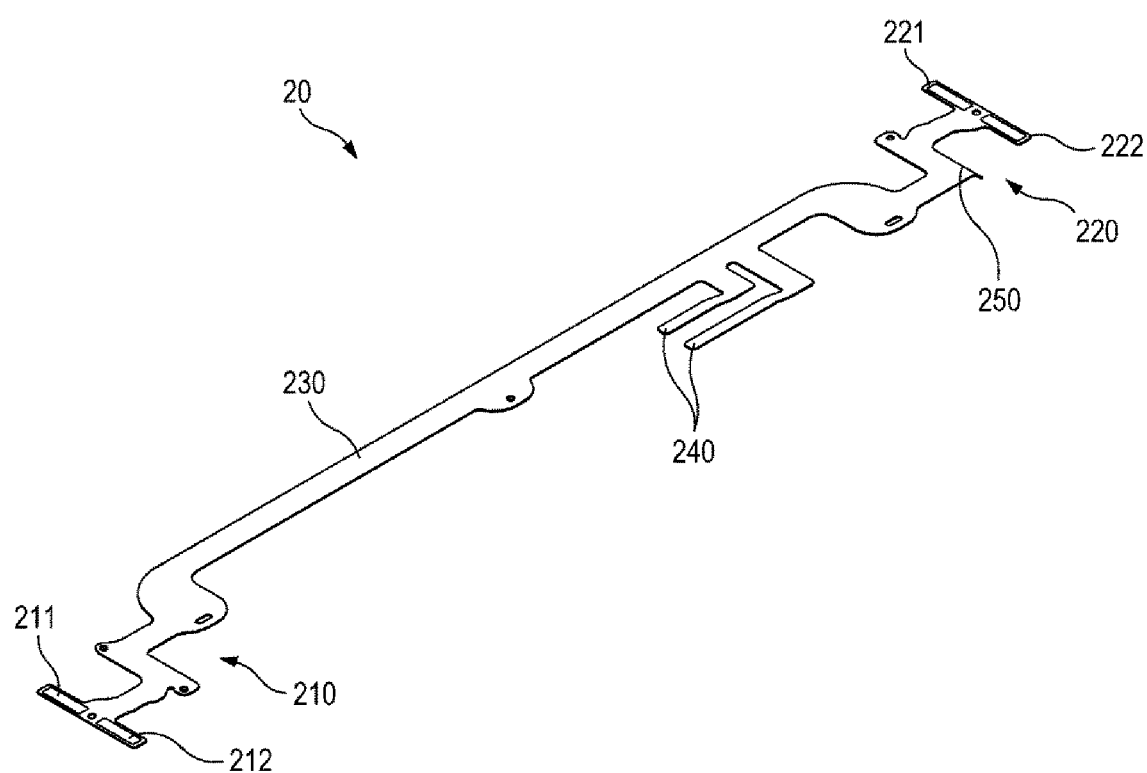
FIG. 7 is a perspective view showing the configuration in which a connection circuit portion of a flexible printed circuit board and a bus bar are bonded to each other according to a first embodiment.

FIG. 7 is a perspective view showing the overall configuration of a flexible printed circuit board according to an embodiment of the present disclosure.

Referring to FIGS. 3 and 4, the flexible printed circuit board 20 may be arranged so as to come into contact with the first to third frames 110, 120, and 130. The flexible printed circuit board 20 may include a substrate layer of a conductive metal material and an insulating layer of a non-conductive synthetic resin material. The flexible printed circuit board 20 may be configured such that a conductive substrate layer is surrounded by a non-conductive insulating layer, and may be formed to be somewhat thin (for example, 2 mm or less) in order to be flexible.

Referring to FIGS. 3 and 4, the flexible printed circuit board 20 may be arranged along the upper surface and both lateral surfaces of the frame 10. In an embodiment, the flexible printed circuit board 20 may include a circuit portion 230 arranged in the first frame 110, a first connection circuit portion 210 extending from one end of the circuit portion 230 and connected to the plurality of first bus bars 121 and 122, and a second connection circuit portion 220 extending from the opposite end of the circuit portion 230 and connected to the plurality of second bus bars 131 and 132. In addition, the first connection circuit portion 210 may include a 1ath bonding portion 211 extending in one direction and a 1bth bonding portion 212 extending in the opposite direction. Further, the second connection circuit portion 220 may include a 2ath bonding portion 221 extending in one direction and a 2bth bonding portion 222 extending in the opposite direction.

In an embodiment, the flexible printed circuit board 20 may include a temperature sensor portion 240 extending from the circuit portion 230 and having a temperature sensor fixed thereto. In addition, the flexible printed circuit board 20 may include a terminal portion 250 extending from the circuit portion 230, which is adjacent to the second connection circuit portion 220. The connector 5 shown in FIG. 3 may be directly coupled to the terminal portion 250.

Figure 8:
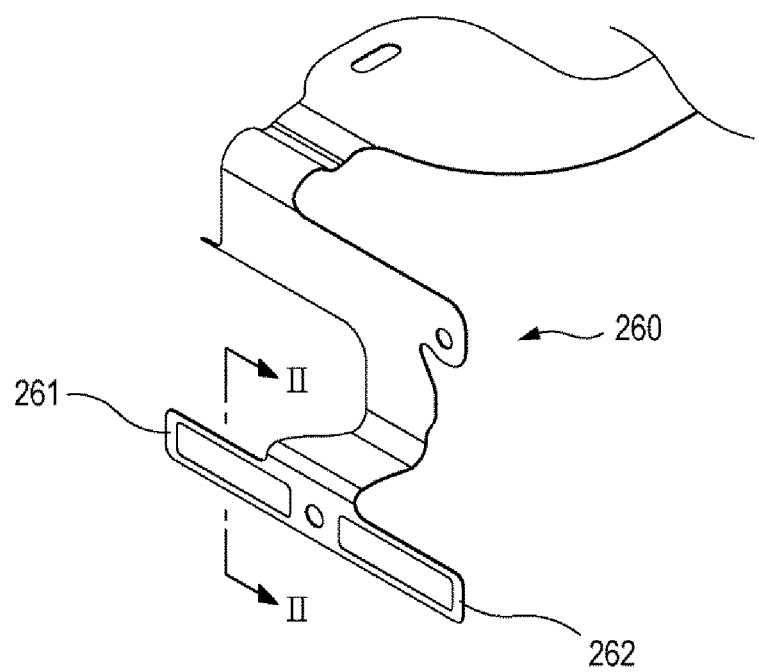
FIG. 8 is a perspective view showing a connection circuit portion of a flexible printed circuit board according to a second embodiment.
Figure 9:
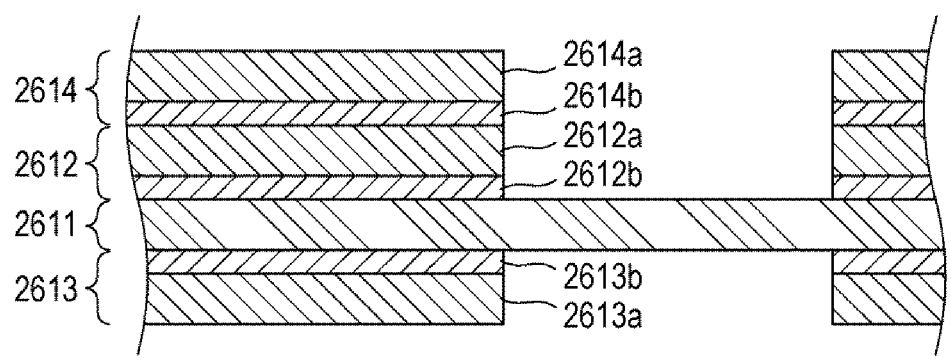
FIG. 9 is a cross-sectional view of the connection circuit portion taken along the line II-II in FIG. 8.

FIG. 8 is a perspective view showing a connection circuit portion 260 of a flexible printed circuit board according to a second embodiment, and FIG. 9 is a cross-sectional view of the connection circuit portion 260 taken along the line II-II in FIG. 8. Descriptions the same as those of the above-described embodiments will thus be omitted.

The connection circuit portion 260 may include a first bonding portion 261 extending in one direction such that both sides thereof are exposed and a second bonding portion 262 extending in the opposite direction such that both sides thereof are exposed. The connection circuit portion 260 may include a substrate layer 2611 made of a conductive material and insulating layers 2612, 2613, and 2614 made of a non-conductive material so as to surround the substrate layer 2611. In addition, the conductive material may include copper, and the non-conductive material may include a PEN or PI material.

In an embodiment, the insulating layers 2612, 2613, and 2614 may include a first insulating layer 2612 attached to one surface of the substrate layer 2611, a second insulating layer 2613 attached to the opposite surface of the substrate layer 2611, and a third insulating layer 2614 attached onto the first insulating layer 2612. Each of the first to third insulating layers 2612, 2613, and 2614 may include non-conductive layers 2612a, 2613a, and 2614a and bonding layers 2612b, 2613b, and 2614b for bonding the same.

In another embodiment, the number or arrangement of stacked layers may be varied depending on the work processes of the frame assembly or the tensile strength required for the connection circuit portion 260. For example, two insulating layers may be additionally provided on the opposite surface of the substrate layer 2611.

According to an embodiment, since the first and third insulating layers 2612 and 2614 are provided on one surface of the substrate layer 2611 and the second insulating layer 2613 is provided on the opposite surface of the substrate layer 2611, it is possible to reduce the possibility of breakage of the connection circuit portion 260 due to tension, compared to the configuration in which a single insulating layer is provided on each surface of the substrate layer 2611. In addition, if an external force is applied to the connection circuit portion 260 in the process of transferring or assembling the frame assembly, a part of the connection circuit portion 260 having a single insulating layer is likely to break. Therefore, it is possible to enhance the tensile force of the connection circuit portion 260 by providing two insulating layers to one surface of the connection circuit portion 260. In addition, since the cover layer having a double structure covers the substrate layer in the flexible printed circuit board, reliability of the tensile force of the circuit portion can be secured, and breakage thereof can be prevented.

A method of providing two insulating layers to one surface of a substrate layer as described in the above embodiment may be applied to a connection circuit portion 260 that is susceptible to breakage. In addition, the method may be applied to the entire flexible printed circuit board 20, as well as the connection circuit portion 260, depending on the characteristics of the vehicle and the cost of manufacturing the vehicle. The openings formed in the insulating layers 2612, 2613, and 2614 may be formed so as to expose both surfaces of the substrate layer 2611 as shown in FIG. 9. Therefore, it is possible to secure a structure in which the circuit portion may be directly bonded to the bus bar, and it is possible to reduce the number of applied parts, work processes, weight, and cost.

Figure 10:
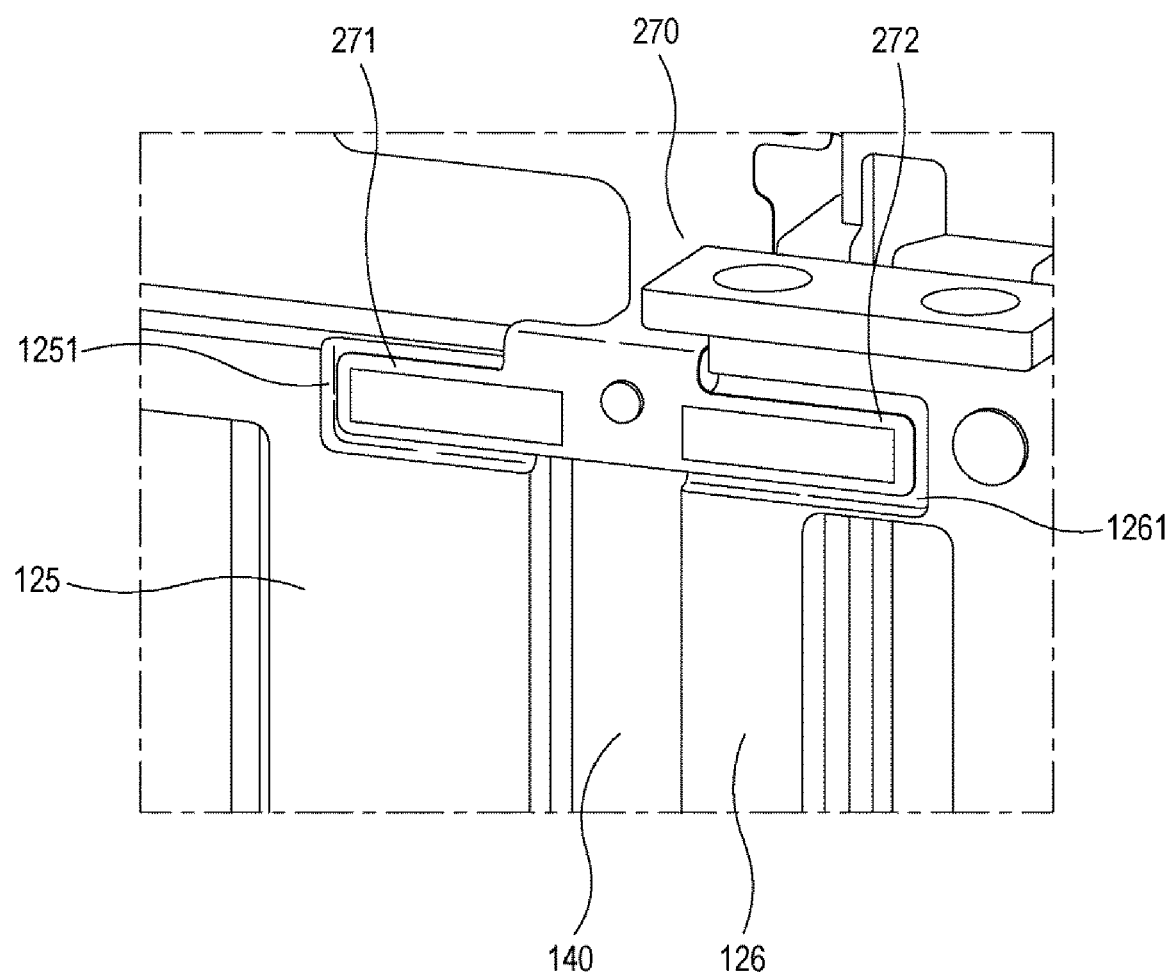
FIG. 10 is a perspective view showing the configuration in which a connection circuit portion and a bus bar are bonded to each other according to a third embodiment.
Figure 11:
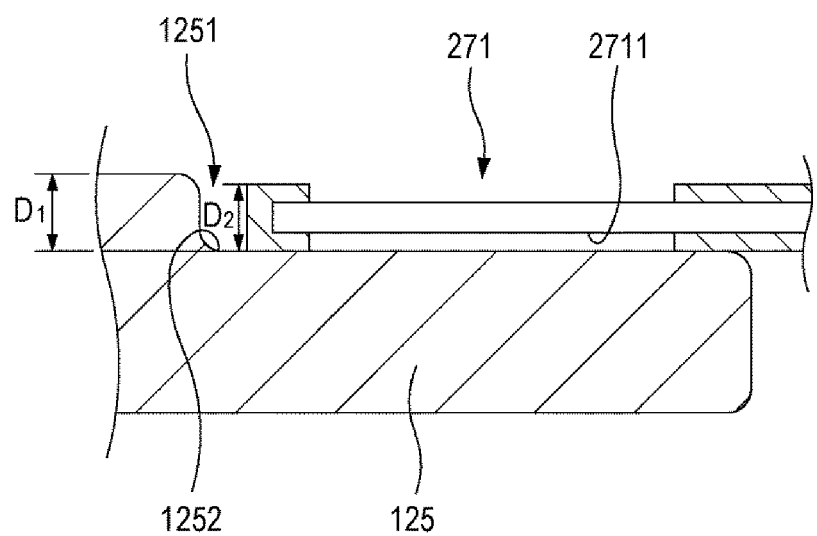
FIG. 11 is a cross-sectional view showing the configuration in which a connection circuit portion and a bus bar are bonded to each other according to a third embodiment.

FIG. 10 is a perspective view showing the configuration in which a connection circuit portion 270 and a bus bar 125 are bonded to each other according to a third embodiment, and FIG. 11 is a cross-sectional view showing the configuration in which a connection circuit portion 270 and a bus bar 125 are bonded to each other according to a third embodiment. Descriptions the same as those of the above embodiments will be omitted.

The connection circuit portion 270 may include a first bonding portion 271 extending in one direction such that both surfaces thereof are exposed and a second bonding portion 272 extending in the direction opposite the one direction such that both surfaces thereof are exposed. In an embodiment, the bus bars 125 and 126 may have recesses 1251 and 1261 configured to receive the first and second bonding portions 271 and 272, respectively. The recesses 1251 and 1261 may be shaped so as to be bent toward the side frame 140, and may have sizes corresponding to the first and second bonding portions 271 and 272.

In an embodiment, the depth D1 of the recesses 1251 and 1261 may be configured to be greater than the thickness D2 of the first and second bonding portions 271 and 272. The lower surface 2711 of the first bonding portion 271 may be bonded to the upper surface 1252 of the recess 1251, and the lower surface of the second bonding portion 272 may also be bonded to the upper surface of the recess 1261. Thus, in the state in which the first and second bonding portions 271 and 272 are bonded to the recesses 1251 and 1261, it is possible to reduce damage to the first and second bonding portions 271 and 272, which is caused in the process of transferring or assembling the frame assembly.

According to the above-described embodiment, a positioning structure capable of receiving a circuit portion is provided in a bus bar. Thus, since the operator may easily identify the welding position with the naked eye, it is possible to improve workability. In addition, the circuit portion can be placed at the correct position, thereby enhancing quality.

Figure 12:
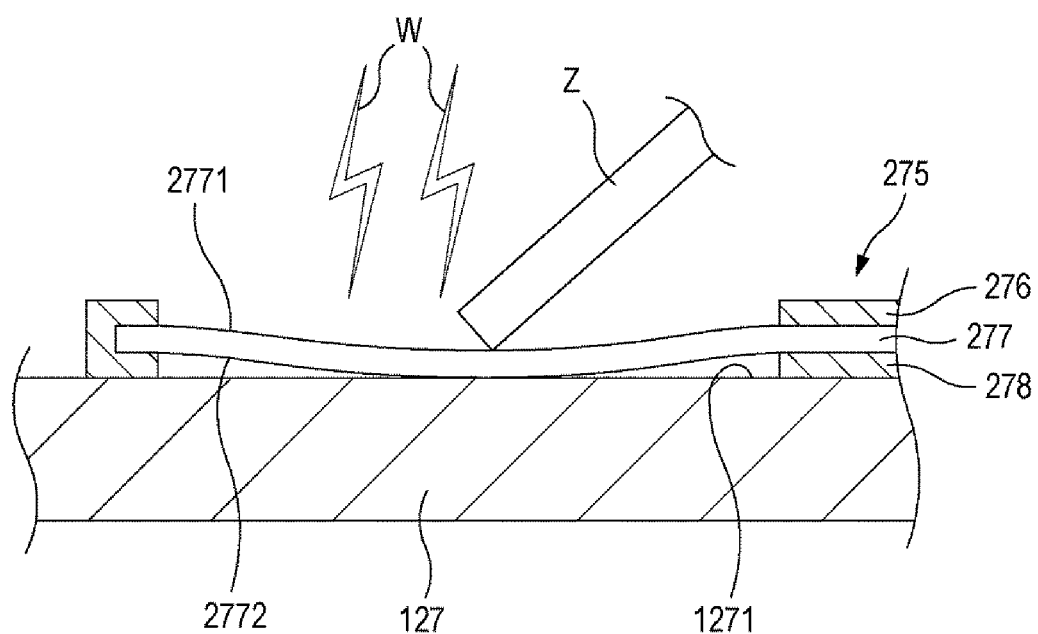
FIG. 12 is a cross-sectional view showing a process of welding a connection circuit portion to a bus bar using a jig according to a fourth embodiment.

FIG. 12 is a cross-sectional view showing a process of welding a connection circuit portion 275 to a bus bar 127 using a jig according to a fourth embodiment. Descriptions the same as those of the above-described embodiments will be omitted.

The connection circuit portion 275 may include a substrate layer 277, a first insulating layer 276 attached to the upper surface 2771 of the substrate layer 277, and a second insulating layer 278 attached to the lower surface 2772 of the substrate layer 277. A gap (G) (i.e., an air gap) having a size corresponding to the thickness of the second insulating layer 278 may be formed between the lower surface 2772 of the substrate layer 277 and the upper surface 1271 of the bus bar 127 in the state in which the connection circuit portion 275 is placed on the bus bar 127. Therefore, if a welding process, such as welding (W), is performed on the upper surface 2771 of the substrate layer 277 in the presence of the gap (G), a required level of welding quality may not be obtained. In addition, if there is a portion of the lower surface 2772 of the substrate layer 277 that is not in contact with the upper surface 1271 of the bus bar 127, the portion of the substrate layer 277 to which the welding process (W) is applied may be blackened, or the insulating layer may be burnt.

In an embodiment, the connection circuit portion 270 is arranged to come into contact with the bus bar 127, and then the upper surface 2771 of the substrate layer 277 may be pressed using a jig (Z). In this state, since the gap (G) between the substrate layer 277 and the bus bar 127 is eliminated, the contact area between the lower surface 2772 of the substrate layer 277 and the upper surface 1271 of the bus bar 127 may be increased. In addition, if the welding process (W) is applied to the upper surface 2771 of the substrate layer 277 while the substrate layer 277 is pressed by the jig (Z), the welding performance and the workability may be improved.

Figure 13:
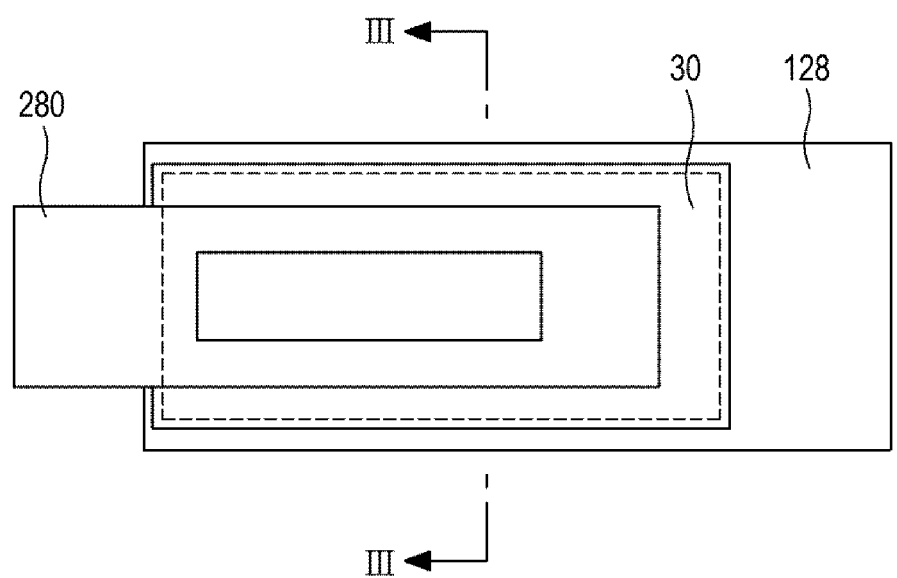
FIG. 13 is a top view showing the configuration in which a connection circuit portion and a bus bar are processed with conformal coating in the state in which the connection circuit portion and the bus bar are bonded to each other according to a fourth embodiment.
Figure 14:
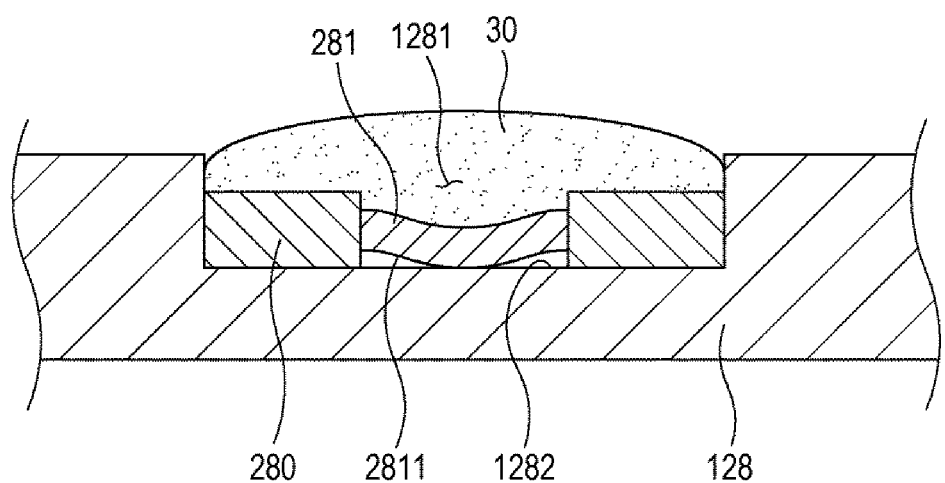
FIG. 14 is a cross-sectional view showing the configuration processed with conformal coating, taken along the line III-III in FIG. 13.

FIG. 13 is a top view showing the configuration in which a connection circuit portion 280 and a bus bar 128 are processed with conformal coating in the state in which they are bonded to each other according to a fourth embodiment, and FIG. 14 is a cross-sectional view showing the configuration processed with conformal coating, taken along the line III-III in FIG. 13.

In an embodiment, in the state in which the connection circuit portion 280 is bonded to the bus bar 128, a conformal coating process may be performed so as to cover the connection circuit portion 280 and the surrounding area of the connection circuit portion 280 (i.e., a portion of the bus bar 128 in the area surrounding the connection circuit portion 280). A conformal coating layer 30 may be formed of a non-conductive material, and may include, for example, materials such as acrylic, urethane, and the like. In addition, the conformal coating layer 30 may be coated only in a required area using a nozzle (not shown).

Referring to FIG. 14, first, the connection circuit portion 280 is placed in a recess 1281 formed in the bus bar 128. Next, the lower surface 2811 of a substrate layer 281 of the connection circuit portion 280 and the upper surface 1282 of the bus bar 128 are bonded to each other. Thereafter, a conformal coating process is conducted on the connection circuit portion 280, thereby forming a conformal coating layer 30. As described above, if the conformal coating layer 30 is formed on the connection circuit portion 280, it is possible to prevent corrosion of the substrate layer 281 and to protect the connection circuit portion 280 and the bus bar 128. In addition, the welding strength between the connection circuit portion 280 and the bus bar 128 can be improved.

Figure 15:
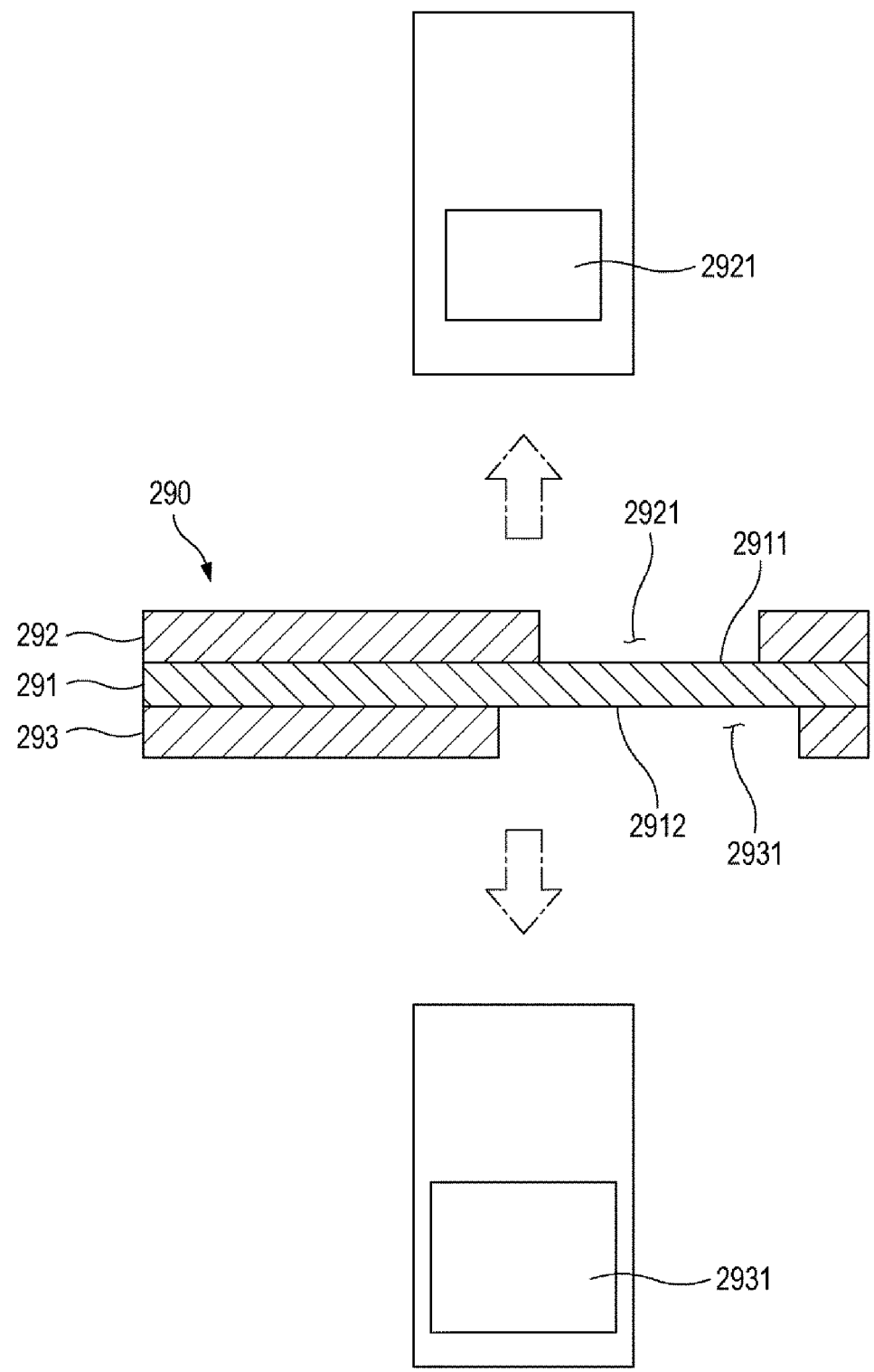
FIG. 15 is a cross-sectional view showing the configuration in which openings formed in a first insulating layer and a second insulating layer of a connection circuit portion have different sizes from each other according to a fifth embodiment.

FIG. 15 is a cross-sectional view showing the configuration in which openings formed in first and second insulating layers 292 and 293 of a connection circuit portion 290 have different sizes from each other according to a fifth embodiment.

In an embodiment, the connection circuit portion 290 may include a conductive substrate layer 291 formed of a flexible material, a first insulating layer 292 provided on one surface of the substrate layer 291 and having at least one first opening 2921 formed therein so as to expose a first surface 2911 of the substrate layer 291, and a second insulating layer 293 provided on the opposite surface of the substrate layer 291 and having at least one second opening 2931 formed in the side opposite the first opening 2921 with respect to the substrate layer 291 so as to expose a second surface 2912 of the substrate layer 291. The first insulating layer 292 may be arranged to face the bus bar, and the second insulating layer 293 may be arranged toward the outside of the bus bar.

The second opening 2931 may be formed to be larger than the first opening 2921. In addition, the area of the first surface 2911 may be smaller than the area of the second surface 2912. Thus, a portion of the first insulating layer 292 may partially overlap the area of the second opening 2931 in the cross section of the connection circuit portion 290. The substrate layer 291 may be bent toward the bus bar when welding the connection circuit portion 290 to the bus bar, which may cause detachment between the substrate layer 291 and the first insulating layer 292. In addition, the boundary of the first surface 2911 of the substrate layer 291 in the connection circuit portion 290 may be more likely to be damaged. Therefore, by reducing the area of the first surface 2911 that is exposed by the first insulating layer 292, it is possible to increase the rigidity of the connection circuit portion 290, thereby preventing breakage of the connection circuit portion 290.

Figure 16:
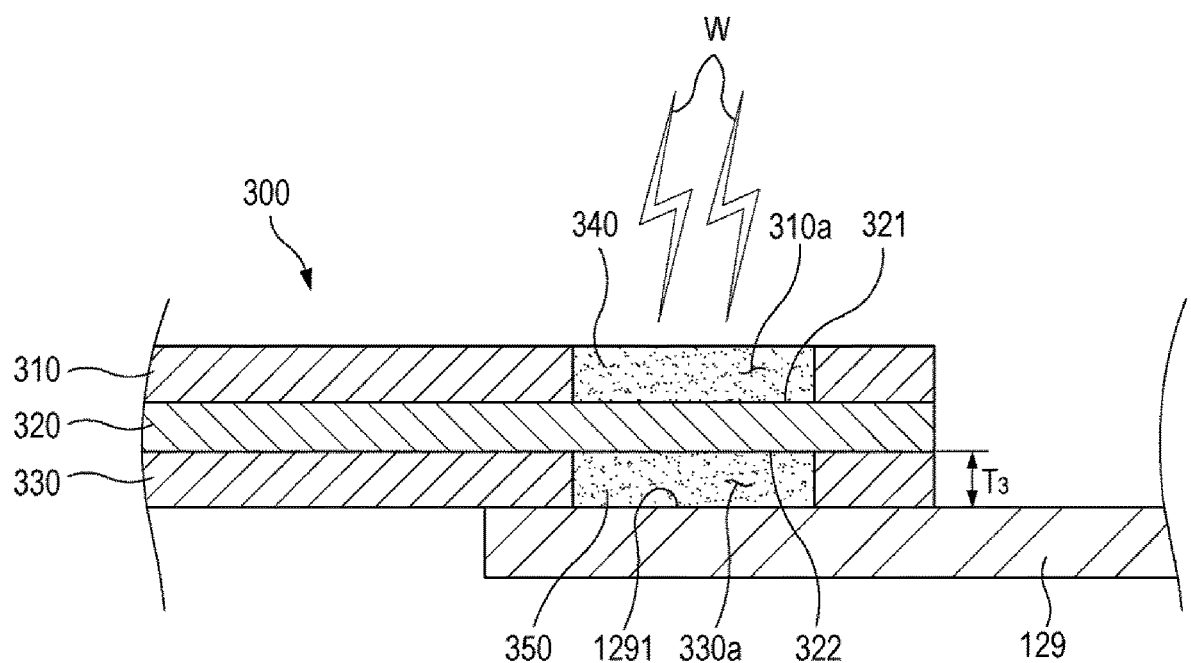
FIG. 16 is a cross-sectional view showing the configuration in which plating layers are formed on a substrate layer of a connection circuit portion according to a sixth embodiment.

FIG. 16 is a cross-sectional view showing the configuration in which plating layers 340 and 350 are formed on a substrate layer 320 of a connection circuit portion 300 according to a sixth embodiment.

The connection circuit portion 300 may include a substrate layer 320, a first insulating layer 310, and a second insulating layer 330 provided to face the bus bar 129. The first insulating layer 310 may have a first opening 310a formed therein so as to expose a first surface 321 of the substrate layer 320. The second insulating layer 330 may have a second opening 330a formed therein so as to expose a second surface 322 of the substrate layer 320. In an embodiment, a second plating layer 350 may be plated in the second opening 330a so as to cover at least a portion of the second surface 322. In addition, a first plating layer 340 may be plated in the first opening 310a so as to cover at least a portion of the first surface 321. The first and second plating layers 340 and 350 may be formed of a conductive material, and may be formed of, for example, the same material as the substrate layer 320.

In the state in which the connection circuit portion 300 is in contact with the bus bar 129, the second plating layer 350 may fill in the air gap between the substrate layer 320 and the bus bar 129. In addition, the second plating layer 350 may have a thickness corresponding to the thickness T3 of the second insulating layer 330. Therefore, in the case of applying a welding process (W) to the first plating layer 340 or the first surface 321, the second plating layer 350 may be bonded to the upper surface 1291 of the bus bar 129 without performing a process of bending the substrate layer 320 using a jig.

Figure 17:
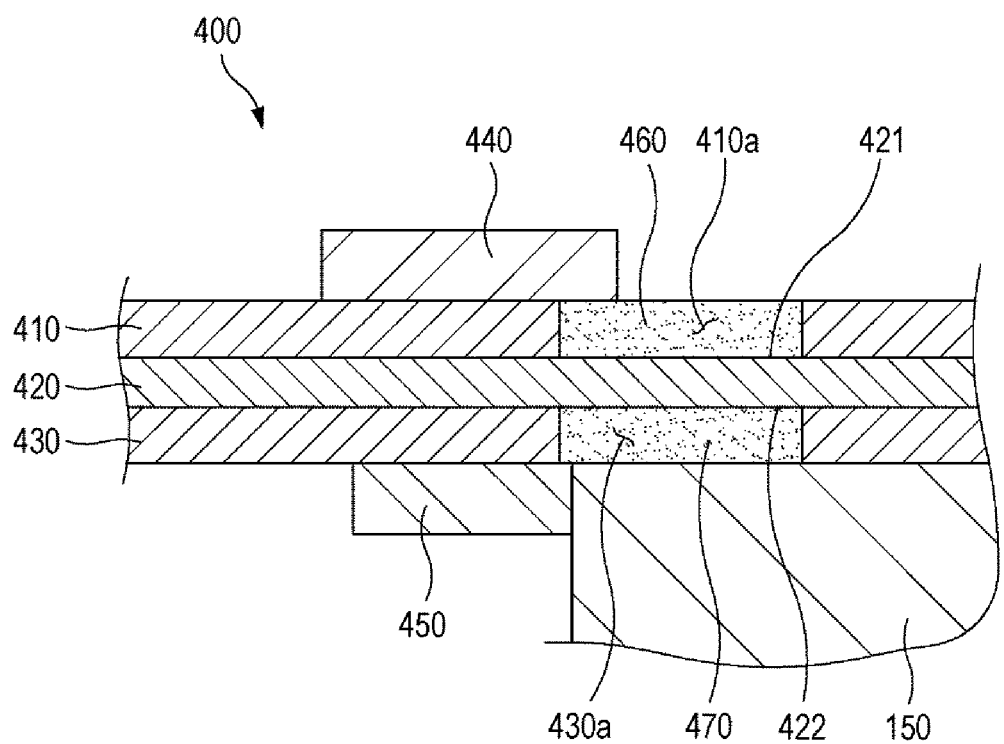
FIG. 17 is a cross-sectional view showing the configuration in which third and fourth insulating layers are stacked on first and second insulating layers of a connection circuit portion, respectively, according to a seventh embodiment.

FIG. 17 is a cross-sectional view showing the configuration in which third and fourth insulating layers 440 and 450 are stacked on first and second insulating layers 410 and 430 of a connection circuit portion 400, respectively, according to a seventh embodiment.

The connection circuit portion 400 may include a substrate layer 420, a first insulating layer 410 provided on one surface of the substrate layer 420 and having at least one first opening 410a formed therein so as to expose a first surface 421 of the substrate layer 420, and a second insulating layer 430 provided on the opposite surface of the substrate layer 420 and having at least one second opening 430a formed therein so as to expose a second surface 422 of the substrate layer 420. In addition, first and second plating layers 460 and 470 may be plated on at least a portion of the first surface 421 and the second surface 422, which are exposed through the first and second openings 410a and 430a.

In an embodiment, the connection circuit portion 400 may further include a third insulating layer 440 attached to a portion of the first insulating layer 410 and a portion of the first plating layer 460 adjacent to the portion of the first insulating layer 410, and a fourth insulating layer 450 attached to a portion of the second insulating layer 430 and a portion of the second plating layer 470 adjacent to the portion of the second insulating layer 430.

The third insulating layer 440 may be closely attached to the area where the first insulating layer 410 and the first plating layer 460 are in contact with each other, and the fourth insulating layer 450 may be closely attached to the area where the second insulating layer 430 and the second plating layer 470 are in contact with each other. That is, portions of the third and fourth insulating layers 440 and 450 may be configured to cover the edges of the first and second plating layers 460 and 470. Thus, portions of the third and fourth insulating layers 440 and 450 may partially overlap the area in which the first and second plating layers 460 and 470 are formed in the cross section of the connection circuit portion 400.

The end of the fourth insulating layer 450 may be disposed in contact with the end of the bus bar 150. In the process of welding the second plating layer 470 to the bus bar 150, cracks may occur between the first plating layer 460 and the first insulating layer 410 and between the second plating layer 470 and the second insulating layer 430. However, since the third and fourth insulating layers 440 and 450 cover portions of the first and second plating layers 460 and 470, it is possible to prevent the occurrence of cracks described above. In addition, the third and fourth insulating layers 440 and 450 may serve as reinforcing members for improving the bending strength of the connection circuit portion 400, and may prevent disconnection of the substrate layer 420.

Figure 18:
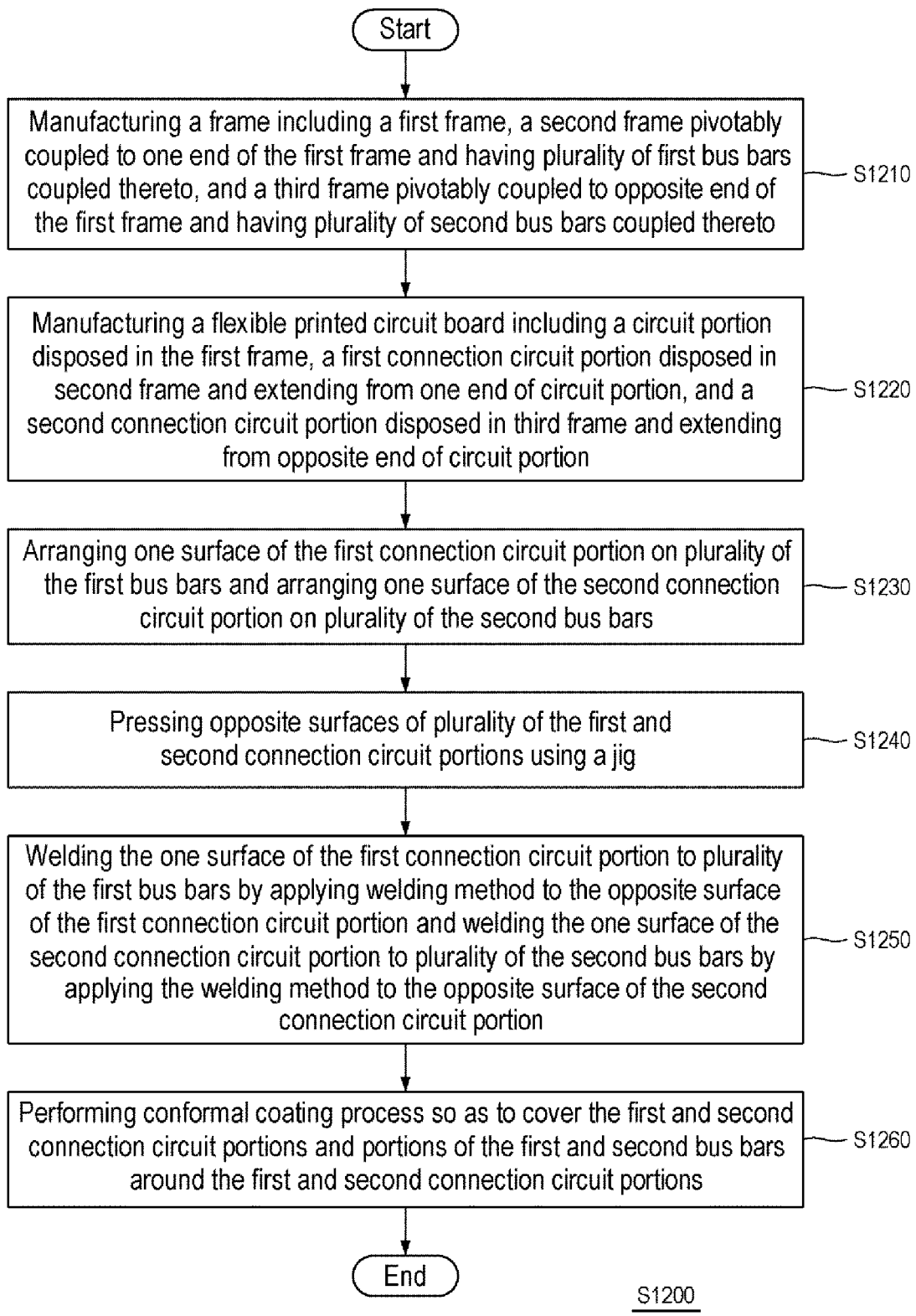
FIG. 18 is a flowchart showing a method of manufacturing a frame assembly according to an eighth embodiment.

FIG. 18 is a flowchart showing a method of manufacturing a frame assembly (S1200) according to an eighth embodiment. Descriptions the same as those of the above-described embodiments will be omitted.

The method of manufacturing a frame assembly (S1200) may include a step of manufacturing a frame including a first frame, a second frame pivotably coupled to one end of the first frame and having a plurality of first bus bars coupled thereto, and a third frame pivotably coupled to the opposite end of the first frame and having a plurality of second bus bars coupled thereto (S1210), a step of manufacturing a flexible printed circuit board including a circuit portion provided in the first frame, a first connection circuit portion provided in the second frame and extending from one end of the circuit portion, and a second connection circuit portion provided in the third frame and extending from the opposite end of the circuit portion (S1220), a step of disposing one surface of the first connection circuit portion on a plurality of first bus bars and disposing one surface of the second connection circuit portion on a plurality of second bus bars (S1230), and a step of welding the one surface of the first connection circuit portion to the plurality of first bus bars by applying a welding method to the opposite surface of the first connection circuit portion and welding the one surface of the second connection circuit portion to the plurality of second bus bars by applying a welding method to the opposite surface of the second connection circuit portion (S1250).

In an embodiment, the method of manufacturing the assembly (S1200) may further include a step of pressing the opposite surfaces of the plurality of first and second connection circuit portions using a jig (S1240) and a step of performing a conformal coating process so as to cover the first and second connection circuit portions and portions of the first and second bus bars around the first and second connection circuit portions, respectively (S1260).

Figure 19:
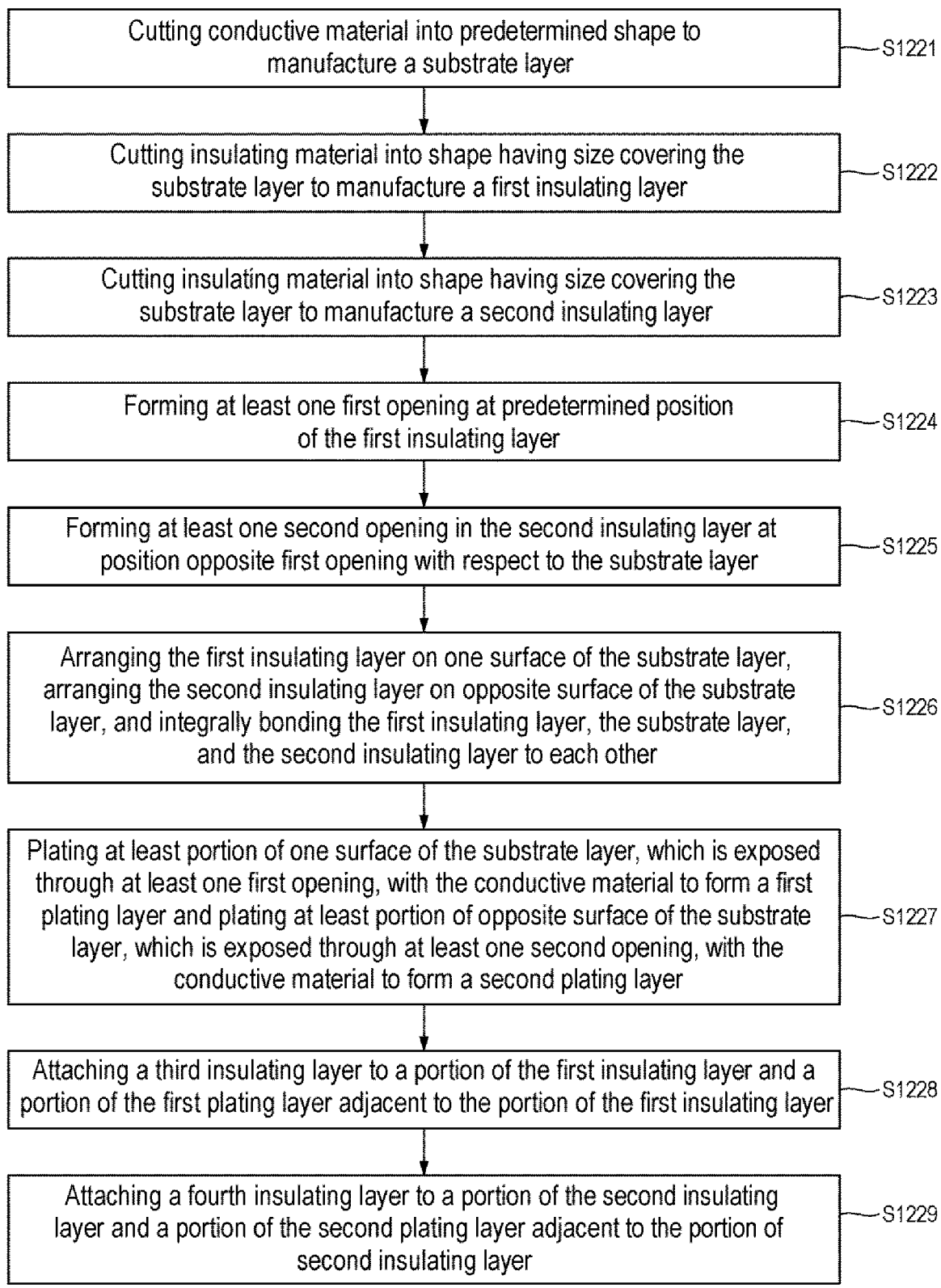
FIG. 19 is a flowchart showing steps of manufacturing a flexible printed circuit board in the method of manufacturing the frame assembly shown in FIG. 18.

FIG. 19 is a flowchart showing the step of manufacturing a flexible printed circuit board (S1220) in the method of manufacturing the frame assembly (S1200) shown in FIG. 18.

The step of manufacturing a flexible printed circuit board (S1220) may include a step of cutting a conductive material into a predetermined shape to manufacture a substrate layer (S1221), a step of cutting an insulating material into a shape having a size covering the substrate layer to manufacture a first insulating layer (S1222), a step of cutting an insulating material into a shape having a size covering the substrate layer to manufacture a second insulating layer (S1223), a step of forming at least one first opening at a predetermined position of the first insulating layer (S1224), a step of forming at least one second opening in the second insulating layer at a position opposite the first opening with respect to the substrate layer (S1225), and a step of disposing the first insulating layer on one surface of the substrate layer and disposing the second insulating layer on the opposite surface of the substrate layer and integrally bonding the first insulating layer, the substrate layer, and the second insulating layer to each other (S1226).

In an embodiment, the step of manufacturing a flexible printed circuit board (S1220) may include a step of plating at least a portion of one surface of the substrate layer, which is exposed through at least one first opening, with a conductive material to form a first plating layer and plating at least a portion of the opposite surface of the substrate layer, which is exposed through at least one second opening, with a conductive material to form a second plating layer (S1227), a step of attaching a third insulating layer to a portion of the first insulating layer and a portion of the first plating layer adjacent to the portion of the first insulating layer (S1228), and a step of attaching a fourth insulating layer to a portion of the second insulating layer and a portion of the second plating layer adjacent to the portion of the second insulating layer (S1229).

Figure 20:
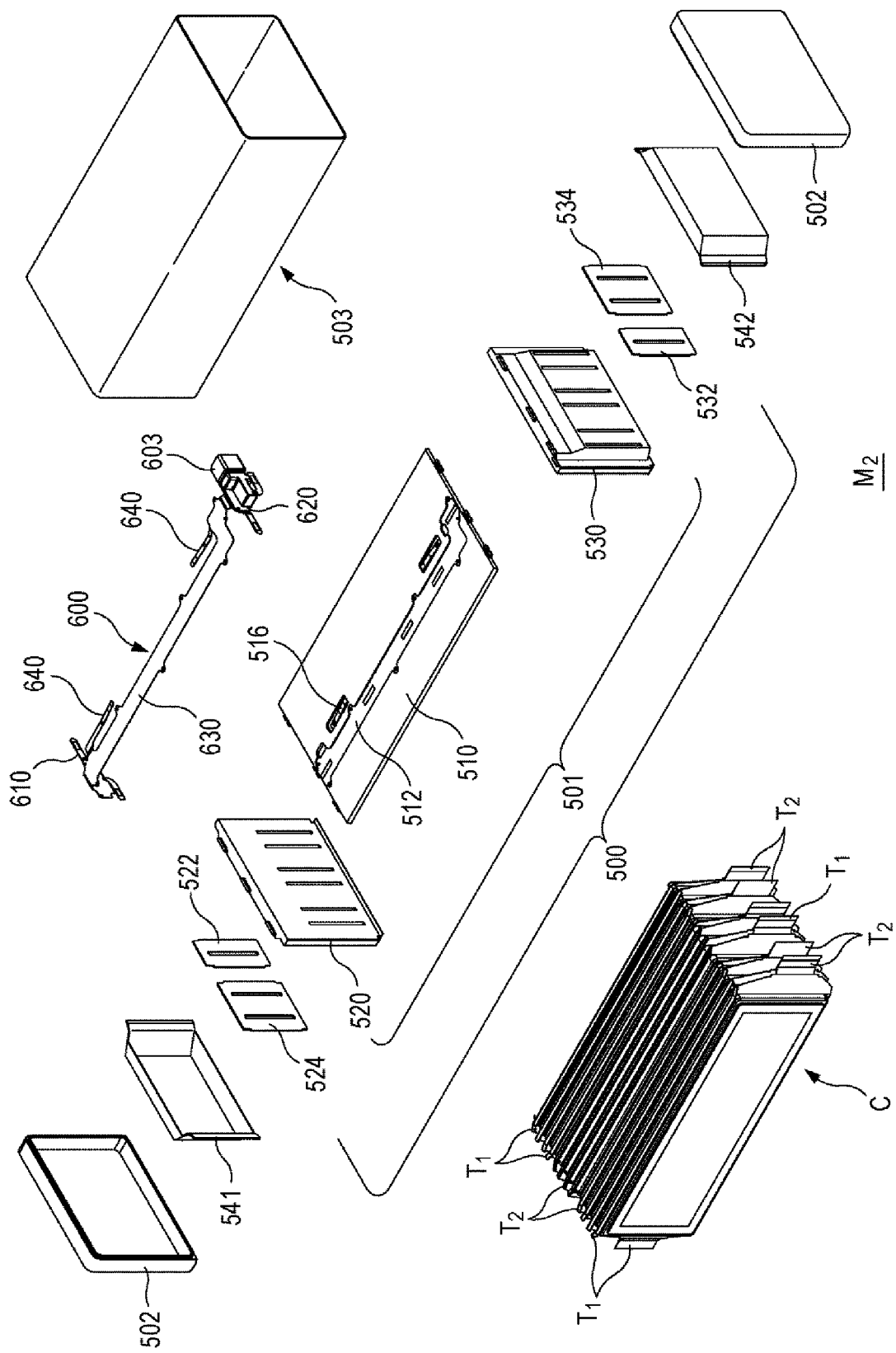
FIG. 20 is an exploded perspective view of a battery module according to a ninth embodiment.

FIG. 20 is an exploded perspective view of a battery module (M2) according to a ninth embodiment. Descriptions the same as those made in the above-described embodiments will be omitted.

The battery module (M2) may include a plurality of stacked battery cells (C), a frame assembly 500 for fixing the same, module covers 502, insulating covers 541 and 542, and a housing 503. The insulating covers 541 and 542 may be interposed between a plurality of first and second bus bars 522, 524, 532, and 534 and the module covers 502.

The frame assembly 500 may include a frame 501, a plurality of first and second bus bars 522, 524, 532, and 534, a flexible printed circuit board 600, and a connector 603. The frame 501 may be configured to surround an upper surface and both lateral surfaces of the plurality of battery cells (C). The frame 501 may include a first frame 510 configured to cover the upper surface of the plurality of battery cells (C), a second frame 520 coupled to one side of the first frame 510 and configured to cover one lateral surface of the plurality of battery cells (C), and a third frame 530 coupled to the opposite side of the first frame 510 and configured to cover the opposite lateral surface of the plurality of battery cells (C).

The plurality of first and second bus bars 522, 524, 532, and 534 may be disposed on the portions of the frame 501 that cover both of the lateral surfaces of the plurality of battery cells (C), and may be configured to be bonded to terminals of the plurality of battery cells (C). The first bus bars 522 and 524 may be disposed on the second frame 520, and the second bus bars 532 and 534 may be disposed on the third frame 530.

Referring to FIG. 20, terminals of neighboring battery cells (C), among a plurality of battery cells (C), may be connected. For example, if the terminals of the plurality of battery cells (C) having the same polarity are connected to each other, the neighboring battery cells (C) may be electrically connected in parallel to each other. In this case, the terminals of the same polarity may be connected to each other by surface welding.

In an embodiment, the terminals of the same polarity of N (N≥2, integer) battery cells, which are adjacent to each other in a plurality of battery cells (C), may be connected in parallel, thereby forming one terminal pair. The battery cells connected in parallel through one terminal pair may constitute one battery group, and a plurality of battery groups may be referred to as "multiple battery groups". For example, in the case where 12 battery cells are stacked, referring to FIG. 3, two battery cells may be connected in parallel (terminals of two battery cells having the same polarity are directly connected to each other), thereby constituting six battery groups. Therefore, the plurality of battery cells (C) is configured to include multiple battery groups. Although the plurality of battery cells (C) includes 12 stacked battery cells in FIG. 3, any number of battery cells may be stacked. In addition, FIG. 3 illustrates the plurality of battery cells (C) in which two battery cells are connected in parallel to constitute six battery groups, but the present disclosure is not limited thereto, and three or more battery cells may be connected in parallel, thereby constituting multiple battery groups.

The terminals of the multiple battery groups may be connected in series through a plurality of first and second bus bars 522, 524, 532, and 534. According to an embodiment, the terminals of multiple battery groups may be bonded to the bus bars so as to be connected in series, and the detailed technical configuration thereof will be described later. With this configuration, multiple battery groups may be connected in series to generate the output voltage of the battery module (M).

The flexible printed circuit board 600 may include a first circuit portion 610, a second circuit portion 620, a middle portion 630 connecting the first circuit portion and the second circuit portion, and a temperature sensor portion 640 extending from the middle portion 630. In addition, the flexible printed circuit board 600 is disposed along the upper surface and both of the lateral surfaces of the frame 501, and is electrically connected to the first and second bus bars 522, 524, 532, and 534, thereby sensing a plurality of battery cells. The flexible printed circuit board 600 may be provided along the first to third frames 510, 520, and 530, and may be disposed in contact with the first to third frames 510 to 530.

The first frame 510 may have a path groove 512 formed therein to receive the middle portion 630 of the flexible printed circuit board 20. In addition, the first frame 510 may have a pressing member 516 formed therein to bias the temperature sensor portion 640 toward the battery cell (C).

The connector 603 is configured to transmit and receive signals for controlling the plurality of battery cells (C), and may be coupled to the flexible printed circuit board 600. The connector 603 may be configured to transmit and receive signals to and from an external control device. For example, the connector 603 may be configured to transmit a signal indicating the state of a plurality of battery cells (C) or to receive a signal for controlling a plurality of battery cells.

Figure 21:
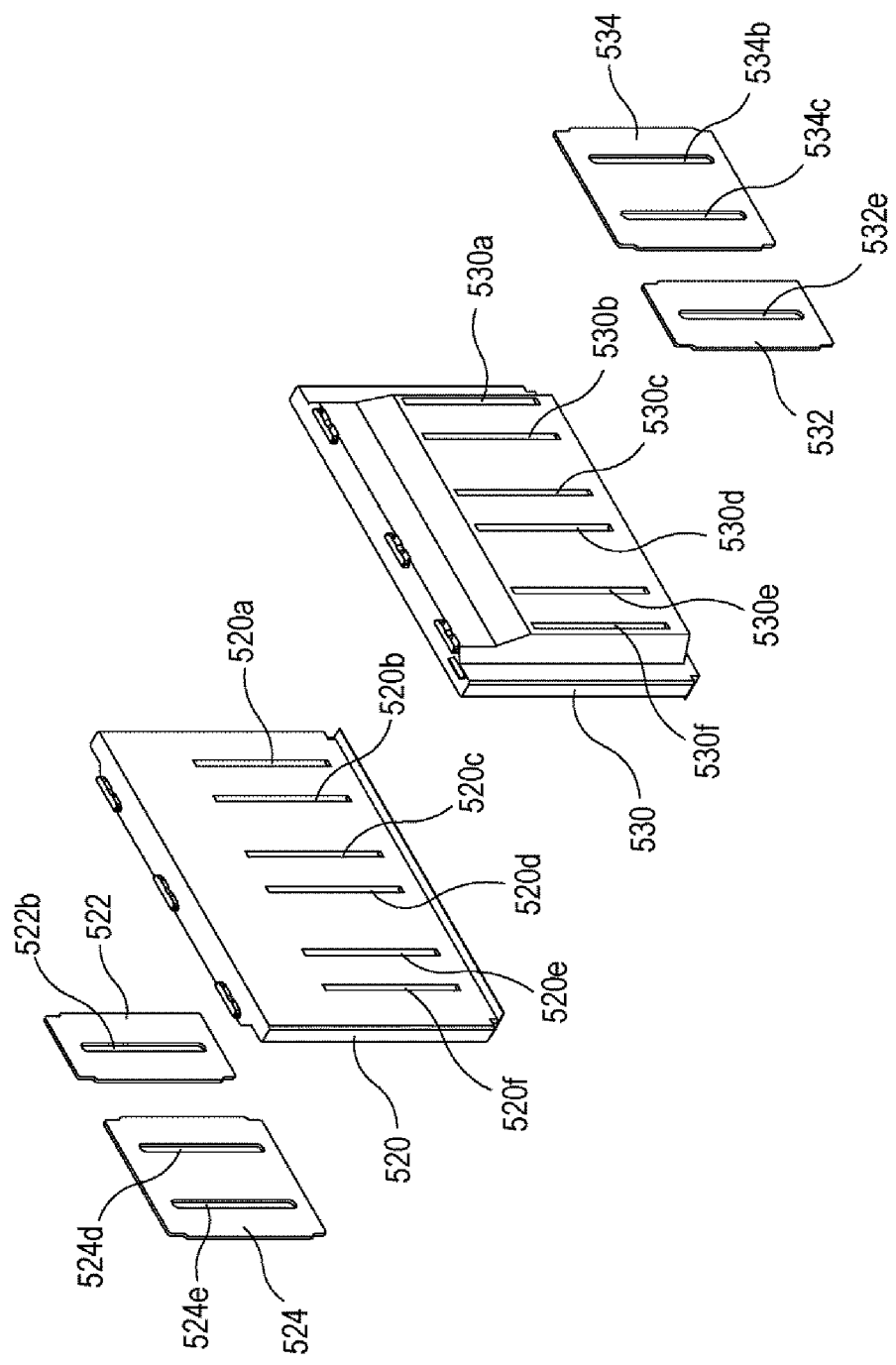
FIG. 21 is a perspective view showing a part of a frame of the frame assembly and a bus bar shown in FIG. 20.

FIG. 21 is a perspective view separately illustrating a portion of the frame 501 of the frame assembly 500, i.e., the second frame 520, the third frame 530, and the first and second bus bars 522, 524, 532, and 534 shown in FIG. 20. Each of the frame 501 and the second bus bars 522, 524, 532, and 534 may have at least one opening through which a tap terminal passes. For example, the opening may be formed in a slit. Referring to FIG. 21, the second frame 520 may have six openings 520a, 520b, 520c, 520d, 520e, and 520f formed therein, and three openings 520b, 520d, and 520e, among the six openings 520a, 520b, 520c, 520d, 520e, and 520f, may be formed at positions corresponding to openings 522b, 524d, and 524e formed in the first bus bars 522 and 524. Similarly, the third frame 530 may have six openings 530a, 530b, 530c, 530d, 530e, and 530f formed therein, and three openings 530b, 530c, and 530e, among the six openings 530a, 530b, 530c, 530d, 530e, and 530f, may be formed at positions corresponding to the openings 534b, 534c, and 532e formed in the second bus bars 532 and 534.

Hereinafter, a process of assembling the frame assembly 500 and the battery cells (C) according to an embodiment will be described with reference to FIGS. 22 to 24.

Figure 22:
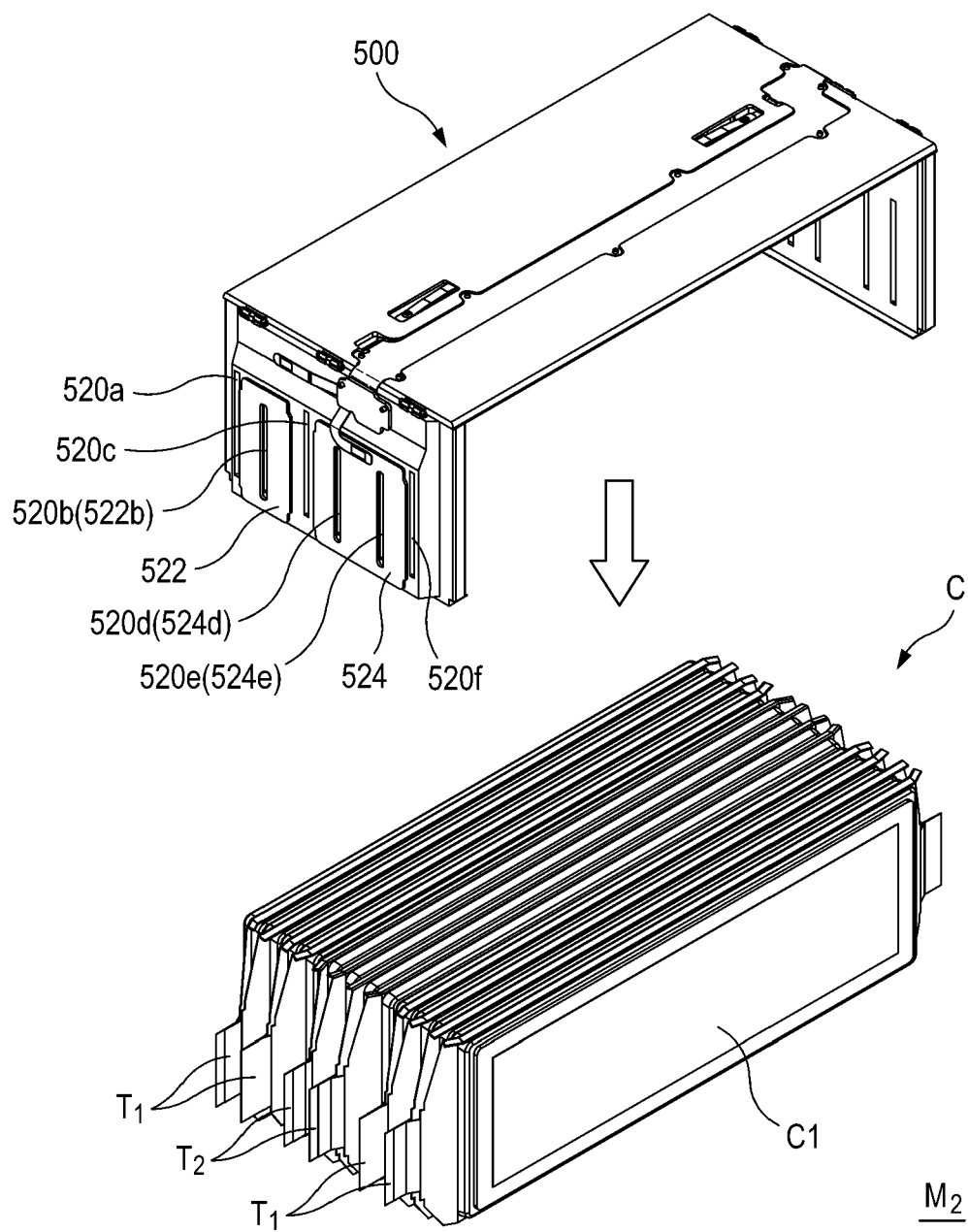
FIG. 22 is an exploded perspective view showing battery cells and a frame assembly in the battery module shown in FIG. 20.

FIG. 22 is an exploded perspective view of the frame assembly 500 and the battery cells (C) according to an embodiment. FIG. 23 is a perspective view showing an intermediate process of assembling the frame assembly 500 and the battery cells (C) according to an embodiment. In addition, FIG. 24 is a perspective view showing the configuration in which the frame assembly 500 and the battery cells (C) are assembled according to an embodiment.

The battery cell (C) may include a cell body C1, a (+) tab T1 of the cell body C1, and a (−) tab T2 of the cell body C1. The (+) tab T1 and the (−) tab T2 may be tap terminals that are conductive and flexible. The plurality of battery cells (C) shown in FIG. 22 includes six battery groups in which terminals of two battery cells having the same polarity are directly connected.

The (+) and (−) tabs T1 and T2 of the battery cells (C) may remain straight before the battery cells (C) are coupled to the frame assembly 500. Referring to FIGS. 22 and 23, the (+) tabs T1 located on both edges of the stacked battery cells (C) may be configured to pass through the openings 520a, 520b, 520e, and 520f formed in the second frame 520, and the (−) tabs T2 located in the center may be configured to pass through the openings 520c and 520d formed in the second frame 520. The straight tabs T1 and T2 may pass through the openings 522b, 524d, and 524e formed in the bus bars 522 and 524. Likewise, the tabs T1 and T2 may pass through the openings formed in the third frame 530 and the bus bars 532 and 534 in the same manner as the method in which the tabs T1 and T2 pass through the openings formed in the second frame and the bus bars 522 and 524.

Figure 23:
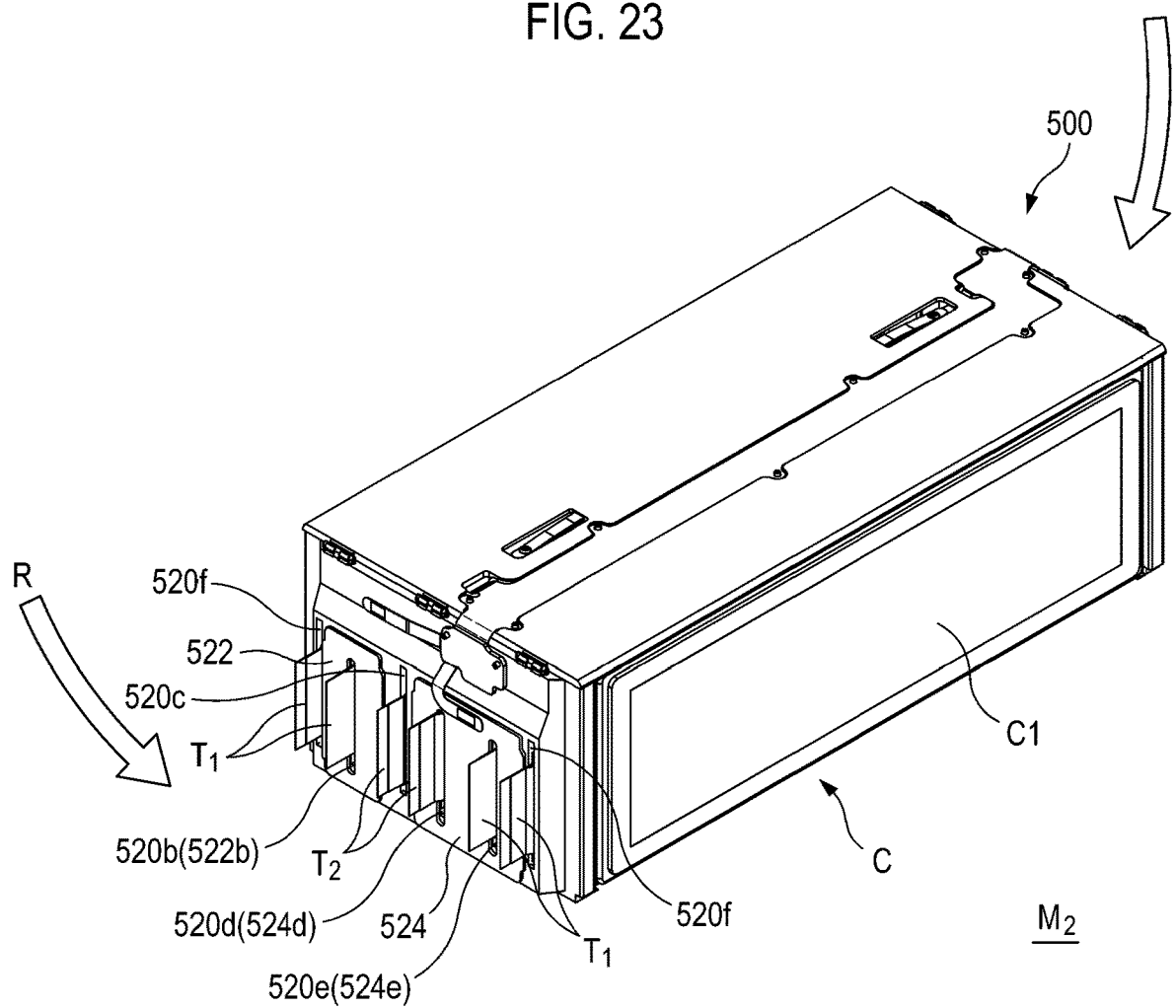
FIG. 23 is a perspective view showing an intermediate process of coupling the battery cells and the frame assembly in the battery module shown in FIG. 20.

Referring to FIG. 23, the second and third frames 520 and 530 of the frame assembly 500 may cover the top surface of the battery cells (C) while being pivoted outwards with respect to the battery cells (C). Then, the pivoted second and third frames 520 and 530 are pivoted in the direction of the arrow (R) such that the tabs T1 and T2 of the battery cells (C) pass through the openings 520a, 520b, 520c, 520d, 520e, and 520f formed in the second frame and the openings 522b, 524d, and 524e formed in the bus bars 522 and 524. Next, the tabs T1 and T2 are bent such that surfaces of the tabs come into contact with the front surfaces of the first bus bars 522 and 524. Lastly, the tabs T1 and T2 are bonded to the bus bars 522 and 524 so as to be electrically connected to each other by applying a welding process to the opposite surfaces of the tabs T1 and T2. The welding of the second bus bars 532 and 534 disposed in the third frame 530 and the tabs T1 and T2 of the battery cells (C) may be performed in the manner similar to the method of welding the bus bars 522 and 524 disposed in the second frame 520.

Figure 24:
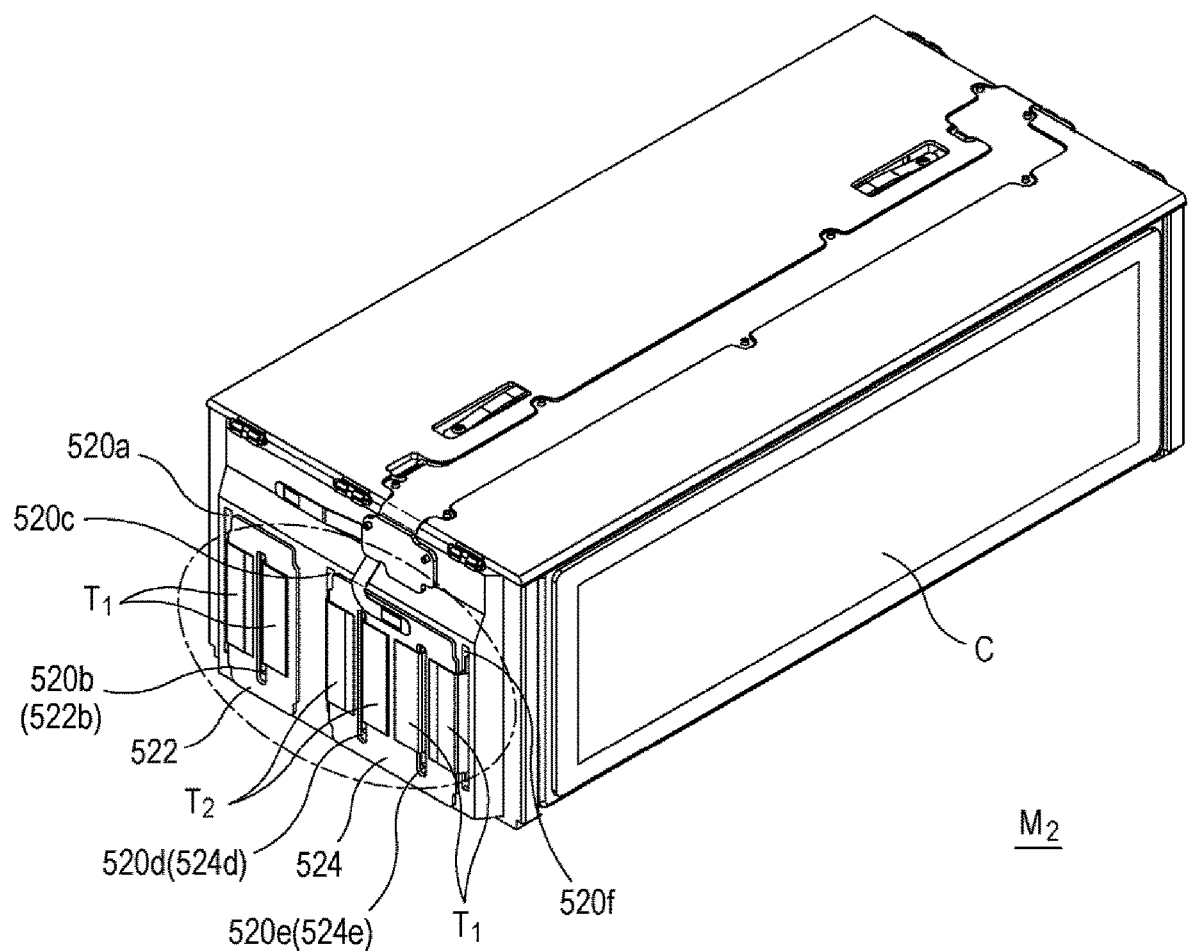
FIG. 24 is a perspective view showing the configuration in which the battery cells and the frame assembly are coupled in the battery module shown in FIG. 20.
Figure 25:
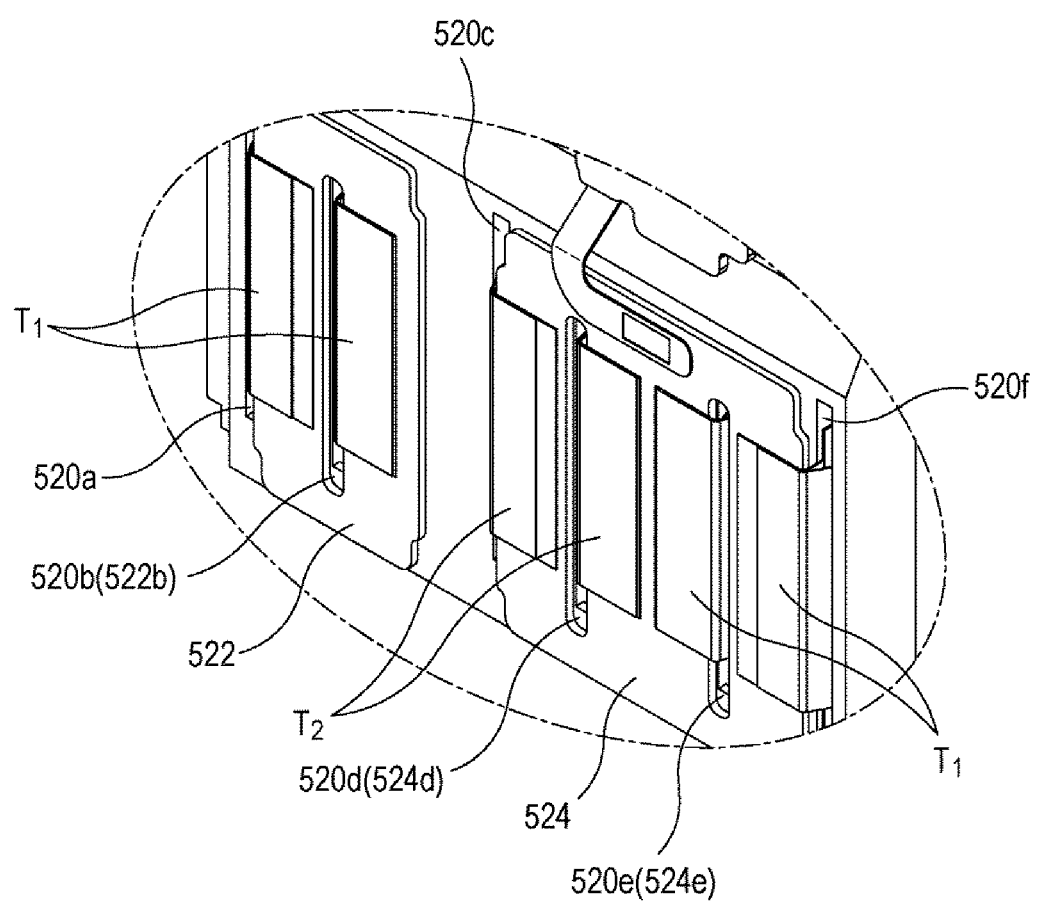
FIG. 25 is an enlarged perspective view of a bus bar portion of the battery module shown in FIG. 24.
Figure 26:
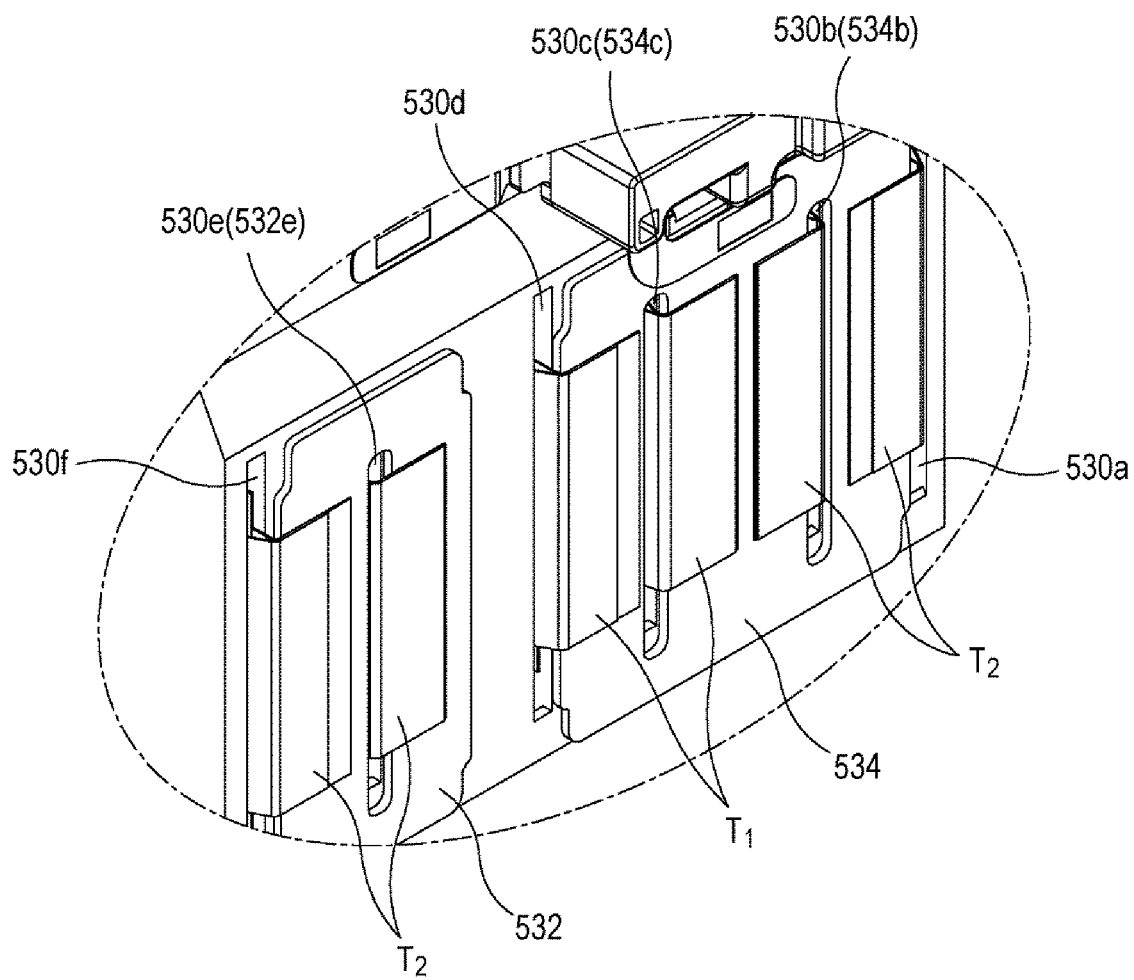
FIG. 26 is an enlarged perspective view of a bus bar portion positioned on the opposite side of the bus bar portion shown in FIG. 25 in the battery module shown in FIG. 24.

FIG. 25 is an enlarged perspective view of a portion of first bus bars 522 and 524 of the battery module (M2) shown in FIG. 24, and FIG. 26 is an enlarged perspective view of a portion of second bus bars 532 and 534 on the opposite side of the portion of the first bus bars 522 and 524 shown in FIG. 25 in the battery module (M2) shown in FIG. 24.

Referring to FIG. 25, among the tabs T1 and T2 of the plurality of battery cells (C), the left (+) tabs T1 are directly bonded to the bus bar 522, and the right (+) tabs T1 and the central (−) tabs T2 are directly bonded to the bus bar 524. With this configuration, the central (−) tabs T2 and the right (+) tabs T1 are electrically connected. Likewise, referring to FIG. 26, among the tabs T1 and T2 of the plurality of battery cells (C), the left (−) tabs T2 are directly bonded to the bus bar 532, and the right (−) tabs T2 and the central (+) tabs T1 are directly bonded to the bus bar 534. With this configuration, the central (+) tabs T2 and the right (−) tabs T1 are electrically connected. Accordingly, among the six battery groups shown in FIG. 22, two neighboring battery groups may be connected in parallel, and three sets of two battery groups connected in parallel may be connected in series with each other. This method may reduce the number of welding processes between the tabs by more than half using the first and second bus bars 522, 524, 532, and 534, compared to a method of connecting the respective battery cells (C) in a line. In addition, since the packages of cells (C) are connected in series by means of the bus bars, it is possible to configure the battery capacity and the output voltage using the bus bars without restriction depending on the vehicle type.

Figure 27:
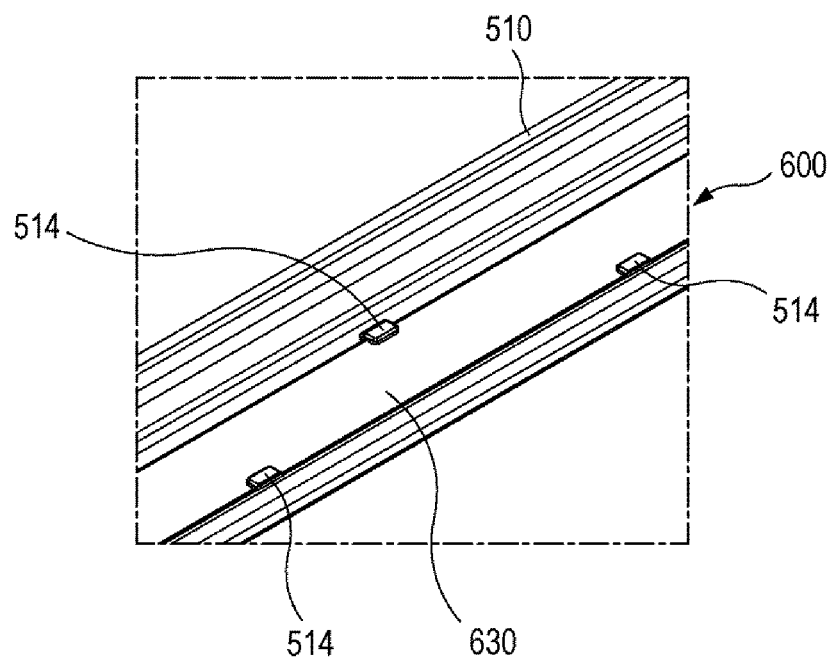
FIG. 27 is a perspective view showing the configuration in which a frame and a flexible printed circuit board are assembled according to a tenth embodiment.
Figure 28:
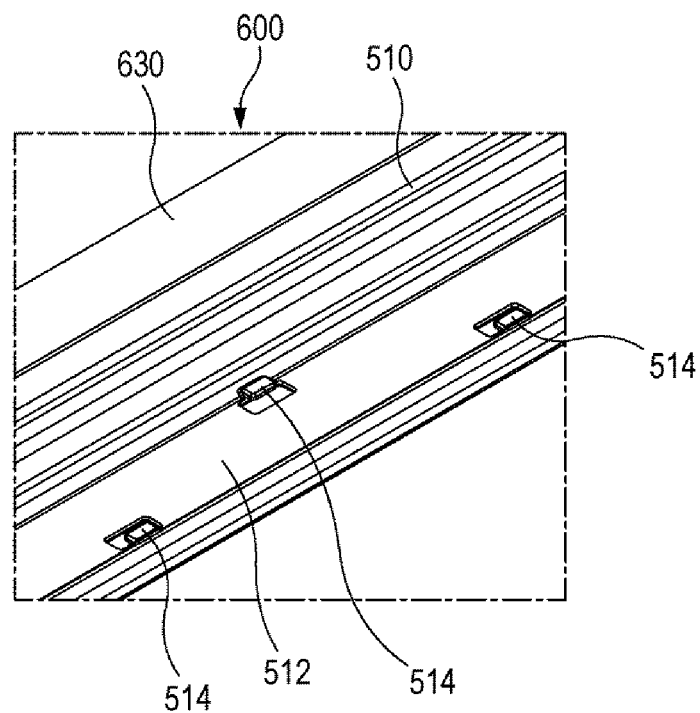
FIG. 28 is a perspective view showing the configuration in which a frame and a flexible printed circuit board shown in FIG. 27 are disassembled.

FIG. 27 is a perspective view showing the configuration in which a first frame 510 and a flexible printed circuit board 600 are assembled according to a tenth embodiment, and FIG. 28 is a perspective view showing the configuration in which a first frame 510 and a flexible printed circuit board 600 shown in FIG. 27 are disassembled.

The middle portion 630 of the flexible printed circuit board 600 may be received in the path groove 512 formed in the first frame 510. The first frame 510 may have a structure for preventing separation of the flexible printed circuit board 600, and may have a plurality of ribs 514 arranged along the path groove 512. That is, the ribs 514 may prevent the middle portion 630 from being separated from the first frame 510. Further, the ribs 514 may be arranged in a zigzag form along the longitudinal direction of the first frame 510.

In FIGS. 27 and 28, since a portion of the middle portion 630 is interposed between the ribs 514 and the bottom of the path groove 512 after the middle portion 630 is received in the path groove 512, it is possible to prevent separation of the flexible printed circuit board 600 from the first frame 510. In addition, a fixing means for fixing the middle portion 630, such as a double-sided tape, is not required, thereby improving the ease of assembly. In addition, it is possible to overcome the problem in which the flexible printed circuit board 600 is bent in the process of coupling the same to the first frame 510. Further, since separation of the flexible printed circuit board 600 can be prevented, it is possible to prevent interference between the flexible printed circuit board 600 and the housing 503 in the process of assembling the housing 503 and the frame assembly 500 as shown in FIG. 20.

Figure 29:
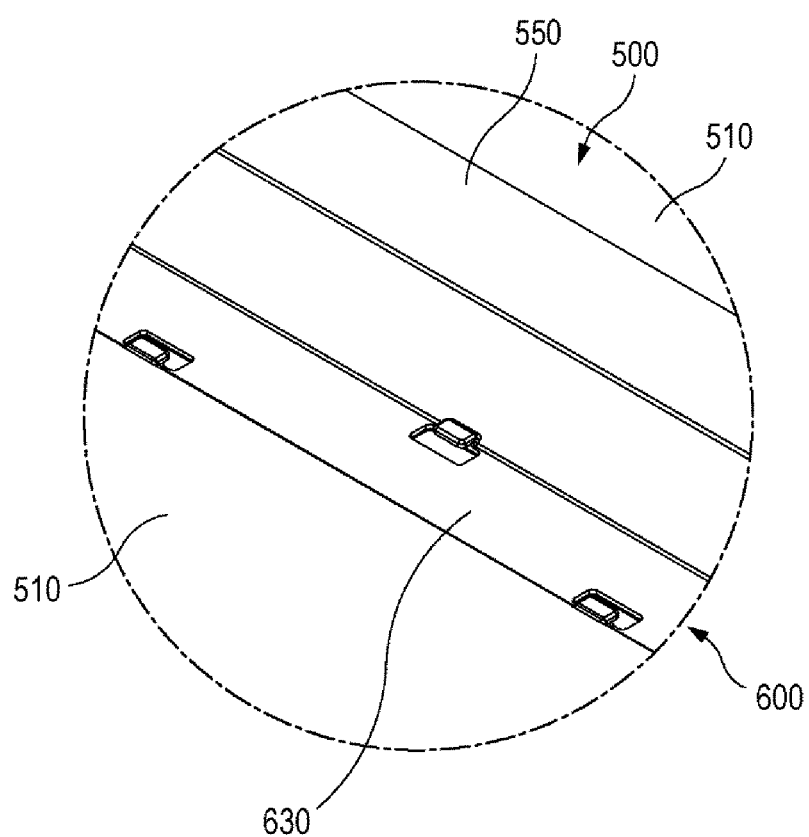
FIG. 29 is an exploded perspective view showing the configuration for installing a flexible printed circuit board cover to a frame assembly according to an eleventh embodiment.

FIG. 29 is an exploded perspective view showing the configuration for installing a flexible printed circuit board cover 550 in a frame assembly 500 according to an eleventh embodiment.

After the middle portion 630 of the flexible printed circuit board 600 is installed in the first frame 510 in the process of assembling the battery module (M2), a printed circuit board cover 550 may be provided on the middle portion 630. In this configuration, separation of the flexible printed circuit board 600 from the first frame 510 can be prevented, and a projection-preventing tape is not required. In addition, it is possible to solve the problem in which the flexible printed circuit board 600 is bent during the process of transferring or assembling the battery module (M2). Furthermore, since the flexible printed circuit board 600 is disposed in the flexible printed circuit board cover 550, it is possible to prevent interference between the middle portion 630 of the flexible printed circuit board 600 and the housing 503 in the process of assembling the housing 503 and the frame assembly 500 shown in FIG. 20.

Figure 30:
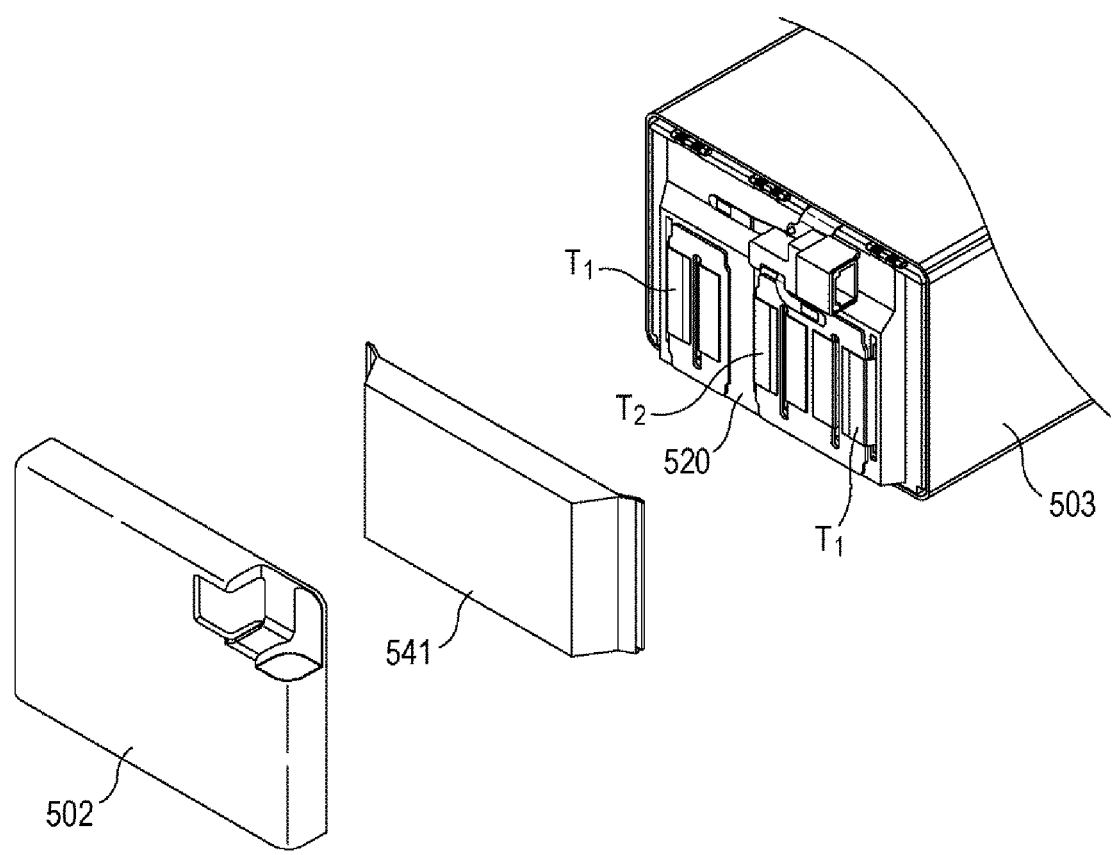
FIG. 30 is an exploded perspective view showing the configuration in which an insulating cover is provided between a bus bar and a module cover according to a twelfth embodiment.

FIG. 30 is an exploded perspective view showing the configuration in which an insulating cover 541 is provided between first bus bars 522 and 524 and a module cover 502 according to a twelfth embodiment.

The first bus bars 522 and 524 are directly connected to the battery cells (C). Thus, if the first bus bars 522 and 524 and the tabs T1 and T2 of the battery cells (C) come into contact with the module cover 502, which is made of a metal material, a short circuit may occur. This short circuit may also occur in the second bus bars 532 and 534 and the terminals of the battery cells (C), which are disposed on the side opposite the portion shown in FIG. 30. Referring to FIG. 20, a first insulating cover 541 may be interposed between a plurality of first bus bars 522 and 524 coupled to the second frame 520 and the module cover 502, and a second insulating cover 542 may be interposed between a plurality of second bus bars 532 and 534 coupled to the third frame 530 and the module cover 502. The first insulating cover 541 and the second insulating cover 542 may be made of a non-conductive synthetic resin material.

The first and second insulating covers 541 and 542 may be configured to insulate the first and second bus bars 522, 524, 532, and 534 from the module cover 502, thereby preventing the occurrence of a short circuit. The first and second insulating covers 541 and 542 are interposed between the first and second bus bars 522, 524, 532, and 534 and the module cover 502 so as to avoid direct contact between the first and second bus bars 522, 524, 532, and 534 and the tabs T1 and T2 and the module cover 502, thereby preventing a short circuit.

Figure 31:
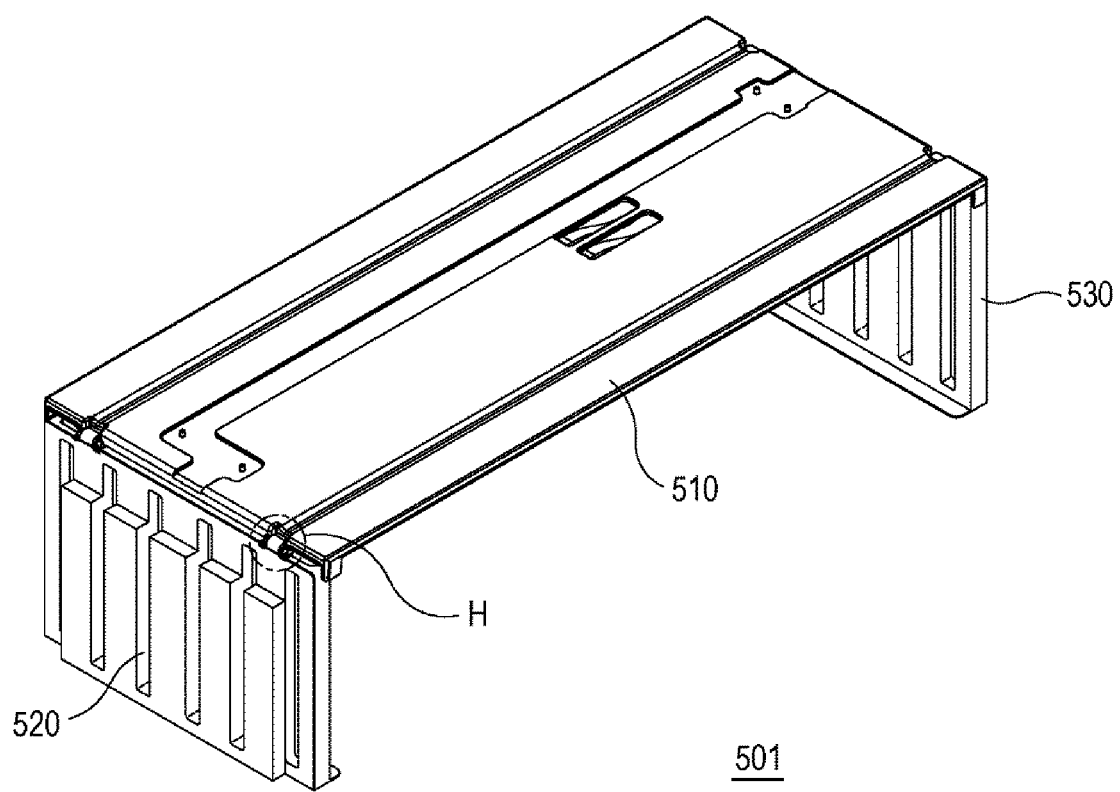
FIG. 31 is a perspective view showing the structure of a frame according to a thirteenth embodiment.
Figure 32:
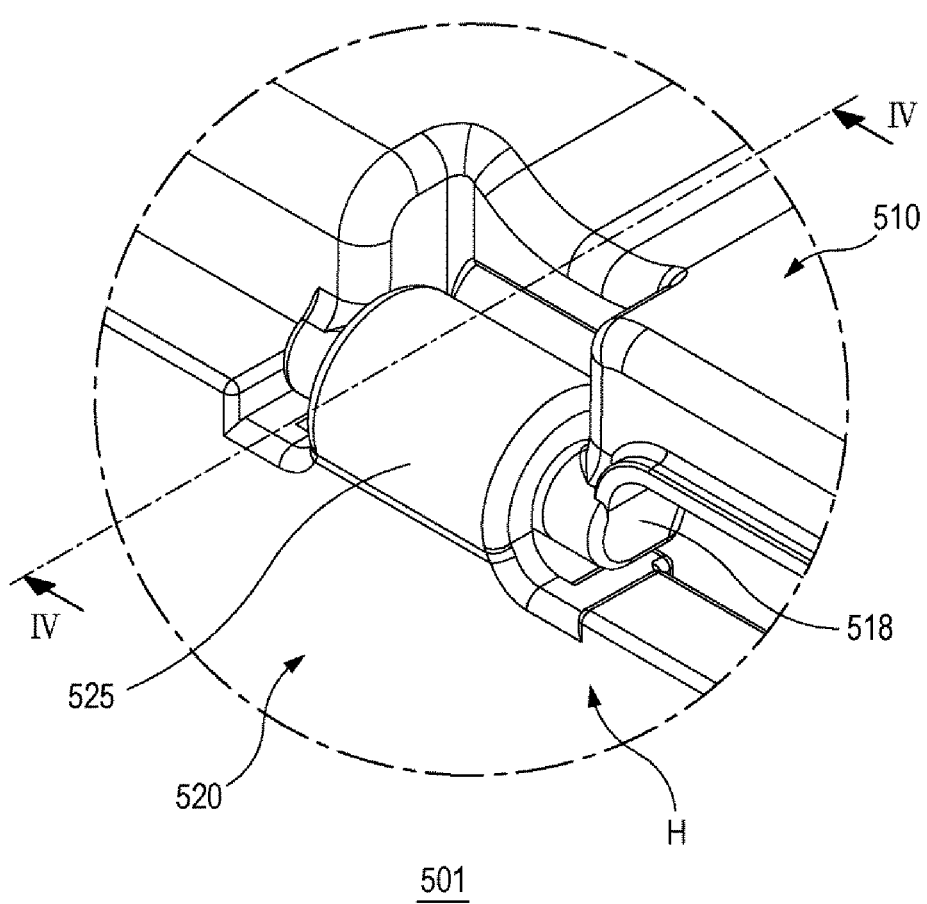
FIG. 32 is an enlarged perspective view of a hinge structure applied to the frame shown in FIG. 31.
Figure 33:
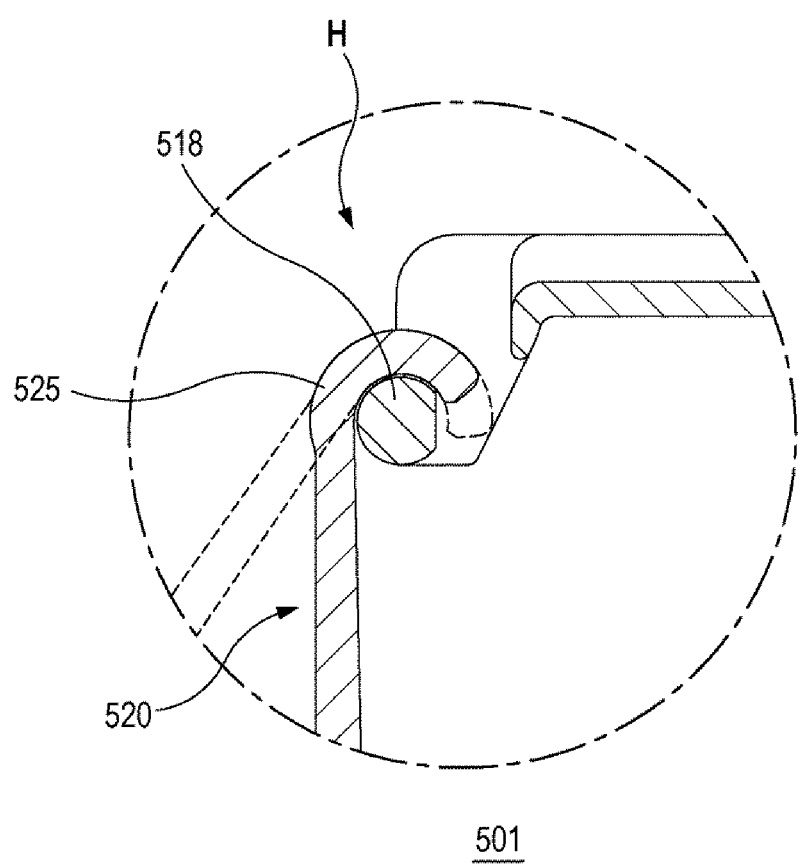
FIG. 33 is a cross-sectional view of the hinge structure taken along the line IV-IV in FIG. 32.

FIG. 31 is a perspective view showing the structure of a frame 501 according to a thirteenth embodiment. FIG. 32 is an enlarged perspective view of a hinge structure (H) applied to the frame 501 shown in FIG. 31. FIG. 33 is a cross-sectional view of the hinge structure (H) taken along the line IV-IV in FIG. 32.

The second and third frames 520 and 530 may be pivotably fixed to the first frame 510 by means of a hinge structure (H). The hinge structure (H) may include a hook 525 formed in the second frame 520 and a shaft 518 formed on one end of the first frame 510 and to which the hook 525 is hooked. Such a shaft 518 may also be formed on the opposite end of the first frame 510, and the hook 525 may also be formed on the third frame 530.

The hinge structure (H) may reinforce the rigidity of the coupling structure of the shaft 518 and the hook 525, thereby solving the problem in which the first to third frames 510, 520, and 530 are separated from each other and the hinge structure breaks. In an embodiment, the second and third frames 520 and 530 do not need to be rotated to an extent such that they are parallel to the first frame 510. In addition, since the hook 525 is required to be rotated at an angle of 45 degrees relative to the first frame 510 as shown by the dotted line in FIG. 33, the hook 525 may not completely surround the shaft 518. Thus, the hook 525 may be formed to surround a portion of the shaft 518 corresponding to only about three quarters thereof, and the remaining portions may be open. In this structure, even if the second and third frames 520 and 530 rotate about the first frame 510, excessive force is not applied to the hook 525, so that the rigidity of the hook 525 may be reinforced and breakage of the hook 525 may be prevented.

FIGS. 34 to 37 provide a structure capable of improving the contact between the battery cell and the temperature sensor for measuring the temperature of the battery cell.

Figure 34:
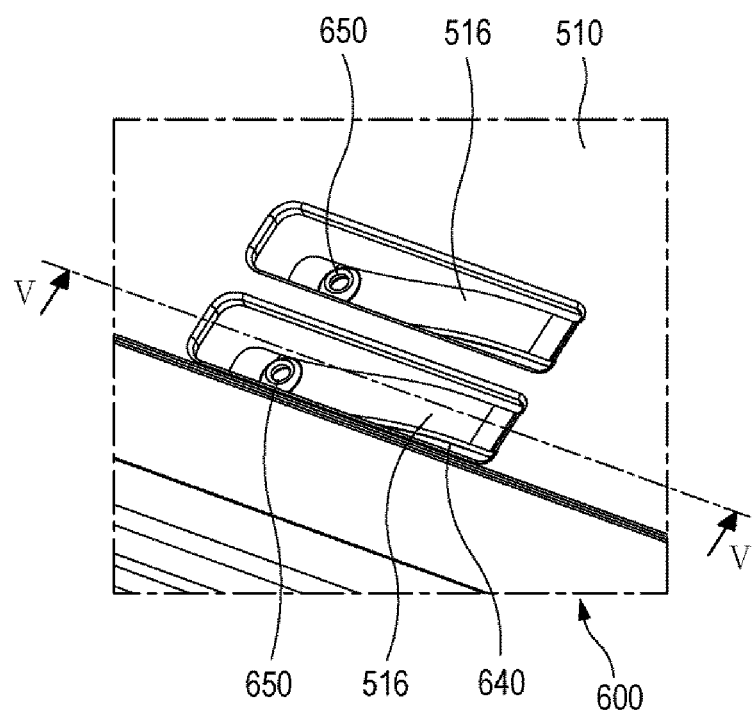
FIG. 34 is a perspective view showing the structure of a temperature sensor portion of a flexible printed circuit board and a pressing member of a first frame according to a fourteenth embodiment.
Figure 35:
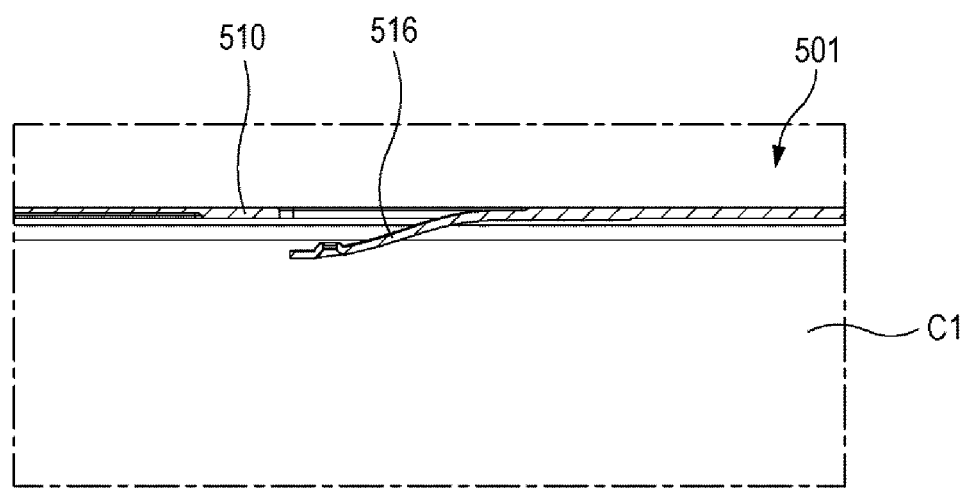
FIG. 35 is a cross-sectional view showing the configuration of the temperature sensor portion and the pressing member taken along the line V-V in FIG. 34.
Figure 36:
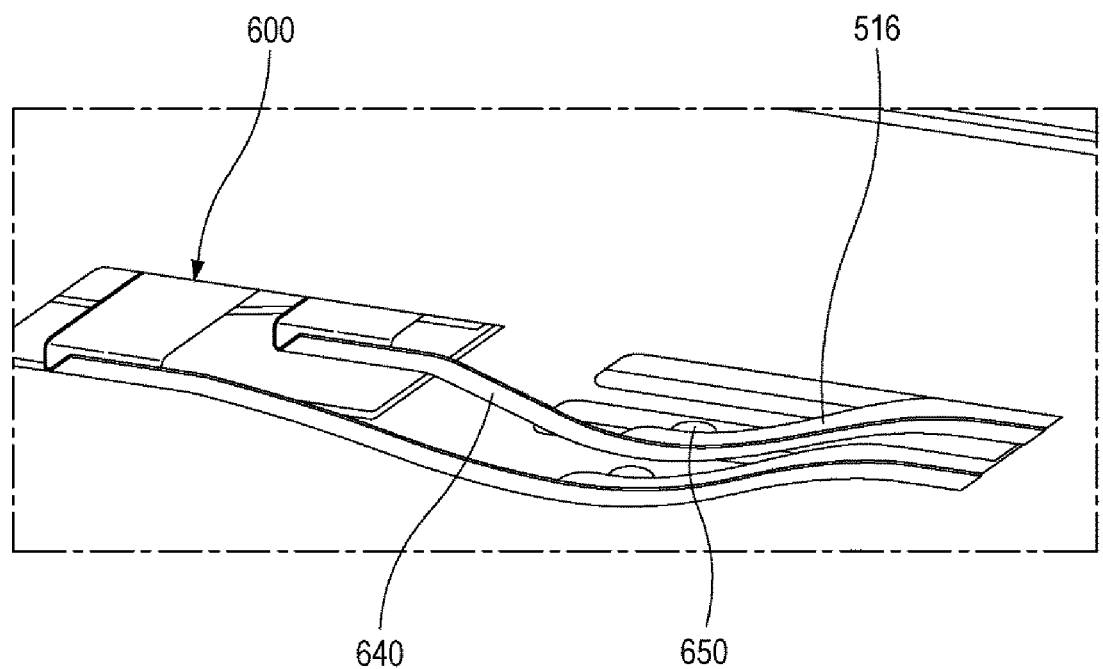
FIG. 36 is a perspective view showing the internal structure in which the first frame and the flexible printed circuit board are coupled in FIG. 34.

FIG. 34 is a perspective view showing the structure of a temperature sensor portion 640 of a flexible printed circuit board 600 and a pressing member 516 of the first frame 510 according to a fourteenth embodiment. FIG. 35 is a cross-sectional view showing the configuration of the temperature sensor portion 640 and the pressing member 516 taken along the line V-V in FIG. 34. FIG. 36 is a perspective view showing the internal structure in which the first frame 510 and the flexible printed circuit board 600 are coupled in FIG. 34.

Referring to FIGS. 34 and 35, the first frame 510 may have a pressing member 516 formed to protrude in the direction toward a plurality of battery cells. In addition, the temperature sensor portion 640 of the flexible printed circuit board 600 may be configured to pass through the first frame 510, and may include a temperature sensor 650 for measuring the temperature of the battery cells (C). Referring to FIG. 36, the pressing member 516 continuously applies tension to the temperature sensor portion 640 so as to bias the same toward the battery cells (C), thereby preventing separation of the temperature sensor portion 640 from the battery cells (C) even if there is a dimensional difference therebetween. Therefore, since the temperature sensor portion 650 always remains in contact with the battery cells (C), it is possible to measure the temperature of the battery cells (C) all of the time.

Figure 37:
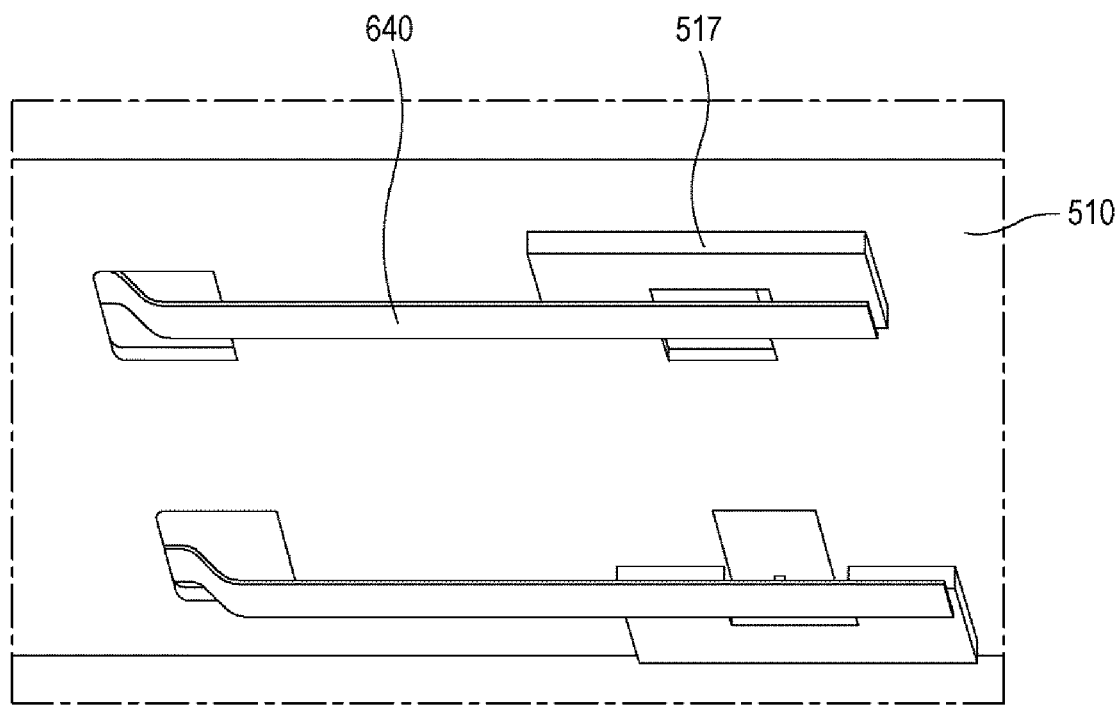
FIG. 37 is a perspective view showing the structure in which a foam pad is attached to a lower surface of a first frame according to a fifteenth embodiment.

FIG. 37 is a perspective view showing the structure in which a foam pad 517 is attached to a lower surface of a first frame 510 according to a fifteenth embodiment.

In an embodiment, a foam pad 517 may be provided in the first frame 510 such that the temperature sensor portion 640 is bent toward the battery cells (C). For example, the foam pad 517 may be made of a resilient material, and may be pressed between the first frame 510 and the battery cells to press the temperature sensor portion 640 toward the battery cells, thereby improving the contact between the temperature sensor portion 640 and the battery cells. If the foam pad 517 is provided, damage to the battery may be minimized even upon long-term use, and the material cost and work processes may be reduced.

Figure 38:
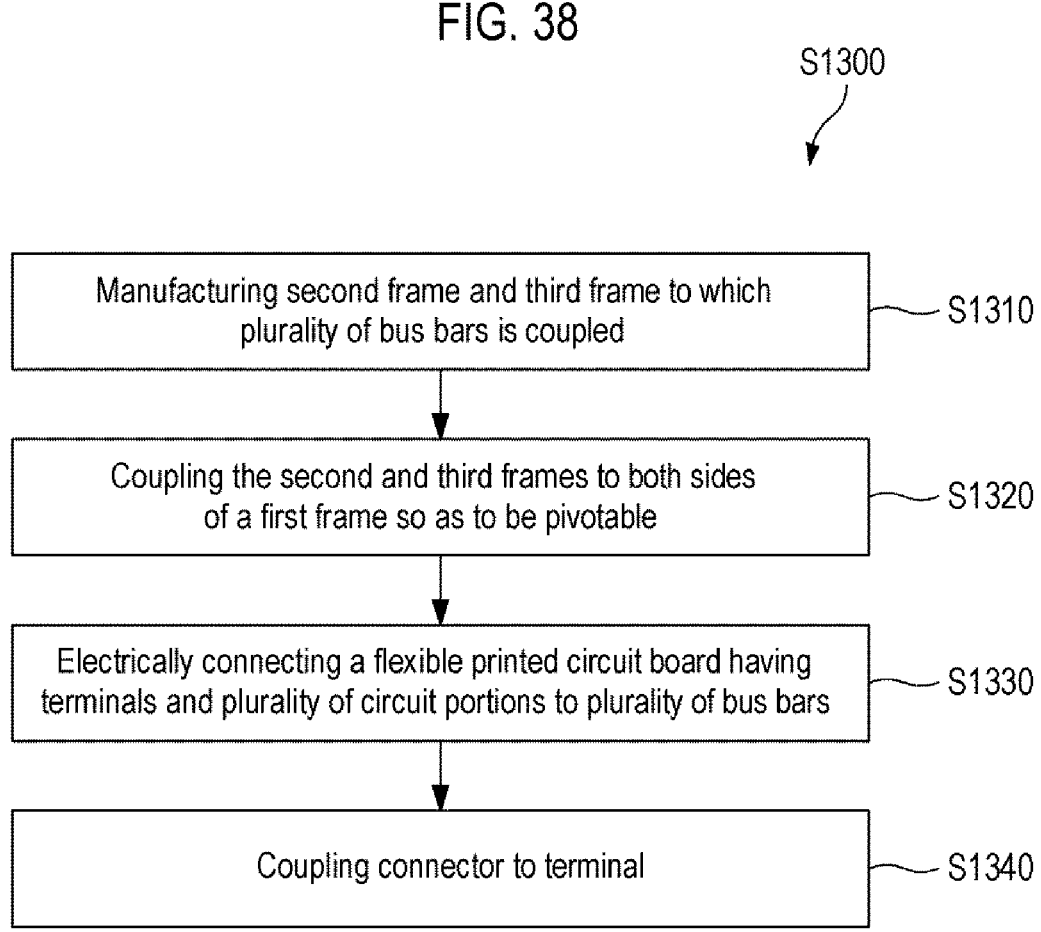
FIG. 38 is a flowchart showing a method of manufacturing a frame assembly according to a sixteenth embodiment.

FIG. 38 is a flowchart showing a method of manufacturing a frame assembly (S1300) according to a sixteenth embodiment.

A method of manufacturing a frame assembly (S1300) may include a step of manufacturing a second frame and a third frame to which a plurality of bus bars is coupled (S1310), a step of coupling the second and third frames to both sides of the first frame so as to be pivotable (S1320), a step of electrically connecting a flexible printed circuit board having a terminal and a plurality of circuit portions to a plurality of bus bars (S1330), and a step of coupling a connector to the terminal (S1340).

Figure 39:
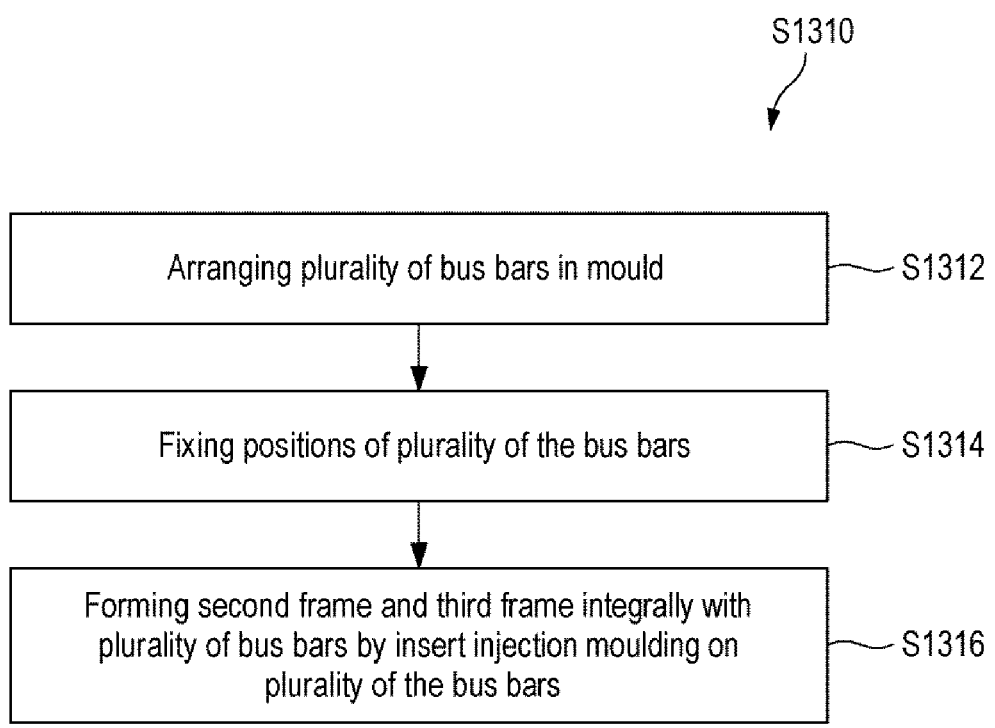
FIG. 39 is a flowchart showing the detailed processes of a "step of manufacturing the second and third frames to which a plurality of bus bars are coupled" in FIG. 38.
Figure 40:
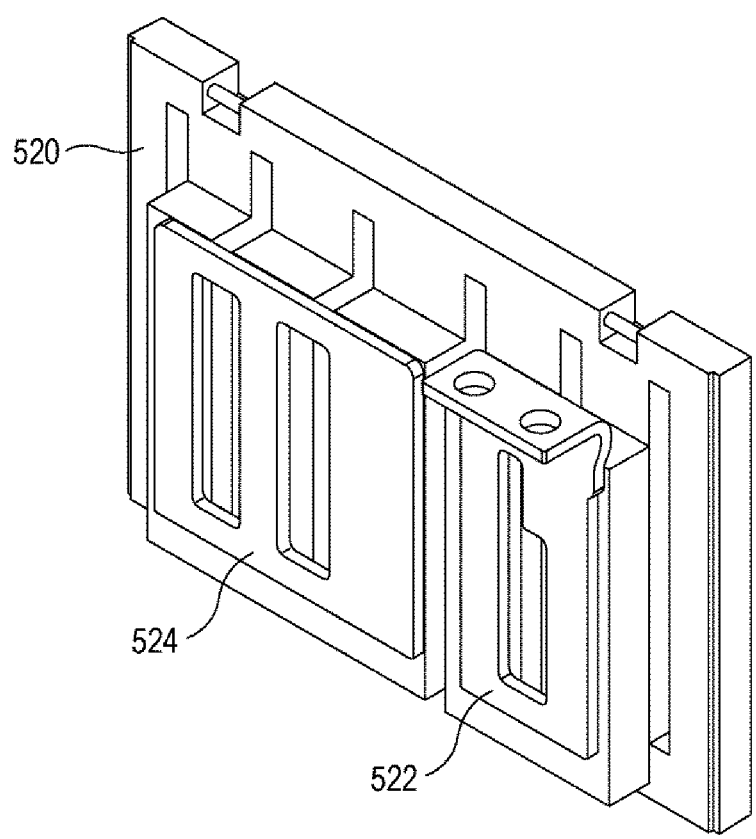
FIG. 40 is a perspective view showing a bus bar and a frame, which are integrally configured by injection moulding, in order to explain the flowchart in FIG. 39.

FIG. 39 is a flowchart showing the details of the "step of manufacturing the second and third frames to which a plurality of bus bars are coupled (S1310)" in the method of manufacturing a frame assembly (S1300) in FIG. 38, and FIG. 40 is a perspective view showing the configuration of first bus bars 522 and 524 and a second frame 520 configured to be integral by injection moulding in order to explain the flowchart in FIG. 39.

In an embodiment, the step of manufacturing the second and third frames to which a plurality of bus bars is coupled (S1310) may include a step of arranging a plurality of bus bars in a mould (S1312), a step of fixing the positions of the plurality of bus bars (S1314), and a step of forming a second frame and a third frame integrally with the plurality of bus bars by means of insert injection moulding on the plurality of bus bars (S1316). Referring to FIG. 20, in the frame assembly 500, the first bus bars 522 and 524 and the second frame 520 may be integrally injected, and the second bus bars 532 and 534 and the third frame 530 may be integrally injected.

According to the above process, since the frame 520 and the bus bars 522 and 524 are integrally coupled, a separate process, such as a heat fusion process, for bonding the bus bars 522 and 524 to the frame 520, or a bonding means thereof is not required. Therefore, it is possible to reduce facility investment costs, to improve productivity by simplifying the processes, and to reduce component costs.

Figure 41:
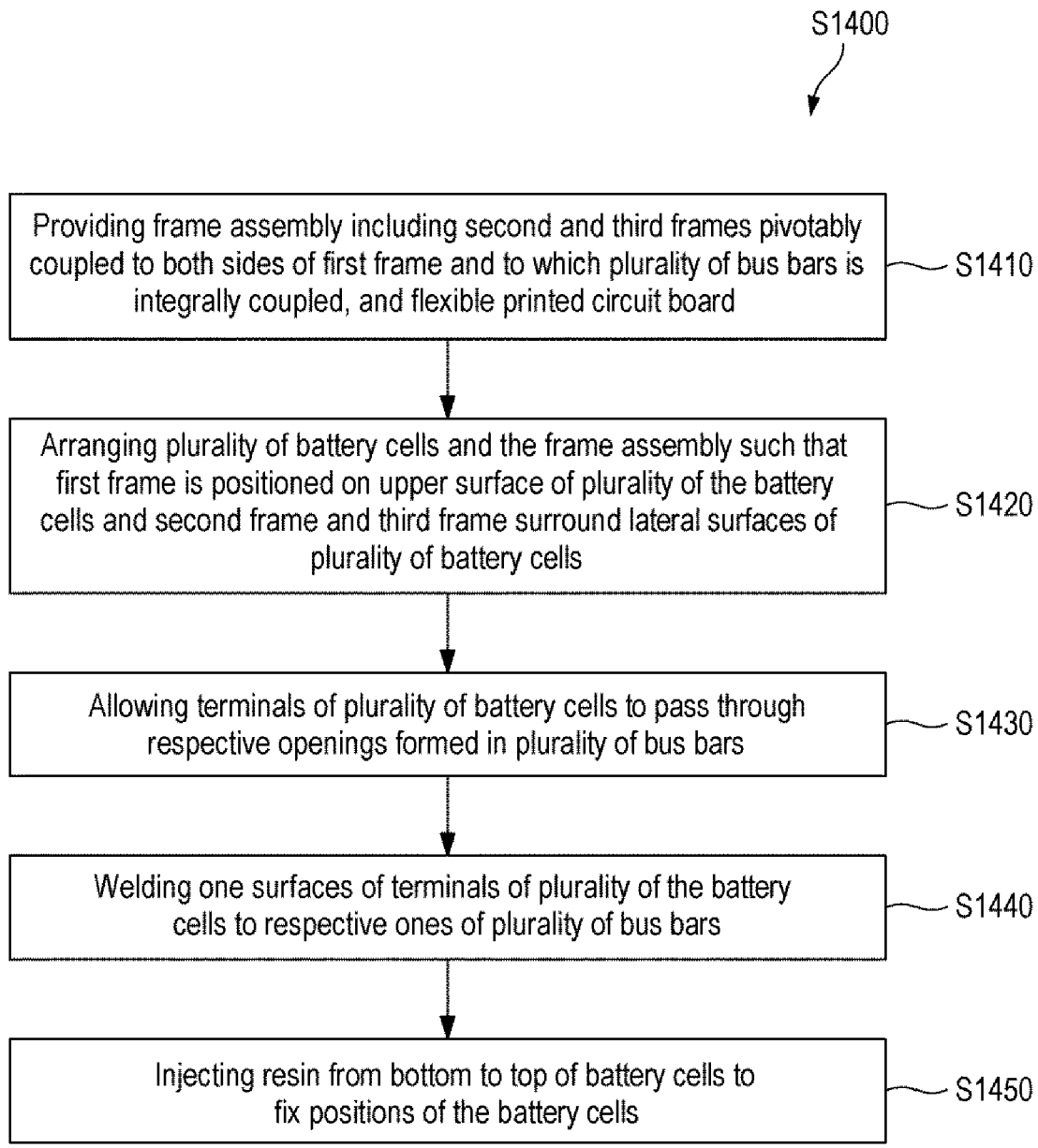
FIG. 41 is a flowchart showing a method of manufacturing a battery module according to a seventeenth embodiment.
Figure 42:
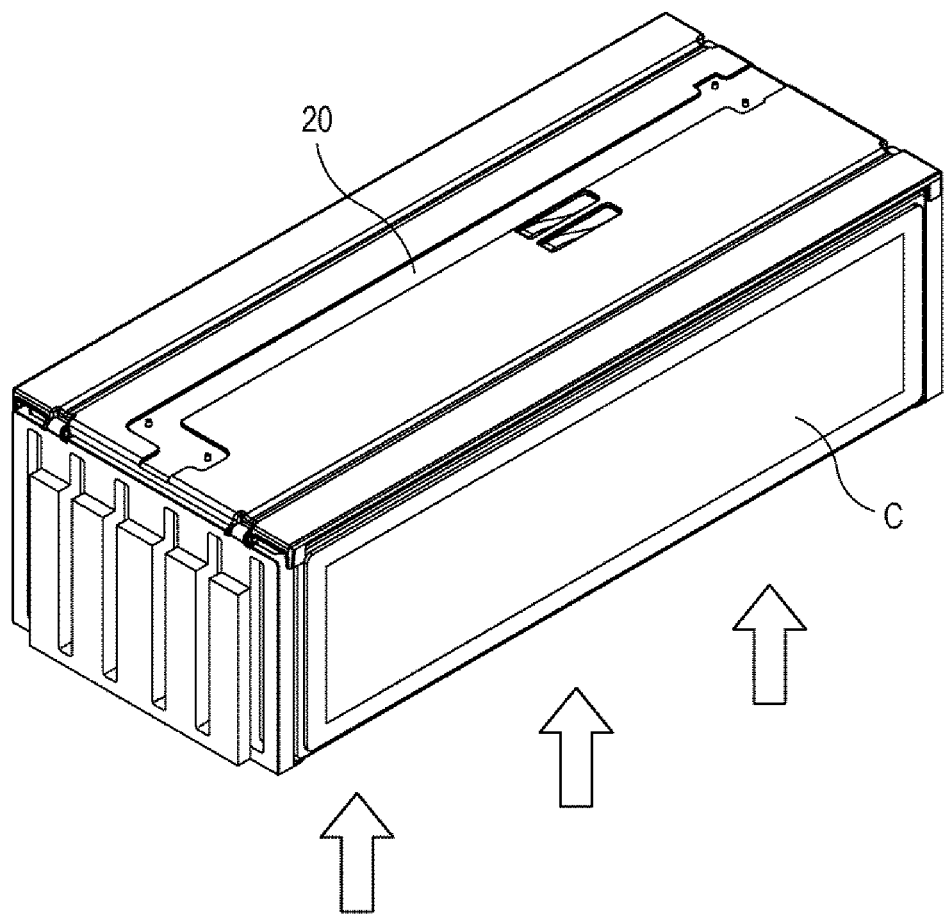
FIG. 42 is a perspective view showing a resin injection process in the method of manufacturing the battery module shown in FIG. 41.

An embodiment provides a method of manufacturing a battery module capable of improving productivity by eliminating a resin injection process on the top of the battery cells. FIG. 41 is a flowchart showing a method of manufacturing a battery module (S1400) according to a seventeenth embodiment, and FIG. 42 is a perspective view showing a resin injection process (S1450) in the method of manufacturing the battery module (S1400) shown in FIG. 41. Hereinafter, a method of manufacturing a battery module (S1400) will be described with reference to FIG. 20.

The method of manufacturing a battery module (S1400) may include a step of manufacturing a frame assembly 500 including a first frame 510, second and third frames 520 and 530 pivotably coupled to both sides of the first frame and to which a plurality of bus bars is integrally coupled, and a flexible printed circuit board 600 (S1410), a step of arranging the battery cells (C) and the frame assembly 500 such that the first frame 510 is positioned on the upper surface of the plurality of battery cells (C) and such that the second frame 520 and the third frame 530 surround the lateral surfaces of the plurality of battery cells (C) (S1420), a step of allowing the terminals of the plurality of battery cells (C) to pass through the openings 522*b*, 524*d*, 524*e*, 532*e*, 534*c*, and 534*b* formed in the first and second bus bars 522, 524, 532, and 534 (S1430), and a step of welding surfaces of the terminals of the plurality of battery cells (C) to the plurality of first and second bus bars 522, 524, 532, and 534, respectively (S1440). The method of manufacturing the battery module (S1400) may further include a step of injecting a resin from the bottom to the top of the battery cells to fix the positions of the battery cells (S1450).

In an embodiment, in the state in which the battery cells (C) and the frame assembly 500 are coupled to each other, a resin may be injected from the bottom to the top of the battery cells (C) in order to fix the positions of the battery cells (C) before the housing 503 is assembled in the battery module (M2). If a large vibration or shock is applied to the battery while the vehicle is being driven, the resin injected into the battery cells (C) may fix the positions of the battery cells (C), thereby protecting the battery cells (C) from external impact.

Since an insulation structure, such as the first frame 510, is disposed on the top of the battery cells (C) in the battery module (M2), the process of injecting the resin to the upper portion of the battery cells (C) may be omitted. Therefore, since the resin is injected once, it is possible to improve productivity by eliminating the resin injection process with respect to the upper portion of the battery cells and to reduce the resin injection time and curing time (e.g., about 5 minutes or more), compared to the process of injecting the resin twice.

Figure 43:
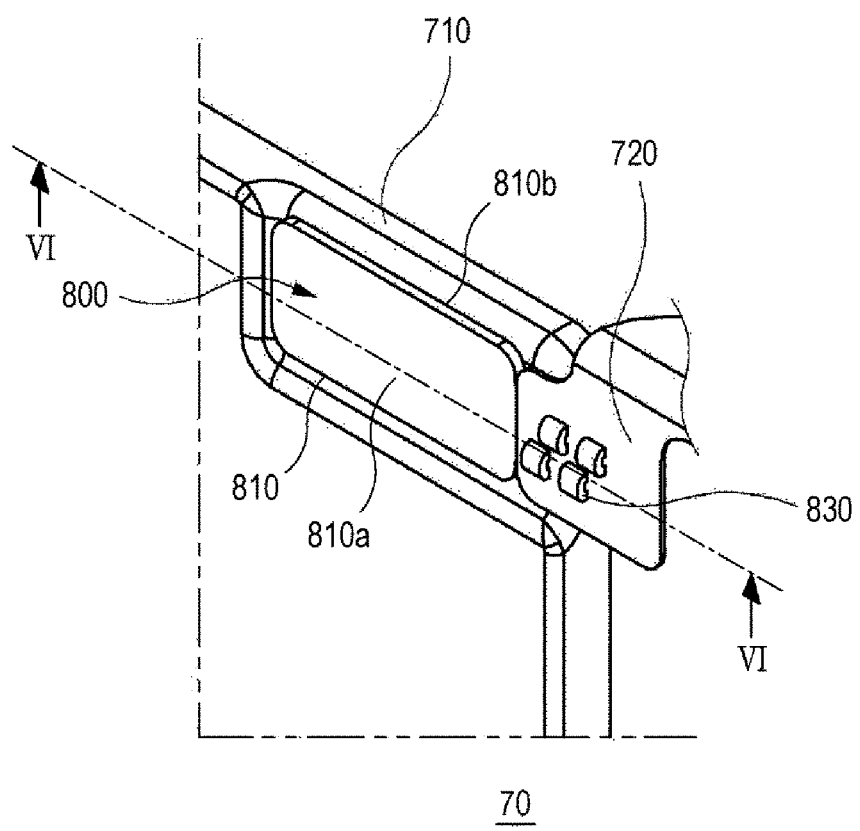
FIG. 43 is a perspective view showing the configuration of a bus bar assembly according to an eighteenth embodiment.
Figure 44:
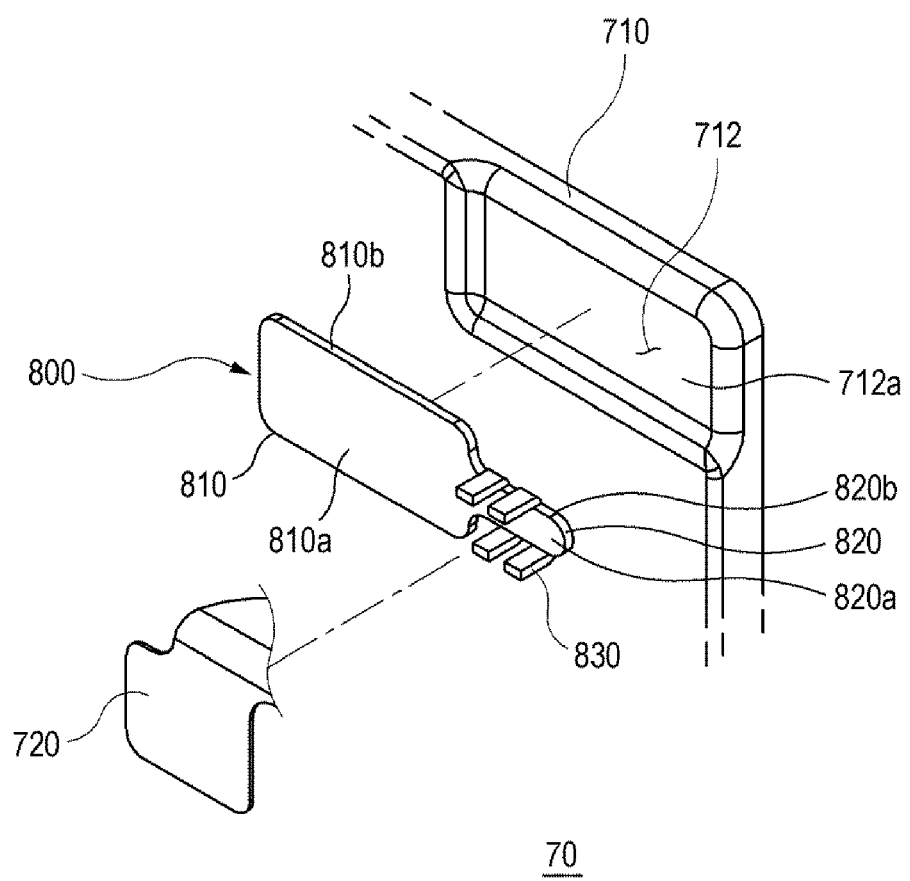
FIG. 44 is an exploded perspective view of the bus bar assembly shown in FIG. 43.
Figure 45:
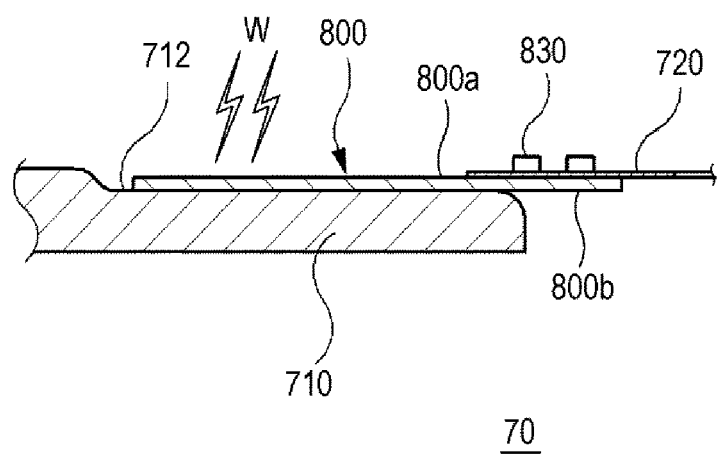
FIG. 45 is a cross-sectional view of the bus bar assembly taken along the line VI-VI in FIG. 43.
Figure 46:
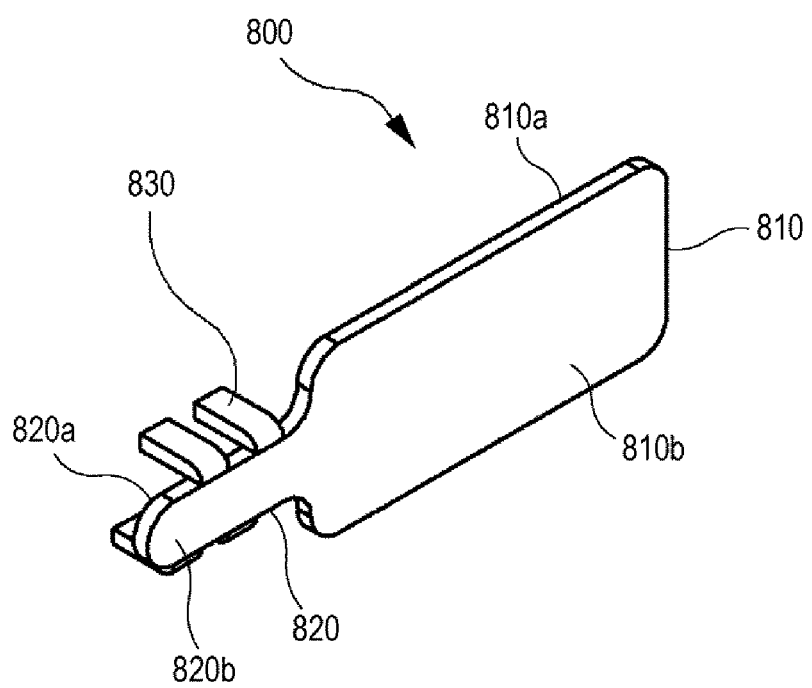
FIG. 46 is a perspective view showing a connection terminal of the bus bar assembly shown in FIG. 43

FIG. 43 is a perspective view showing the configuration of a bus bar assembly 70 according to an eighteenth embodiment, and FIG. 44 is an exploded perspective view of the bus bar assembly 70 shown in FIG. 43. FIG. 45 is a cross-sectional view of the bus bar assembly 70 taken along the line VI-VI in FIG. 43, and FIG. 46 is a perspective view showing a connection terminal 800 of the bus bar assembly 70 shown in FIG. 43.

Referring to FIGS. 43 to 46, a bus bar assembly 70 according to an embodiment may include a bus bar 710, a flexible printed circuit board 720, and a connection terminal 800. Referring to FIG. 3, the bus bar assembly 70 may be mounted on the frame 10 to constitute a part of the frame assembly 1. Referring to FIG. 3, the bus bar 710 may be fixed to the second frame 120 or the third frame 130.

The flexible printed circuit board 720 may be configured to sense the voltage and temperature of the battery cells and to transmit the sensed values to a BMS through a connector. Since the flexible printed circuit board 720 is flexible, the flexible printed circuit board 720 is able to transmit signals related to the voltage and temperature of each battery cell by means of a circuit pattern configured therein. One end of the flexible printed circuit board 720 may be electrically connected to the bus bar 710, and the opposite end thereof may be electrically connected to a battery management system (BMS) (not shown). Meanwhile, referring to FIG. 3, a connector 5 may be mounted to the opposite end of the flexible printed circuit board 720, and the flexible printed circuit board 720 may be electrically connected to the BMS so as to be detachable therefrom. The BMS manages charging and discharging of each battery cell (C). For example, the BMS charges a plurality of battery cells, which are discharged at different voltage levels, so as to have a uniform voltage level in a charging mode.

The bus bar 710 and the flexible printed circuit board 720 may be electrically connected to each other by a connection terminal 800. To this end, the connection terminal 800 is formed of a conductive metal. The connection terminal 800 may include a bonding portion 810 and an engaging portion 820 extending from the bonding portion 810. The engaging portion 820 may be configured as a metal plate extending from the bonding portion 810 toward the end of the engaging portion 820 and having a somewhat narrow width. The bonding portion 810 and the engaging portion 820 may be integrally formed in the actual manufacturing process.

The engaging portion 820 may have protrusions 830 formed on one surface 820 thereof. In another embodiment, the protrusions 830 may be formed on the opposite surface 820b of the engaging portion 820. The protrusions 830 fix the connection terminal 800 to the flexible printed circuit board 720. A plurality of protrusions 830 may be provided in order to provide a stronger fixation force. Referring to FIG. 44, a plurality of protrusions 830 may be arranged so as to face each other.

The engaging portion 820 of the connection terminal 800 may be coupled to the flexible printed circuit board 720 by means of a lap joint. Specifically, the protrusions 830 may be electrically connected to the flexible printed circuit board 720 while passing through predetermined portions of the flexible printed circuit board 720. Then, the passing and protruding portions of the protrusions 830 may be pressed and bent using a separate compression equipment (not shown), so that the connection terminal 800 may be fixed to the flexible printed circuit portion 720 so as not to be separated therefrom.

Referring to FIG. 44, the flexible printed circuit board 720 through which the protrusions 830 pass may have a circuit portion layer therein, which includes a conductive metal, such as copper, and is configured in the form of a thin metal film having a fine thickness. The protrusions 830 may pass through the circuit portion layer in the form of a thin metal film while being in contact with the circuit portion layer. Accordingly, the connection terminal 800 and the flexible printed circuit board 720 may be electrically connected to each other.

The bonding portion 810 may be formed of a metal plate that is larger than the area of the engaging portion 820. Referring to FIG. 45, the opposite surface 800b of the connection terminal 800, for example, the opposite surface 810b of the bonding portion 810, may be arranged adjacent to the bus bar 710. In this case, by applying a welding process (W) to one surface 800a of the connection terminal, for example, one surface 810a of the welding terminal 810, the opposite surface 800b of the connection terminal 800, for example, the opposite surface 810b of the bonding portion 810, may be bonded to the welding surface 712a of the bus bar 710. Accordingly, the bonding portion 810 may be fixed to the bus bar 710.

As the welding process (W), for example, laser welding may be applied. Laser welding has high welding reliability, compared to other welding methods, because it is less likely to cause the occurrence of a gap between the welding surface of the connection terminal 800 and the bus bar 710 and warping of the welding surface of the connection terminal 800. The laser welding is performed by radiating the laser at several points on a flat welding surface using a dedicated jig. The connection terminal 800 and the bus bar 710 may be electrically connected to each other by means of the laser welding.

The bus bar 710 may have a recess 712 formed therein to receive the connection terminal 800. The recess 712 may have a shape corresponding to the bonding portion 810. The recess 712 may indicate the arrangement position of the connection terminal 800 with respect to the bus bar 710, and may enable the connection terminal 800 to be stably placed on the bus bar 710.

In another embodiment, in the state in which the connection terminal 800 is bonded to the bus bar 710, a conformal coating process may be performed so as to cover the connection terminal 800 and a portion of the bus bar 710 surrounding the connection terminal 800. In the conformal coating process, referring to FIGS. 13 and 14, first, the connection terminal 800 may be bonded to the bus bar 710, and then a coating material may be applied to the area of the recess 712.

According to the above-described embodiment, the connection terminal 800 may be securely fixed to the flexible printed circuit board 720 by the process in which the protrusions 830 formed on one surface 800a of the connection terminal 800 pass through the flexible printed circuit board 720 and are then pressed. In addition, the opposite surface 800b of the connection terminal 800 may be firmly fixed to the bus bar 710 by laser welding.

Figure 47:
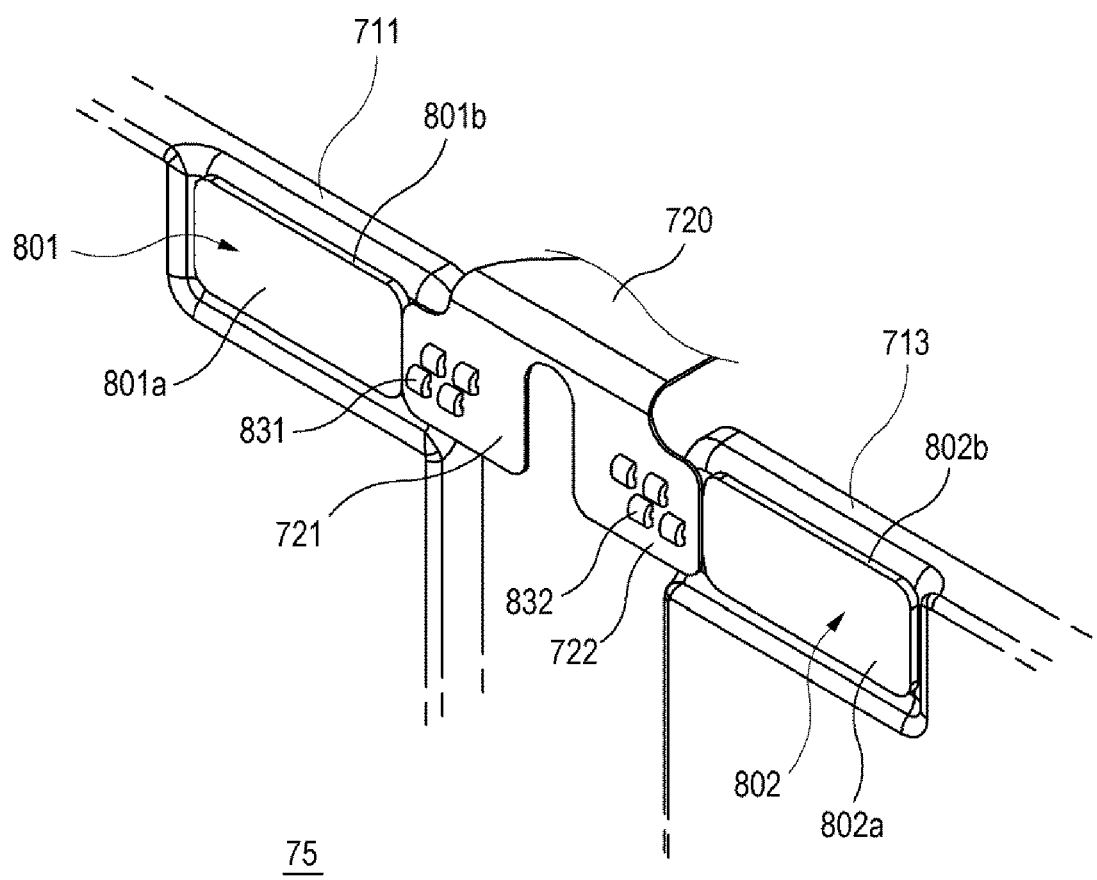
FIG. 47 is a perspective view showing the configuration of a bus bar assembly according to a nineteenth embodiment.

FIG. 47 is a perspective view showing the configuration of a bus bar assembly 75 according to a nineteenth embodiment. The extended structure of the bus bar assembly 70 shown in FIG. 43 may be applied to the bus bar assembly 75.

In an embodiment, a pair of bus bars 711 and 713 and a pair of connection terminals 801 and 802 may be provided. The flexible printed circuit board 720 may include a pair of connection circuit portions 721 and 722 diverging from the end of the flexible printed circuit board 720. The connection circuit portions 721 and 722 may be bonded respectively to the pair of connection terminals 801 and 802. A welding process is applied to one surfaces 801a and 802a of the pair of connection terminals 801 and 802 so that the opposite surfaces 801b and 802b of the connection terminals 801 and 802 may be bonded to the pair of bus bars 711 and 713. In this way, the pair of connection circuit portions 721 and 722 may be electrically connected respectively to the pair of bus bars 711 and 713 through the pair of connection terminals 801 and 802 respectively.

Referring to FIG. 5, a pair of first bus bars 121 and 122 may be fixed to the outer surface of the second frame 120, which may correspond to the pair of bus bars 711 and 713 in the present embodiment. In addition, referring to FIG. 5, the first-a and first-b bonding portions 211 and 212 may be bonded to the pair of first bus bars 121 and 122, which may correspond to the configuration in which the pair of connection terminals 801 and 802 is bonded respectively to the pair of bus bars 711 and 713 in the present embodiment. Thus, the pair of connection circuit portions 721 and 722 may be electrically connected respectively to the pair of bus bars 711 and 713 by means of the pair of connection terminals 801 and 802.

Figure 48:
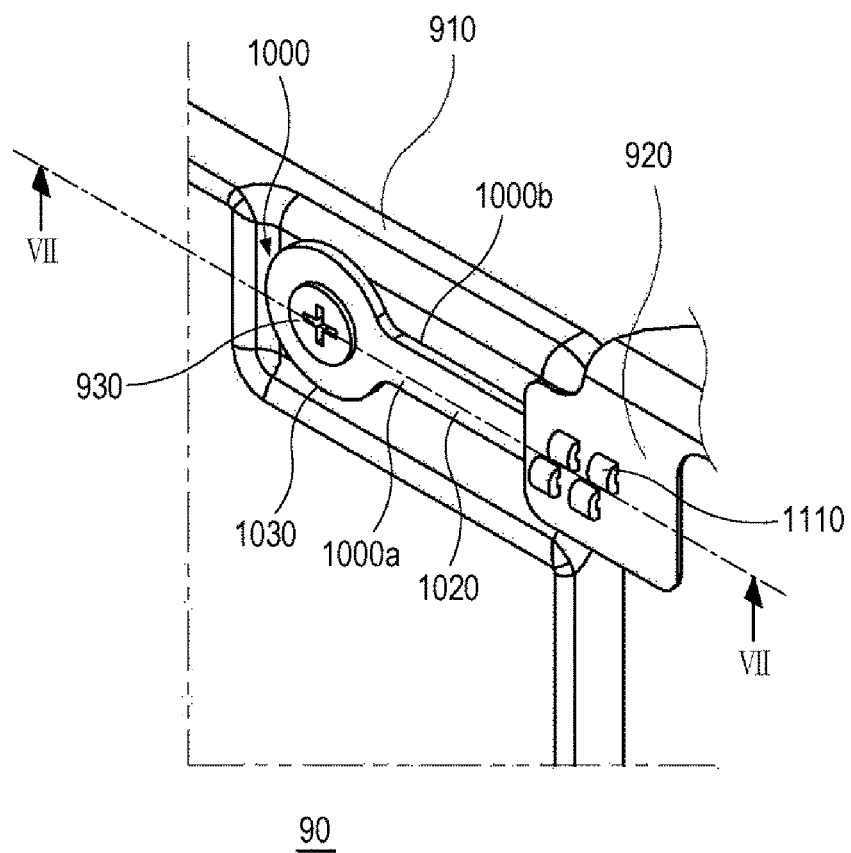
FIG. 48 is a perspective view showing the configuration of a bus bar assembly according to a twentieth embodiment.
Figure 49:
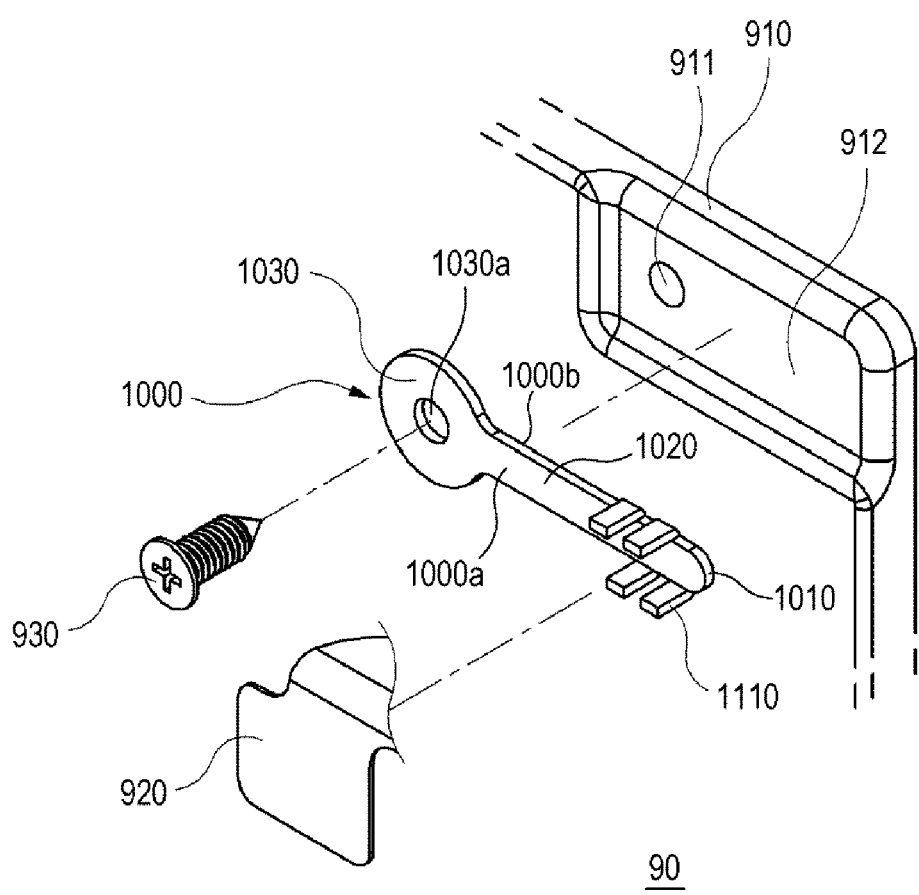
FIG. 49 is an exploded perspective view of the bus bar assembly shown in FIG. 48.
Figure 50:
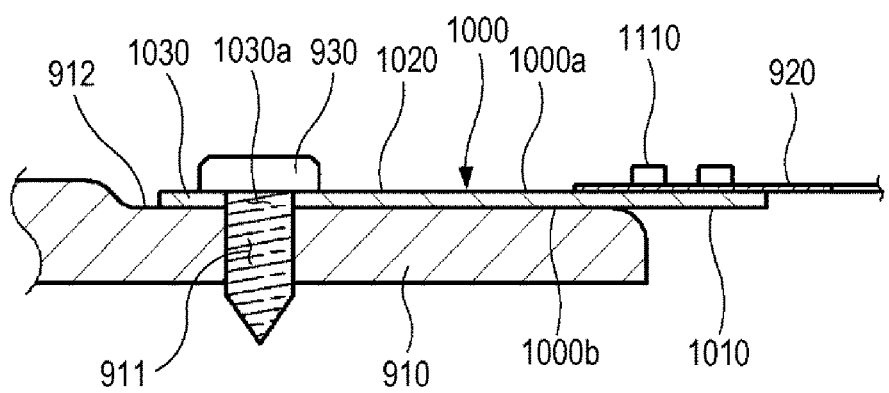
FIG. 50 is a cross-sectional view of the bus bar assembly taken along the line VII-VII in FIG. 48.
Figure 51:
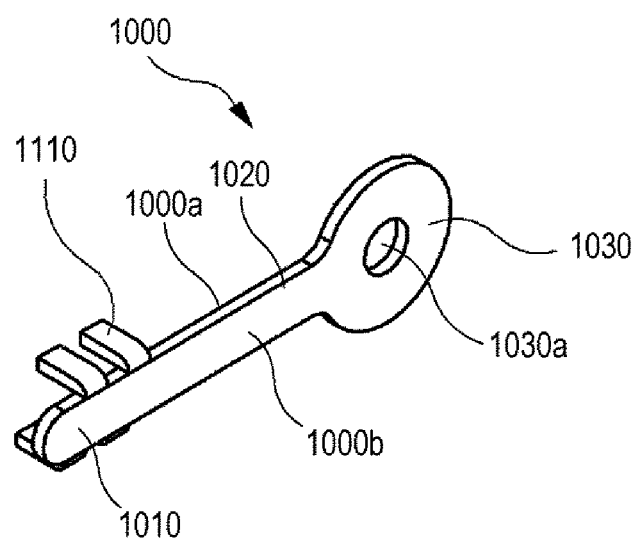
FIG. 51 is a perspective view showing a connection terminal of the bus bar assembly shown in FIG. 48.

FIG. 48 is a perspective view showing the configuration of a bus bar assembly 90 according to a twentieth embodiment, and FIG. 49 is an exploded perspective view of the bus bar assembly 90 shown in FIG. 48. FIG. 50 is a cross-sectional view of the bus bar assembly 90 taken along the line VII-VII in FIG. 48, and FIG. 51 is a perspective view showing a connection terminal of the bus bar assembly 90 shown in FIG. 48.

Referring to FIGS. 48 to 51, a bus bar assembly 90 according to an embodiment may include a bus bar 910, a flexible printed circuit board 920, a connection terminal

1000, and an engaging member 930. Referring to FIG. 3, the bus bar assembly 90 may be installed in the frame 10 to constitute a part of the frame assembly 1. Referring to FIG. 3, the bus bar 910 may be fixed to the second frame 120 or the third frame 130. In addition, the flexible printed circuit board 920 may be configured to sense the voltage and temperature of the battery cells, and may transmit the sensed values to the BMS via a connector.

The bus bar 910 and the flexible printed circuit board 920 may be electrically connected to each other by means of the connection terminal 1000. The connection terminal 1000 may be formed of a conductive metal. The connection terminal 1000 may include a contact portion 1020, configured such that the engaging member passes through the contact portion 1020 to come into contact with the bus bar 910, and an engaging portion 1010, extending from the contact portion 1020. The contact portion 1020 and the engaging portion 1010 may be integrally formed when manufacturing the same.

The engaging portion 1010 may be formed of a metal plate having a narrow width from the contact portion 1020 to the end of the engaging portion 1010. In addition, the engaging portion 1010 may have protrusions 1110 formed thereon. The protrusions 1110 may fix the connection terminal 1000 to the flexible printed circuit board 920. In this case, a plurality of protrusions 1110 may be provided to face each other in order to provide a stronger fixation force.

The engaging portion 1010 of the connection terminal 1000 may be coupled to the flexible printed circuit board 920 by means of a lap joint. Specifically, the protrusions 1110 may be electrically connected to the flexible printed circuit board 920 while passing through predetermined portions of the flexible printed circuit board 920. Then, the passing and protruding portions of the protrusions 1110 are pressed and bent using a separate compression equipment (not shown), so that the connection terminal 1000 may be fixed to the flexible printed circuit portion 920 so as not to be separated therefrom.

The flexible printed circuit board 920 through which the protrusions 1110 pass may have a circuit portion layer therein, which includes a conductive metal, such as copper, and is configured in the form of a thin metal film having a fine thickness. Accordingly, the protrusions 1110 may pass through the circuit portion layer while being in contact with the circuit portion layer, so that the connection terminal 1000 and the flexible printed circuit board 920 may be electrically connected to each other.

The contact portion 1020 of the connection terminal 1000 may be fixed to the bus bar 910 by means of an engaging member 930. The contact portion 1020 may include a ring portion 1030 through which the engaging member 930 passes. Referring to FIG. 49, the bus bar 910 may have an engaging hole 911 through which the engaging member 930 passes. The engaging hole 911 may be formed by means of a tapping process at a predetermined position of the bus bar 910. In addition, a ring hole 1030*a* may be formed in the ring portion 1030.

A process of coupling the connection terminal 1000 to the bus bar 910 by means of the engaging member 930 is as follows. First, the connection terminal 1000 is arranged on the bus bar 910 such that the engaging hole 911 in the bus bar 910 and the ring hole 1030*a* in the ring portion 1030 are aligned with each other. Next, the engaging member 930 may pass through the ring hole 1030*a* and then the engaging hole 911, thereby fixing the connection terminal 1000 to the bus bar 910. In this process, a portion of one surface 1000*a* of the connection terminal 1000 may come into contact with the engaging member 930, and the opposite surface 1000*b* of the connection terminal 1000 may come into contact with the bus bar 910.

In an embodiment, the engaging member 930 may be configured as a screw made of a conductive metal. In this case, the lower surface of a head of the screw may come into contact with a portion of one surface 1000*a* of the connection terminal 1000, i.e., the ring portion 1030, so that the connection terminal 1000 and the screw may be electrically connected. In addition, a threaded portion of the screw may come into contact with the bus bar 910 to then be electrically connected thereto when passing through the engaging hole 911 in the bus bar 910. Accordingly, the connection terminal 1000 and the bus bar 910 may be electrically connected through the engaging member 930, which is a conductor.

Referring to FIG. 49, the bus bar 910 may have a recess 912 formed therein to receive the connection terminal 1000. The recess 912 may indicate the arrangement position of the connection terminal 1000, and may allow the connection terminal 1000 to be stably arranged on the bus bar 910.

Figure 52:
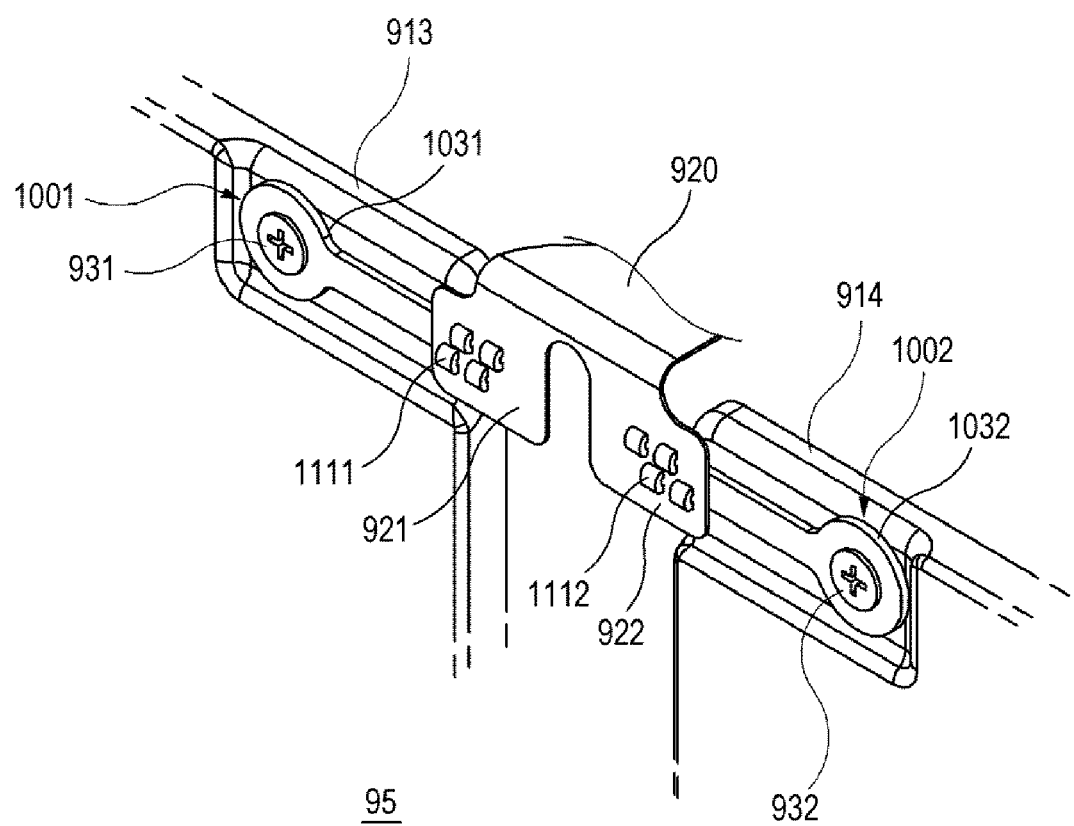
FIG. 52 is a perspective view showing the configuration of a bus bar assembly according to a twenty-first embodiment.

FIG. 52 is a perspective view showing the configuration of a bus bar assembly 95 according to a twenty-first embodiment. The extended structure of the bus bar assembly 90 shown in FIG. 48 may be applied to the bus bar assembly 95.

In an embodiment, a pair of bus bars 913 and 914, a pair of connection terminals 1001 and 1002, and a pair of engaging members 931 and 932 may be provided. The flexible printed circuit board 920 may include a pair of connection circuit portions 921 and 922 diverging from the end of the flexible printed circuit board 920. The pair of connection terminals 1001 and 1002 may be bonded respectively to the pair of connection circuit portions 921 and 922. The pair of connection circuit portions 921 and 922 may be configured to be electrically connected respectively to the pair of bus bars 913 and 914 through the pair of connection terminals 1001 and 1002 respectively through which the pair of engaging members 931 and 932 respectively passes.

The pair of connection terminals 1001 and 1002 may include a pair of protrusions 1111 and 1112 passing through the pair of connection circuit portions 921 and 922 respectively. In addition, the pair of connection terminals 1001 and 1002 may include ring portions 1031 and 1032 through which the pair of engaging members 931 and 932 respectively passes.

Referring to FIG. 5, a pair of first bus bars 121 and 122 may be fixed to the outer surface of the second frame 120, which may correspond to the pair of bus bars 913 and 914 in the present embodiment. In addition, referring to FIG. 5, the first-a and first-b bonding portions 211 and 212 may be bonded to the pair of first bus bars 121 and 122, which may correspond to the configuration in which the pair of connection terminals 1001 and 1002 is bonded to the pair of bus bars 913 and 914 by means of the pair of engaging members 931 and 932 in the present embodiment. Thus, the pair of connection circuit portions 921 and 922 may be electrically connected to the pair of bus bars 913 and 914 by means of respective ones of the pair of connection terminals 1001 and 1002.

Figure 53:
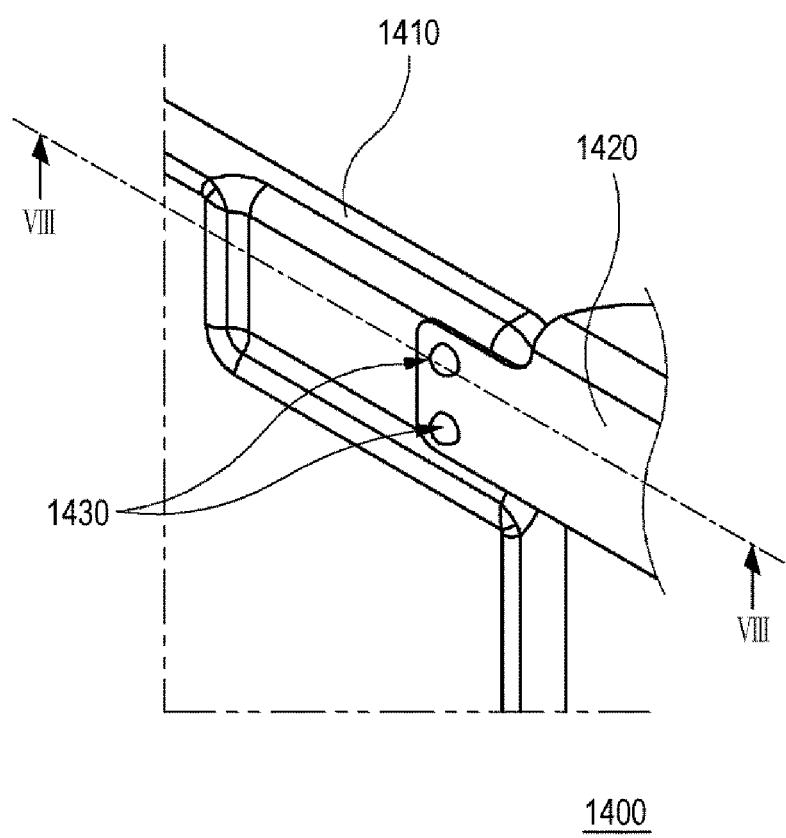
FIG. 53 is a perspective view showing the configuration of a bus bar assembly according to a twenty-second embodiment.
Figure 54:
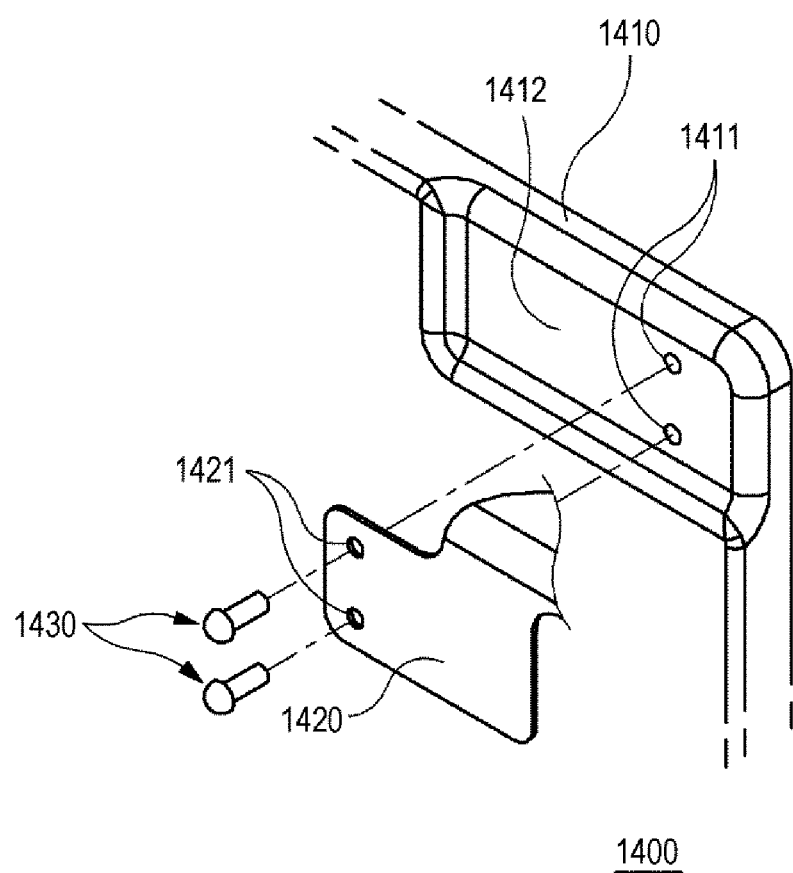
FIG. 54 is an exploded perspective view of the bus bar assembly shown in FIG. 53.
Figure 55:
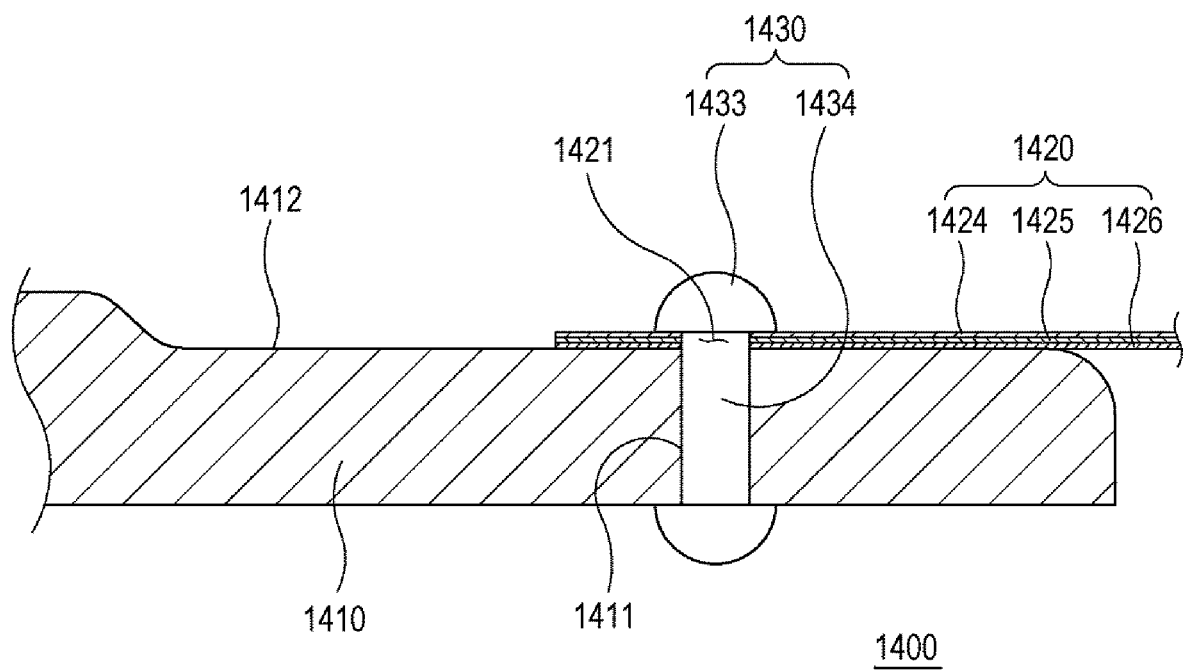
FIG. 55 is a cross-sectional view of the bus bar assembly taken along the line VIII-VIII in FIG. 53.

FIG. 53 is a perspective view showing the configuration of a bus bar assembly 1400 according to a twenty-second embodiment. FIG. 54 is an exploded perspective view of the bus bar assembly 1400 shown in FIG. 53. FIG. 55 is a cross-sectional view of the bus bar assembly 1400 taken along the line VIII-VIII in FIG. 53.

Referring to FIGS. 53 to 55, the bus bar assembly 1400 may include a bus bar 1410, a flexible printed circuit board 1420, an engaging member 1430, and the like. Referring to FIG. 3, the bus bar assembly 1400 may be mounted on the frame 10 to constitute a part of the frame assembly 1. Referring to FIG. 3, the bus bar 1410 may be fixed to the second frame 120 or the third frame 130.

The bus bar 1410 may have first holes 1411 formed therein. A plurality of first holes 1411 may be provided, and the plurality of first holes 1411 may be arranged in a line. In another embodiment, the plurality of first holes 1411 may be arranged in two lines, wherein at least one hole may be arranged in each line.

The flexible printed circuit board 1420 may be configured to sense the voltage and temperature of the battery cells and to transmit the sensed values to a BMS through a connector. The flexible printed circuit board 1420 may transmit signals related to the voltage and temperature of each battery cell by means of a circuit pattern configured therein. One end of the flexible printed circuit board 1420 may be electrically connected to the bus bar 1410, and the opposite end thereof may be electrically connected to a BMS. In addition, a connector is mounted to the opposite end of the flexible printed circuit board 1420, and the flexible printed circuit board 1420 may be electrically connected to the BMS so as to be detachable therefrom.

The flexible printed circuit board 1420 may have second holes 1421 corresponding to the first holes 1411. A pair of first holes 1411 and a pair of second holes 1421 may be provided. The pair of first holes 1411 may be spaced a predetermined distance apart from each other, and the pair of second holes 1421 may be spaced apart from each other by the same distance as the above distance. According to the above configuration, it is possible to prevent the bus bar 1410 and the flexible printed circuit board 1420 from pivoting about the coupling portion thereof with the minimum number of couplings.

Referring to FIG. 55, the flexible printed circuit board 1420 may include a circuit portion layer 1425 of a conductive metal exposed through the first and second holes 1411 and 1421. The circuit portion layer 1425 may be formed of a conductive metal, such as copper, in the form of a thin metal film having a fine thickness. A first insulating layer 1424 may be attached to one surface of the circuit portion layer 1425, and a second insulating layer 1426 may be attached to the opposite surface of the circuit portion layer 1425.

The engaging member 1430 may be formed of a conductive metal. The engaging member 1430 may be configured to pass through both the first hole 1411 and the second hole 1421 and to fix the flexible printed circuit board 1420 to the bus bar 1410. In this process, the engaging member 1430 may come into contact with the circuit portion layer 1425 to be electrically connected to the flexible printed circuit board 1420. In addition, the engaging member 1430 may come into contact with the inner circumference of the first hole 1411 or the periphery thereof so as to be electrically connected to the bus bar 1410. Accordingly, the flexible printed circuit board 1420 and the bus bar 1410 may be electrically connected to each other by means of the engaging member 1430.

The flexible printed circuit board 1420 may be arranged on the bus bar 1410 such that the second holes 1421 in the flexible printed circuit board 1420 and the first holes 1411 in the bus bar 1410 are aligned with each other. The engaging member 1430 may pass through the second holes 1421 and the first holes 1411, which are aligned with each other, thereby coupling the flexible printed circuit board 1420 to the bus bar 1410 by means of a lap joint. That is, a portion of the end of the flexible printed circuit board 1420 may be arranged on the upper surface of the bus bar 1410 while partially overlapping the same.

According to an embodiment, the engaging member 1430 may be a rivet. The rivet may include a head 1433 and a deformable part 1434 that is deformed through a riveting operation. Rivet bonding may provide a permanent connection. Rivet bonding may be useful for bonding thin members to each other. The rivet bonding may solve problems such as changes in the properties of a material due to welding, warping of a material due to heat, cracks occurring in the welded portion, and the like. In addition, the rivet bonding may solve the problem in which a bolt is loosened due to vibration transmitted to the bolted connection after engagement of the bolt. Accordingly, the reliability of connection between the bus bar 1410 and the flexible printed circuit board 1420 may be improved.

The bus bar 1410 may have a recess 1412 formed in a portion of the bus bar 1410 where the flexible printed circuit board 1420 and the bus bar 1410 are coupled by means of a lap joint. A first hole 1411 may be formed in the recess 1412. The recess 1412 may indicate the arrangement position of the flexible printed circuit board 1420 with respect to the bus bar 1410, and may allow the flexible printed circuit board 1420 to be stably arranged in the bus bar 1410.

Figure 56:
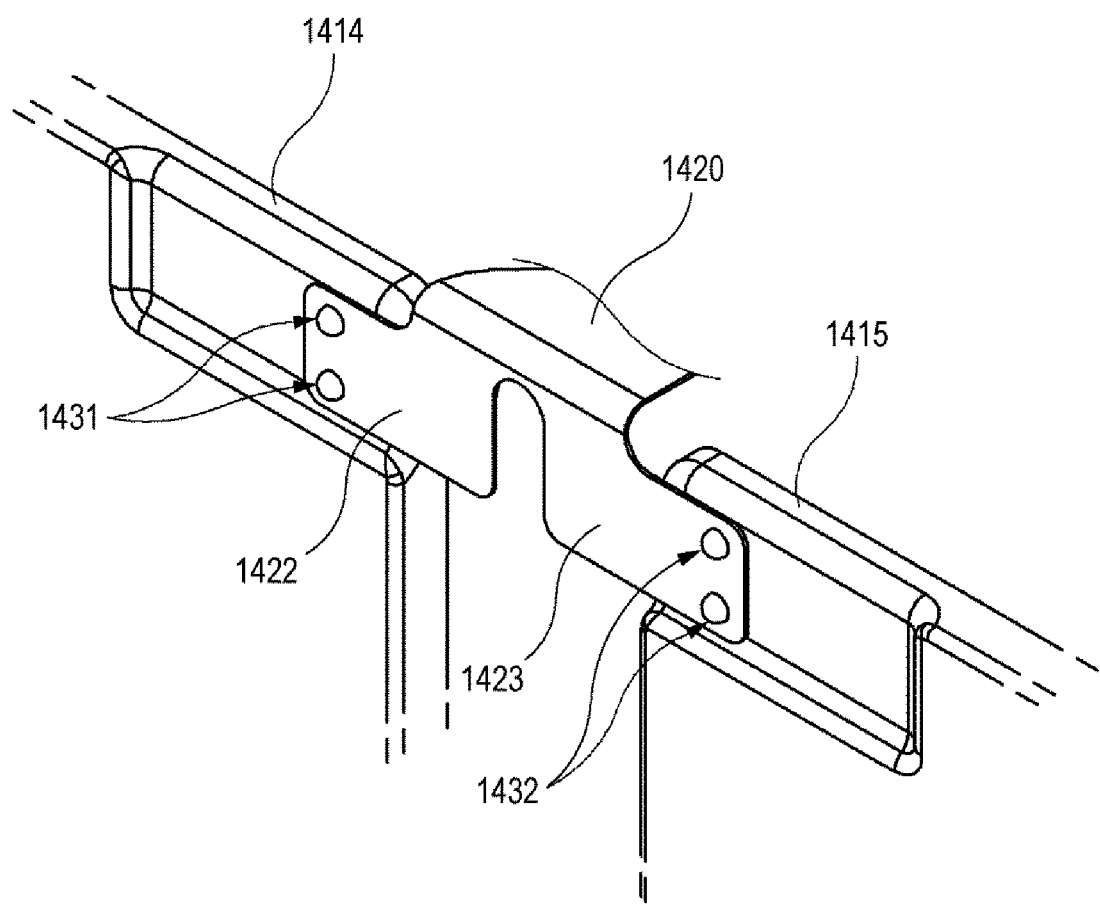
FIG. 56 is a perspective view showing the configuration of a bus bar assembly according to a twenty-third embodiment.

FIG. 56 is a perspective view showing the configuration of a bus bar assembly 1450 according to a twenty-third embodiment. The extended structure of the bus bar assembly 1400 shown in FIG. 53 may be applied to the bus bar assembly 1450.

A pair of bus bars 1414 and 1415 and a pair of engaging members 1431 and 1432 may be provided. The flexible printed circuit board 1420 may include a pair of connection circuit portions 1422 and 1423 diverging from the end of the flexible printed circuit board. The pair of connection circuit portions 1422 and 1423 may be configured to be electrically connected respectively to the pair of bus bars 1414 and 1415 through the pair of engaging members 1431 and 1432 respectively. Each of the pair of connection circuit portions 1422 and 1423 may have second holes formed therein, and may include a circuit portion layer made of a conductive metal so as to be exposed through the second holes. The pair of engaging members 1431 and 1432 may be configured to be simultaneously in contact with the bus bars 1414 and 1415 and the circuit portion layers of the connection circuit portions 1422 and 1423.

Referring to FIG. 5, a pair of first bus bars 121 and 122 may be fixed to the outer surface of the second frame 120, which may correspond to the pair of bus bars 1414 and 1415 in the present embodiment. In addition, referring to FIG. 5, the first-a and first-b bonding portions 211 and 212 may be bonded to the pair of first bus bars 121 and 122, which may correspond to the configuration in which the pair of connection circuit portions 1422 and 1423 is bonded to the pair of bus bars 1414 and 1415 respectively in the present embodiment. In addition, referring to FIG. 47, a pair of connection circuit portions 721 and 722 may be electrically connected respectively to a pair of bus bars 711 and 713 by means of a pair of connection terminals 801 and 802 respectively.

Although the steps of processes, the steps of methods, algorithms, and the like have been described as being performed in sequence in the flowcharts shown in FIGS. 18, 19, 38, 39, and 41, the processes, the methods, and the algorithms may be configured to be performed in any arbitrary or suitable sequence. In other words, the steps of the processes, methods, and algorithms described in various embodiments of the present disclosure need not be performed in the order described in the present disclosure. In addition, although some steps are described as not being performed simultaneously, the some steps may be performed simultaneously in other embodiments. Further, the processes illustrated in the drawings are not intended to exclude variations and modifications of the processes; some of the illustrated processes or steps thereof are not intended to be essential to one or more of the various embodiments of the present disclosure; and the illustrated processes are not intended to mean that only those processes are preferable.

The technical idea of the present disclosure has been described heretofore with reference to some embodiments and examples shown in the accompanying drawings. However, it is to be understood that various substitutions, modifications and alterations may be made without departing from the technical idea and scope of the present disclosure, which may be understood by those of ordinary skill in the technical field to which the present disclosure pertains. Further, it is to be understood that such substitutions, modifications and alterations fall within the scope of the appended claims.

What is claimed is:

1. A bus bar assembly installed in a frame for fixing a plurality of stacked battery cells, the bus bar assembly comprising:
    a bus bar fixed to an outside of the frame;
    a flexible printed circuit board electrically connected to the bus bar and configured to sense the plurality of the stacked battery cells; and
    a connection terminal including:
        a first surface facing in a first direction and being in contact with the flexible printed circuit board;
        a protrusion protruding in the first direction, the protrusion formed on the first surface and configured to pass through the flexible printed circuit board so as to be electrically connected to the flexible printed circuit board; and
        a second surface facing in a second direction, which is opposite to the first direction, the second surface being in contact with the bus bar so that the connection terminal is configured to be electrically connected to the bus bar through the second surface.

2. The bus bar assembly of claim 1, wherein the connection terminal comprises:
    a bonding portion comprising the first surface and the second surface bonded to the bus bar; and
    an engaging portion having the protrusion formed therein and extending from the bonding portion so as to be coupled to the flexible printed circuit board by means of a lap joint.

3. The bus bar assembly of claim 1, wherein a plurality of protrusions is provided to face each other, and
    wherein the plurality of protrusions passes through predetermined positions of the flexible printed circuit board and passing and protruding portions of the plurality of protrusions are pressed to be bent.

4. The bus bar assembly of claim 2, wherein the second surface is disposed adjacent to the bus bar, and
    wherein the second surface is bonded to the bus bar by applying a welding process to the first surface.

5. The bus bar assembly of claim 1, wherein the bus bar has a recess formed therein to receive the connection terminal.

6. The bus bar assembly of claim 1, wherein a conformal coating process is performed so as to cover the connection terminal and a portion of the bus bar around the connection terminal in a state in which the connection terminal is bonded to the bus bar.

7. The bus bar assembly of claim 1, further comprising:
    an engaging member configured to pass through the connection terminal and the bus bar so as to fix the connection terminal to the bus bar.

8. The bus bar assembly of claim 7, wherein the connection terminal comprises:
    a contact portion including a ring portion having a hole through which the engaging member passes and configured to come into contact with the bus bar; and
    an engaging portion having the protrusion formed therein and extending from the contact portion so as to be coupled to the flexible printed circuit board by means of a lap joint.

* * * * *